(12) United States Patent
Kubota et al.

(10) Patent No.: US 7,040,747 B2
(45) Date of Patent: May 9, 2006

(54) RECORDING METHOD FOR PRINTING USING TWO LIQUIDS ON RECORDING MEDIUM

(75) Inventors: Kazuhide Kubota, Nagano-Ken (JP); Takashi Oyanagi, Nagano-Ken (JP); Toshiyuki Miyabayashi, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 207 days.

(21) Appl. No.: 10/056,231

(22) Filed: Jan. 25, 2002

(65) Prior Publication Data
US 2003/0069329 A1 Apr. 10, 2003

Related U.S. Application Data

(63) Continuation-in-part of application No. 09/806,273, filed as application No. PCT/JP00/05150 on Jul. 31, 2000, now abandoned.

(30) Foreign Application Priority Data

| Jul. 30, 1999 | (JP) | 1999-217296 |
| Jan. 14, 2000 | (JP) | 2000-7135 |
| Jul. 12, 2000 | (JP) | 2000-211821 |
| Jul. 24, 2000 | (JP) | 2000-222966 |
| Jul. 25, 2000 | (JP) | 2000-224002 |
| Jul. 25, 2000 | (JP) | 2000-224141 |
| Jan. 29, 2001 | (JP) | 2001-020737 |

(51) Int. Cl.
*B41J 2/01* (2006.01)

(52) U.S. Cl. ................ 347/101; 347/106; 347/100; 347/96

(58) Field of Classification Search ........... 347/100, 347/101, 95, 96, 103, 105, 106, 102; 101/1
See application file for complete search history.

(56) References Cited

U.S. PATENT DOCUMENTS

| 5,120,359 A | | 6/1992 | Uzukawa |
| 5,559,708 A | * | 9/1996 | Turnbull et al. ........... 347/106 |
| 5,734,403 A | | 3/1998 | Suga |
| 5,786,835 A | * | 7/1998 | Ikeda et al. ............... 347/102 |

FOREIGN PATENT DOCUMENTS

| EP | 0534634 | 3/1993 |
| EP | 0620116 | 10/1994 |
| EP | 0631005 | 12/1994 |

(Continued)

OTHER PUBLICATIONS

JPO Abstract 55(1980)–157668, Dec. 1980.
JPO Abstract 56(1981)–147859, Nov. 17, 1981.
JPO Abstract 56(1981)–147860, Nov. 17, 1981.

(Continued)

*Primary Examiner*—Manish S. Shah
(74) *Attorney, Agent, or Firm*—Ladas & Parry

(57) ABSTRACT

There is provided a recording method that can realize images which possess excellent fixation on recording media, excellent rubbing/scratch resistance and good quality. In the recording method, an ink composition including at least a colorant, resin emulsion particles, a water-soluble organic solvent, and water and a reaction solution containing a reactant capable of forming coagulate upon contact with the ink composition are deposited onto a recording medium to perform printing. This recording method includes the steps of: depositing the reaction solution onto the recording medium; depositing the ink composition onto the recording medium to record an image; and washing the recording medium, on which the reaction solution and the ink composition have been deposited to perform printing, with a polar so olar solvent.

73 Claims, 2 Drawing Sheets

FOREIGN PATENT DOCUMENTS

| | | |
|---|---|---|
| EP | 0631006 | 12/1994 |
| EP | 0649751 | 4/1995 |
| EP | 0739743 | 10/1996 |
| EP | 0875544 A1 * | 4/1998 |
| EP | 0900831 A2 * | 9/1998 |
| EP | 0875544 | 11/1998 |
| EP | 0900831 | 3/1999 |
| JP | 55(1980)-157668 | 12/1980 |
| JP | 56(1981)-147859 | 11/1981 |
| JP | 56(1981)-147860 | 11/1981 |
| JP | 62(1987)-1426 | 1/1987 |
| JP | 01(1989)-217088 | 8/1989 |
| JP | 03(1991)-56573 | 3/1991 |
| JP | 03(1991)-60068 | 3/1991 |
| JP | 03(1991)-79678 | 4/1991 |
| JP | 03(1991)-160068 | 7/1991 |
| JP | 03(1991)-240557 | 10/1991 |
| JP | 03(1991)-240558 | 10/1991 |
| JP | 04(1992)-5703 | 1/1992 |
| JP | 04(1992)-18462 | 1/1992 |
| JP | 04(1992)-76004 | 3/1992 |
| JP | 05(1993)-320276 | 12/1993 |
| JP | 06(1994)-106735 | 4/1994 |
| JP | 6146178 | 5/1994 |
| JP | 06-299110 | 10/1994 |
| JP | 08-025792 | 1/1996 |
| JP | 09(1997)-99632 | 4/1997 |
| JP | 10-316909 * | 12/1998 |
| JP | 10330661 | 12/1998 |
| JP | 10(1998)-316909 | 12/1998 |
| JP | 1121772 | 1/1999 |
| JP | 11-012519 | 1/1999 |
| JP | 1129731 | 2/1999 |
| JP | 1134478 | 2/1999 |
| JP | 11-349875 | 12/1999 |

OTHER PUBLICATIONS

JPO Abstract 62(1987)–1426, Jan. 7, 1987.
JPO Abstract 03(1991)–56573, Mar. 12, 1991.
JPO Abstract 03(1991)–60068, Mar. 15, 1991.
JPO Abstract 03(1991)–79678, Apr. 4, 1991.
JPO Abstract 03(1991)–160068, Jul. 10, 1991.
JPO Abstract 03(1991)–240557, Oct. 25, 1991.
JPO Abstract 03(1991)–240558, Oct. 25, 1991.
JPO Abstract 04(1992)–5703, Jan. 9, 1992.
JPO Abstract 04(1992)–18462, Jan. 22, 1992.
JPO Abstract 04(1992)–76004, Mar. 10, 1992.
JPO Abstract 05(1993)–320276, Dec. 3. 1993.
JPO Abstract 09(1997)–99632, Apr. 15, 1997.
JPO Abstract 10(1998)–316909, Dec. 2, 1998.
Patent Abstract of Japan of JP 11–034479 dated Feb. 9, 1999.
Patent Abstract of Japan of JP 11–029731 dated Feb. 2, 1999.
Patent Abstract of Japan of JP 6–146178 dated May 27, 1994.
Patent Abstract of Japan of JP 11–021772 dated Jan. 26, 1999.
Patent Abstract of Japan of JP 10–330661 dated Dec. 15, 1998.
Patent Abstract of Japanese Patent No. 11–349875 dated Dec. 1999.
Patent Abstract of Japanese Patent No. 08–025792 dated Sep. 1996.
Patent Abstract of Japanese Patent No. 06–299110 dated Oct. 1994.
Patent Abstract of Japanese Patent No. 11–012519 dated Jan. 1999.

* cited by examiner

RECORDING METHOD FOR PRINTING USING TWO LIQUIDS ON RECORDING MEDIUM

This application is a continuation-in-part of application Ser. No. 09/806,273 filed on Mar. 28, 2001 now abandoned which is the national stage filing of International Application PCT/JP00/05150 filed on Jul. 31, 2000, which designated the U.S., was published in English, claims the benefit thereof and incorporates the same by reference.

BACKGROUND OF THE INVENTION

1. Field of the Invention

The present invention relates to a recording method wherein a reaction solution and an ink composition are deposited onto a recording medium to perform printing and the recording medium is then washed with a polar solvent.

2. Background Art

Water-based ink compositions generally comprise water as a main ingredient and, added to water, a colorant component and a wetting agent such as glycerin. Recording media used with water-based ink compositions are generally those which, to some extent, absorb ink compositions and are permeable to the colorant, for example, paper. In recent years, ink jet recording has attracted attention as a recording method for performing printing using water-based ink compositions. Ink jet recording is a method wherein droplets of an ink composition are ejected used deposited onto a recording medium to perform printing.

On the other hand, when printing or coating is performed on recording media, which do not basically absorb water-based ink compositions, such as plastics and metals, solvent-based ink compositions or coating compositions using an organic solvent (particularly a lipophilic organic solvent) are generally used. The solvent-based ink compositions or coating compositions, when printed on non-absorptive recording media, can yield prints possessing excellent fixation, rubbing/scratch resistance, fastness properties or other properties. Some organic solvents, however, are toxic against animals and plants. Therefore, care should be taken, for example, in use or disposal of these organic solvents, and, thus, these organic solvents are in many cases inconvenient for handling.

Even in the case of printing or coating on non-absorptive recording media, a recording method using water-based ink compositions is preferred, for example, from the viewpoints of safety, environment, and convenience of use. In the printing on non-absorptive recording media, however, the colorant component of the water-based ink composition should be strongly fixed onto the surface of the recording medium. A general proposal for improving the fixation of the colorant onto the recording medium is to add a resin as a binder to the water-based ink composition. This resin functions as the binder to fix the colorant onto the recording medium.

In printing on recording media, such as plastics and metals, in many cases, durability, lightfastness, and weathering resistance are generally required of prints. The addition of an ultraviolet absorber or a photostabilizer to ink compositions is considered as means for improving the lightfastness of the ink composition. Since, however, most of ultraviolet absorbers and photostabilizers are oil soluble, it is difficult to allow these ultraviolet absorbers and photostabilizers to exist in a satisfactory amount in water-soluble ink compositions. Further, the addition of low-molecular weight lightfastness-imparting agents or some polymer binders to ink compositions is considered as means for improving the weathering resistance of the ink composition. However, under severe conditions, for example, such that prints are exposed to rain and dew in the open air, or come into contact with saltwater on the sea, in some cases, it is difficult to maintain the initial image quality of prints.

Further, in ink jet recording, the dispersion stability and ejection stability of the ink composition should be improved from the viewpoint of realizing the formation of good images.

Further, in the case of printing letters, in general, real image printing is carried out. According to the applications of prints and the environment in which prints are used, however, mirror images are sometimes printed on recording media. For example, in the case of wall materials, packing materials, and transfer paper, mirror image printing of a design is sometimes performed on transparent or semi-transparent recording media. Further, seals are produced based on a block copy as a mirror image print. Further, in specialty sheets for backlight, a mirror image is printed on the backside of sheets. In use, light is applied to the backside of the sheet on which a mirror image has been printed. Therefore, also in the case of mirror image printing, a printing method is required which can yield images possessing excellent fixation, rubbing/scratch resistance, and lightfastness and good image quality.

SUMMARY OF THE INVENTION

The present inventors have now found that the formation of an image using two liquids, an ink composition comprising a colorant and resin emulsion particles and a reaction solution, on a recording medium followed by washing of the recording medium with a polar solvent permits the printed portion (image portion) to be surely brought to a film state and, as a result, permits the resin emulsion particles to surround the colorant and, in this state, to be fully brought to a film state, leading to the realization of an improvement in fixation of the colorant onto the recording medium, rubbing/scratch resistance, lightfastness, weathering resistance, ejection stability, and dispersion stability that can realize prints having image quality which has been improved to a level more than expected. The present invention has been made based on such finding.

Accordingly, it is an object of the present invention to provide a recording method which can provide excellent fixation, rubbing/scratch resistance, lightfastness, weathering resistance, ejection stability, and dispersion stability of a colorant, and can realize good images.

According to one aspect of the present invention, there is provided a recording method wherein an ink composition comprising at least a colorant, resin emulsion particles, and a water-soluble organic solvent and a reaction solution comprising a reactant, which causes coagulate upon contact with the ink composition, are deposited onto a recording medium to perform printing, said recording method comprising the steps of:

depositing the reaction solution onto the recording medium;

depositing the ink composition onto the recording medium to record an image; and washing the recording medium, on which the reaction solution and the ink composition have been deposited to perform printing, with a polar solvent.

According to another aspect of the present invention, there is provided a recording apparatus. The recording apparatus according to the present invention is a recording apparatus for depositing an ink composition comprising at least a colorant, resin emulsion particles, a water-soluble organic solvent, and water and a reaction solution containing a reactant capable of forming coagulate upon contact with the ink composition, onto a recording medium to perform printing, and comprises:

means for depositing the reaction solution onto the recording medium;

means for depositing the ink composition onto the recording medium to record an image;

means for controlling the means for depositing the reaction solution onto the recording medium and the means for depositing the ink composition onto the recording medium to record an image; and means for washing the recording medium, on which the reaction solution and the ink composition have been deposited to perform printing, with a polar solvent.

BRIEF DESCRIPTION OF THE DRAWINGS

In FIGS. 1 and 2, the following reference characters are used. Specifically, numeral 1 designates a supply source and a recording head, numeral 2 an ink jet recording mechanism, numeral 3 a print layer, numeral 4 a washing mechanism, numeral 5 a drying mechanism, numeral 6 a product receiver, numeral 11 PET film roll, numeral 12 a support table, and numeral 13 a product roll.

DETAILED DESCRIPTION OF THE INVENTION

Recording Method

Figure 1:
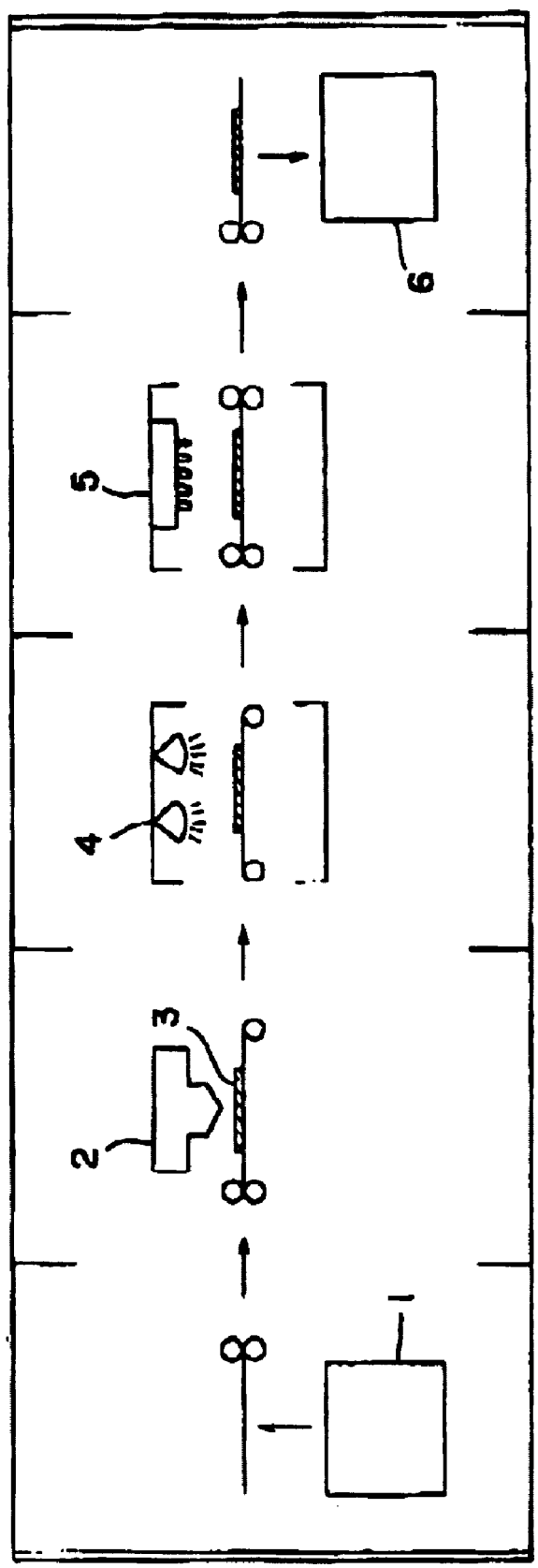
FIG. 1 is a schematic view of the recording apparatus according to the present invention.

The recording method according to the present invention comprises the steps of:

depositing a reaction solution described below onto the recording medium;

depositing an ink composition described below onto the recording medium to record an image; and washing the recording medium, on which the reaction solution and the ink composition have been deposited to perform printing, with a polar solvent. According to the present invention, "printing" may be either real image printing or mirror image printing, or may be real image printing performed alternately or simultaneously with mirror image printing.

According to the recording method of the present invention, the deposition of a reaction solution and an ink composition containing a certain type of a colorant onto the surface of a non-absorptive recording medium followed by washing of the printed portion with a polar solvent permits the colorant to be strongly fixed onto the recording medium to impart rubbing/scratch resistance and, at the same time, lightfastness to be imparted to the printed portion, whereby good images can be realized.

Although the reason why this effect can be attained has not been fully elucidated, the reason is believed as follows. It is considered that, at the outset, upon the contact of the reaction solution with the ink composition on the surface of a non-absorptive recording medium, such as plastic, rubber, metal, or ceramic, the reactant contained in the reaction solution breaks the state of dispersion of the colorant and the resin emulsion particles in the ink composition to form coagulate. In an early stage of the contact, coagulate, comprised of the colorant and the resin emulsion particles, and water or the water-soluble organic solvent separated from the coagulate are present together in the printed portion formed on the recording medium as a result of the contact of the reaction solution with the ink composition. In the formation of the coagulate, water and the water-soluble organic solvent are removed from between the coagulate and the surface of the recording medium, and, as a result, this coagulate is adsorbed on the surface of the recording medium. This recording medium is then washed with a polar solvent to wash away water or the water-soluble organic solvent, thereby removing water or the water-soluble organic solvent present between the resin emulsion particles. As a result, film formation is accelerated, and a resin film containing the colorant is formed. It is considered that the presence of carboxyl groups enhances the adhesion of the resin film to the surface of the recording medium, and, thus, the colorant is strongly fixed onto the surface of the recording medium. The effect of the above mechanism is considered significant particularly when the recording medium is a non-absorptive recording medium. In this connection, it should be noted that the above mechanism is hypothetical and should not be construed as limiting the scope of the present invention.

The reaction solution and the ink composition may be deposited onto the recording medium in any order. Specifically, suitable methods for the deposition of the reaction solution and the ink composition include a method wherein the ink composition is deposited onto the recording medium after the deposition of the reaction solution onto the recording medium, a method wherein the ink composition is first printed onto the recording medium followed by the deposition of the reaction solution onto the recording medium, and a method wherein the reaction solution and the ink composition are mixed together just before or just after the deposition.

The deposition of the reaction solution onto the recording medium may be carried out by any of a method wherein the reaction solution is selectively deposited onto only an area where the ink composition is deposited, and a method wherein the reaction solution is deposited on the whole area of the recording medium. Which method is adopted may be determined by taking into consideration a combination of the ink composition with the reaction solution.

Recording methods commonly used in the printing industry and the painting industry may be used as means for depositing the reaction solution onto the recording medium and as means for depositing the ink composition onto the recording medium. For example, direct jetting, spraying, coating, and transfer may be used. Preferred is an ink jet recording method wherein droplets are ejected and deposited onto the recording medium to perform printing.

In the present invention, specific examples of methods for washing the as-printed recording medium with a polar solvent include rinsing of the recording medium or the surface thereof with a polar solvent, flushing of the recording medium or the surface thereof with a polar solvent, dipping of the recording medium or the surface thereof in a polar solvent, and a combination of two or more of these methods. The washing may be carried out continuously or intermittently during printing. The polar solvent used is preferably such that the colorant and the resin emulsion particles adsorbed onto the recording medium are not removed. Further, the polar solvent is suitably soluble in water and is safe. Specific examples of such polar solvents include water; alcohols having 5 or less carbon atoms, preferably lower alcohols, such as methyl alcohol, ethyl alcohol, and propyl alcohol; sulfoxides represented by formula R(R')S=O wherein R and R' each independently represent a straight-chain or branched alkyl group having 5 or less carbon atoms, preferably sulfoxides, such as dimethyl suloxide and diethyl sulfoxide; and lower amines, for example, amines having 5 or less carbon atoms, lower aliphatic primary amines, preferably methylamine, ethylamine, propylamine, isopropylamine, butylamine, amylamine, hexylamine and the like, lower aliphatic secondary amines, preferably dimethylamine, diethylamine, dipropylamine, diisopropylamine and the like, and lower aliphatic tertiary amines, preferably trimethylamine, triethylamine and the like. A mixture of two or more of them may also be suitable. Among them, water is a particularly preferred polar solvent.

According to an embodiment of the present invention, a method may be used wherein, after the recording medium is washed with a polar solvent, the recording medium is heated and dried.

The recording medium used in the present invention is preferably substantially non-absorptive to the ink composition. The expression "substantially non-absorptive to the ink composition" means that, upon the deposition of the ink composition onto the recording medium, the ink composition does not permeate the recording medium at all within several seconds after the deposition of the ink composition. Specific examples of recording media, to which the ink jet recording method according to the present invention is applicable, include recording media, formed of, for example, plastics or rubbers, using as a substrate, polyethylene terephthalate, polycarbonate, polysulfone, ABS resin, polyvinyl chloride, polystyrene, poly(meth)acrylate, polyvinyl acetate, AS resin, ACS resin, polyamide, polyurethane, natural rubber, butadiene-styrene copolymer, nitrile rubber, chloroprene, polyisoprene, or butyl rubber; recording media having a metallic surface of brass, iron, aluminum, SUS, copper or the like; metal-coated recording media formed, for example, by depositing a metal onto a nonmetallic substrate by vapor deposition; recording media formed, for example, by coating a resin onto a paper substrate; recording media formed, for example, by subjecting the surface of a fiber, such as cloth, to water repellency-imparting treatment; and recording media formed of the so-called "ceramic material," formed by baking an inorganic material at a high temperature.

Ink Composition

The ink composition used in the method according to the present invention comprises at least a colorant, resin emulsion particles, a water-soluble organic solvent, and water. In the present invention, the term "ink composition" refers to black ink compositions in the case of monochromic printing and color ink compositions in the case of color printing, specifically yellow, magenta, and cyan ink compositions, and, optionally black ink compositions.

1. Colorant

The colorant contained in the ink composition for use in the method according to the present invention may be either a dye or a pigment. The colorant is preferably a pigment from the viewpoints of lightfastness and waterfastness. Further, the combined use of a pigment and a dye is also possible.

Various dyes commonly used in ink jet recording, such as direct dyes, acid dyes, foodstuff dyes, basic dyes, reactive dyes, disperse dyes, vat dyes, soluble vat dyes, and reactive disperse dyes, may be used as the dye.

The pigment is not particularly limited, and any of inorganic and organic pigments may be used as the pigment. Inorganic pigments include, in addition to titanium oxide and iron oxide, carbon blacks produced by known processes, such as contact, furnace, and thermal processes. Organic pigments usable herein include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye-type chelate pigment (for example, basic dye-type chelate pigments and acid dye-type chelate pigments), nitro pigments, nitroso pigments, and aniline black.

Carbon blacks usable for black inks include: carbon blacks manufactured by Mitsubishi Chemical Corporation, for example, No. 2300, No. 900, MCF 88, No. 33, No. 40, No. 45, No. 52, MA 7, MA 8, MA 100, and No. 2200 B; carbon blacks manufactured by Columbian Carbon Co., Ltd., for example, Raven 5750, Raven 5250, Raven 5000, Raven 3500, Raven 1255, and Raven 700; carbon blacks manufactured by Cabot Corporation, for example, Regal 400 R, Regal 330 R, Regal 660 R, Mogul L, Monarch 700, Monarch 800, Monarch 880, Monarch 900, Monarch 1000, Monarch 1100, Monarch 1300, and Monarch 1400; and carbon blacks manufactured by Degussa, for example, Color Black FW 1, Color Black FW 2, Color Black FW 2 V, Color Black FW 18, Color Black FW 200, Color Black S 150, Color Black S 160, Color Black S 170, Printex 35, Printex U, Printex V, Printex 140 U, Special Black 6, Special Black 5, Special Black 4A, and Special Black 4.

Pigments for yellow inks include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14C, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 119, C.I. Pigment Yellow 110, C.I. Pigment Yellow 114, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 180, and C.I. Pigment Yellow 185.

Pigments for magenta inks include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112, C.I. Pigment Red 122, C.I. Pigment Red 123, C.I. Pigment Red 168, C.I. Pigment Red 184, and C.I. Pigment Red 202.

Pigments for cyan inks include C.I. Pigment Blue 1, C.I. Pigment Blue 2, C.I. Pigment Blue 3, C.I. Pigment Blue 15:3, C.I. Pigment Blue 15:4, C.I. Pigment Blue 15:34, C.I. Pigment Blue 16, C.I. Pigment Blue 22, C.I. Pigment Blue 60, C.I. Vat Blue 4, and C.I. Vat Blue 60.

For these pigments, the particle diameter is about 500 nm or less, preferably about 200 nm or less, more preferably about 100 nm or less.

The content of the colorant in the ink composition according to the present invention is preferably about 1 to 20% by weight, more preferably 1 to 10% by weight, based on the ink composition. When the colorant content falls within the above range, good ejection stability can be realized in ink jet recording.

A. Dispersant

According to a preferred embodiment of the present invention, the pigment is added, to the ink composition, as a pigment dispersion prepared by dispersing the pigment in an aqueous medium with the aid of a dispersant. Dispersants usable for the preparation of the pigment dispersion include dispersants commonly used in the preparation of pigment dispersions, for example, polymeric dispersants and surfactants. It would be apparent to a person having ordinary skill in the art that the surfactant contained in the pigment dispersion would function also as a surfactant for the ink composition. Examples of preferred polymeric dispersants include naturally occurring polymeric compounds, and specific examples thereof include: proteins, such as glue, gelatin, casein, and albumin; naturally occurring rubbers, such as gum arabic and tragacanth; glucosides, such as saponin; alginic acid and alginic acid derivatives, such as propylene glycol alginate, triethanolamine alginate, and ammonium alginate; and cellulose derivatives, such as methylcellulose, carboxymethylcellulose, hydroxyethylcellulose, and ethylhydroxycellulose. Examples of additional preferred polymeric dispersants include synthetic polymers, and examples thereof include: polyvinyl alcohols; polyvinyl pyrrolidones; acrylic resins, such as polyacrylic acid, acrylic acid/acrylonitrile copolymer, potassium acrylate/acrylonitrile copolymer, vinyl acetate/acrylic ester copolymer, and acrylic acid/acrylic ester copolymer; styrene/acryl resins, such as styrene/acrylic acid copolymer, styrene/methacrylic acid copolymer, styrene/methacrylic acid/acrylic ester copolymer, styrene/α-methylstyrene/acrylic acid copolymer, and styrene/α-methylstyrene/acrylic acid/acrylic ester copolymer; styrene/maleic acid copolymer; styrene/maleic anhydride copolymer; vinylnaphthalene/acrylic acid copolymer; vinylnaphthalene/maleic acid copolymer; vinyl acetate copolymers, such as vinyl acetate/ethylene copolymer, vinyl acetate/fatty acid vinylethylene copolymer, vinyl acetate/maleic ester copolymer, vinyl acetate/crotonic acid copolymer, and vinyl acetate/acrylic acid copolymer; and salts of the above polymers. Among them, a copolymer of a monomer having a hydrophobic group in its molecular structure with a monomer having a hydrophilic group in its molecular structure and a polymer of a monomer having both a hydrophobic group and a hydrophilic group in its molecular structure are particularly preferred.

The content of the dispersant in the ink composition is about 0.1 to 20% by weight, preferably about 0.1 to 10% by weight.

B. Colorant Possessing Ultraviolet Absorbing Activity and/or Photostabilizing Activity According to a preferred embodiment of the present invention, the colorant comprises a dye or a pigment included in a specific polymer and is in a fine particle form. Further, according to the present invention, this polymer has in its molecular chain sites possessing ultraviolet absorbing activity and/or photostabilizing activity. Ink compositions using this colorant are considered to impart lightfastness to images printed on recording media. The dye or the pigment as the colorant may be the same as described above.

According to a preferred embodiment of the present invention, this polymer refers to a homo- or co-polymer of a monomer having a site possessing ultraviolet absorbing activity and/or photostabilizing activity, or a polymer onto which a site possessing ultraviolet absorbing activity and/or photostabilizing activity has been graft polymerized.

According to a preferred embodiment of the present invention, the site possessing ultraviolet absorbing activity and/or photostabilizing activity refers to a site which is selected from the group consisting of aromatic monocyclic hydrocarbon groups, fused polycyclic aromatic hydrocarbon groups, heteromonocyclic groups, and fused heterocyclic groups and has absorption in the wavelength range of 200 to 400 nm. Specific examples of sites possessing ultraviolet absorbing activity and/or photostabilizing activity include benzotriazole, benzophenone, salicylate, cyanoacrylate, hindered phenol, and hindered amine skeletons.

Specific structures of these skeletons are as follows.

Benzophenone skeleton:

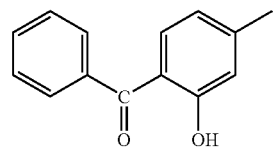

Benzotriazole skeleton:

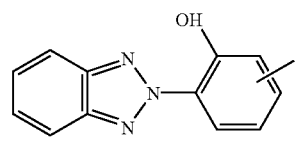

Hindered phenol skeleton:

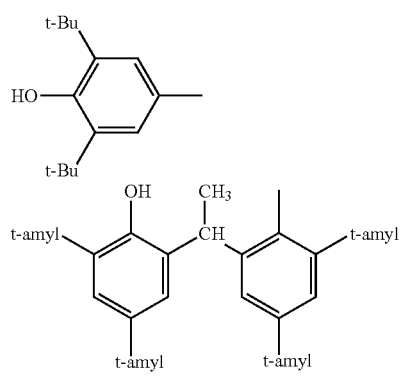

Salicylate skeleton:

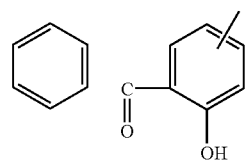

Cyanoacrylate skeleton:

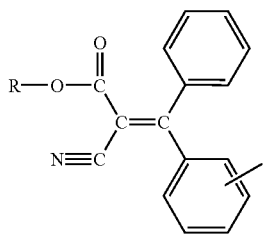

Hindered amine skeleton:

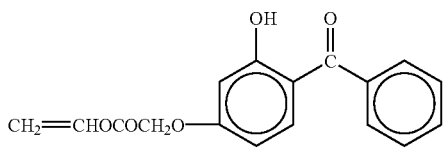

In the present invention, the polymer having in its molecular chain sites possessing ultraviolet absorbing activity and/or photostabilizing activity may be produced as a homopolymer by polymerizing a monomer having a site possessing ultraviolet absorbing activity and/or photostabilizing activity, or as a copolymer by copolymerizing the monomer with other comonomer. Alternatively, the polymer having in its molecular chain sites possessing ultraviolet absorbing activity and/or photostabilizing activity may be produced by graft polymerizing a site possessing ultraviolet absorbing activity and/or photostabilizing activity onto a polymer. Preferred monomers having a site possessing ultraviolet absorbing activity and/or photostabilizing activity, for use in such production processes include monomers containing a site possessing ultraviolet absorbing activity and/or photostabilizing activity, and having an ethylenically unsaturated bond. Specific examples of such monomers include benzotriazole ultraviolet absorbers having an ethylenically unsaturated bond, benzophenone ultraviolet absorbers having an ethylenically unsaturated bond, salicylate ultraviolet absorbers having an ethylenically unsaturated bond, cyanoacrylate ultraviolet absorbers having an ethylenically unsaturated bond, hindered phenol ultraviolet absorbers having an ethylenically unsaturated bond, and hindered amine photostabilizers having an ethylenically unsaturated bond. Further, in these monomers, the ethylenically unsaturated bond may be provided as a methacryloyl, acryloyl, vinyl, or allyl group.

Specific examples of such monomers are as follows. At the outset, the following monomers may be mentioned as specific examples of monomers having an ultraviolet absorbing site with a benzophenone skeleton:

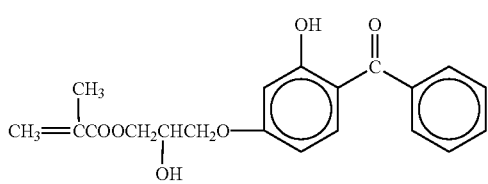

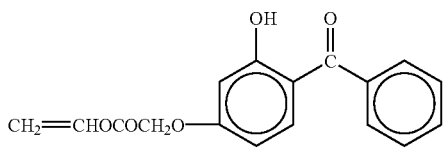

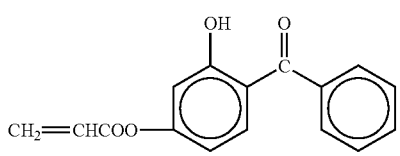

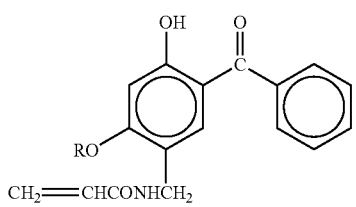

$R = CH_3, (CH_2)_7CH_3$

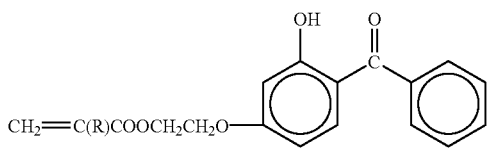

$R = H, CH_3$

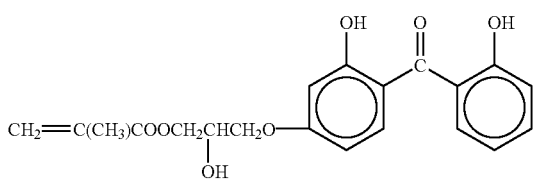

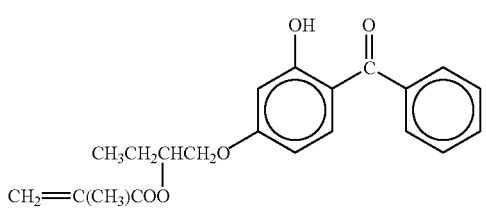

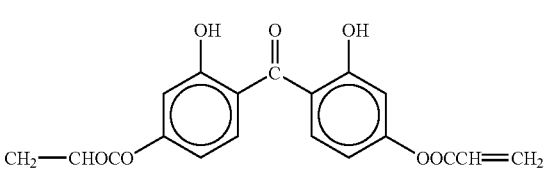

Specific examples of monomers having an ultraviolet absorbing site with a benzotriazole skeleton are as follows:

11
12
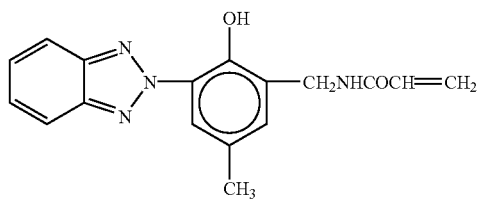
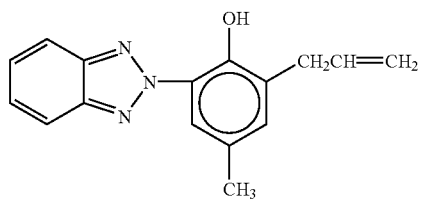
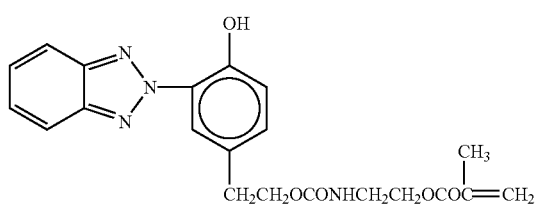
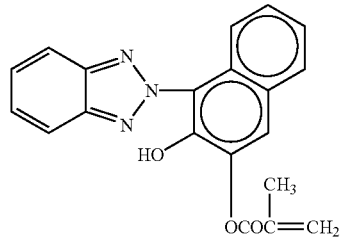
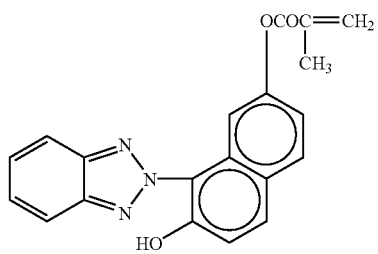
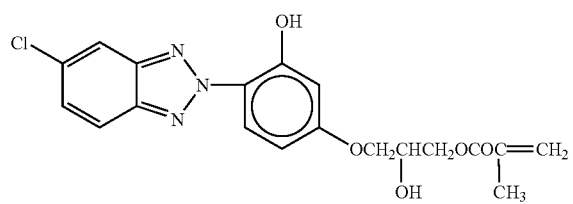
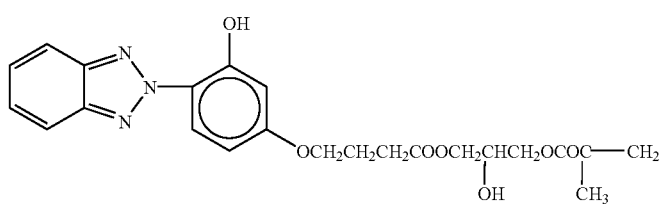
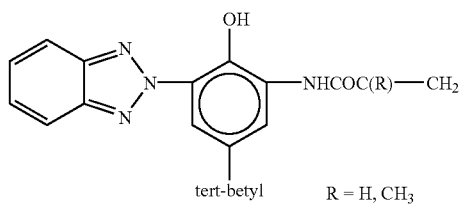
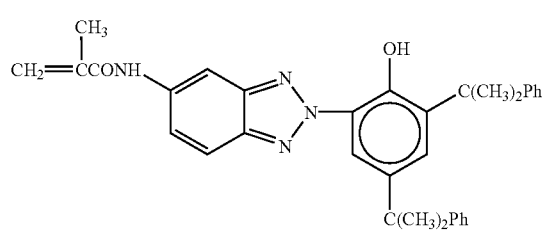
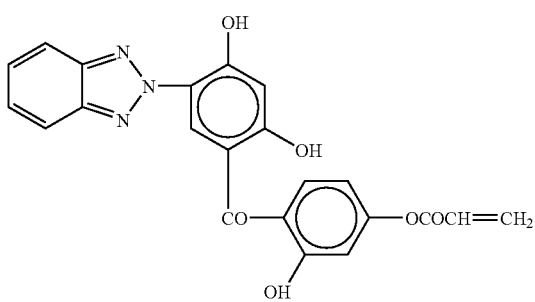
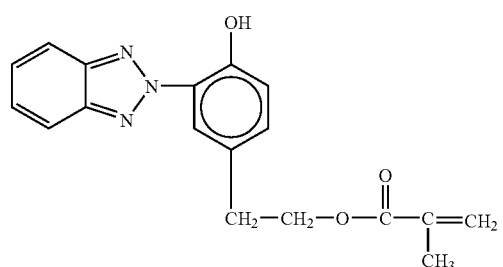

Specific examples of monomers having an ultraviolet absorbing site with a hindered phenol skeleton are as follows:
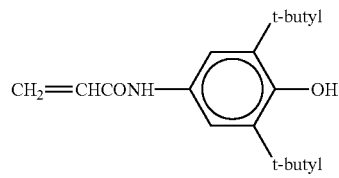
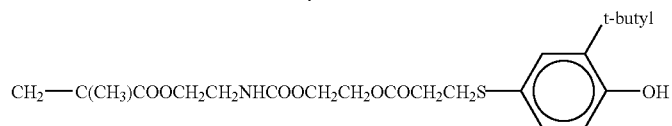
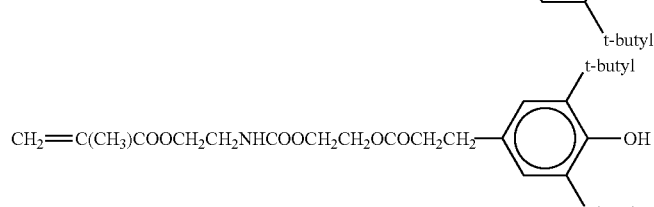
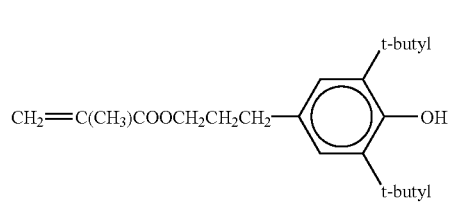
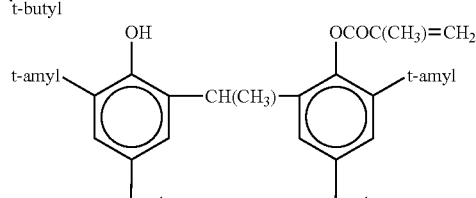
Specific examples of monomers having a photostabilizing site with a hindered amine skeleton are as follows:
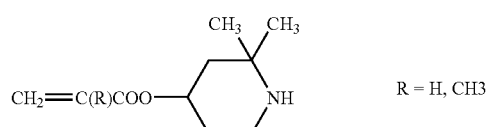  R = H, CH3
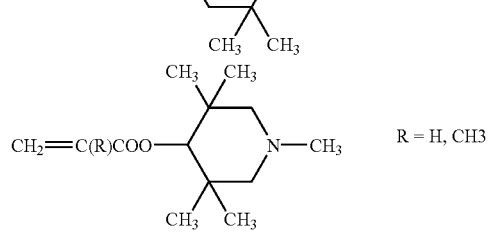  R = H, CH3
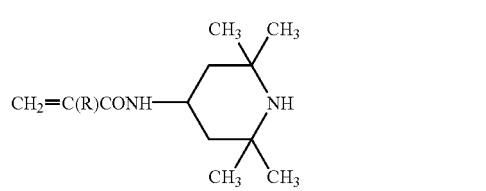
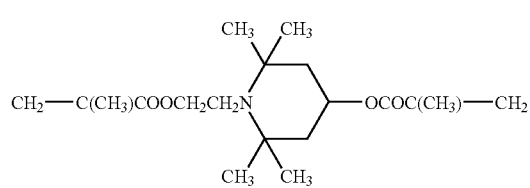
-continued
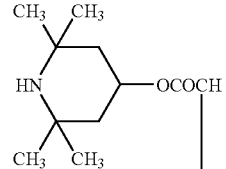
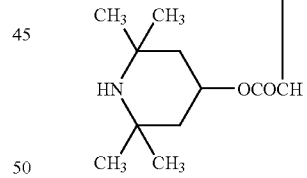
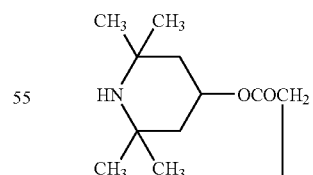
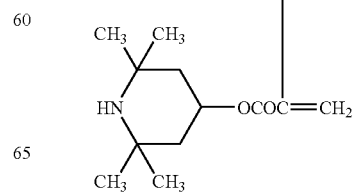

Monomers having sites possessing ultraviolet absorbing activity and/or photostabilizing activity may also be commercially available ones. Examples thereof include: RUVA-93 (2-(2'-hydroxy-5-methylacryloxyethylphenyl)-2H-benzotriazole), available from Otsuka Chemical Co., Ltd., as the monomer having an ultraviolet absorbing site with a benzotriazole skeleton; and ADK STAB LA-82 (1,2,2,6,6-pentamethyl-4-piperidyl methacrylate) and ADK STAB LA-87 (2,2,6,6-tetramethyl-4-piperidyl methacrylate), available from Asahi Denka Kogyo Ltd., as the monomer having a photostabilizing site with a hindered amine skeleton.

Examples of monomers copolymerizable with the above monomers include: vinyl esters, for example, acrylic esters or methacrylic esters, such as methyl (meth)acrylate, ethyl (meth)acrylate, isopropyl (meth)acrylate, n-butyl (meth)acrylate, isobutyl (meth)acrylate, n-amyl (meth)acrylate, isoamyl (meth)acrylate, n-hexyl (meth)acrylate, 2-ethylhexyl (meth)acrylate, octyl (meth)acrylate, decyl (meth)acrylate, dodecyl (meth)acrylate, octadecyl (meth)acrylate, cyclohexyl (meth)acrylate, phenyl (meth)acrylate, benzyl (meth)acrylate, 2-hydroxylethyl (meth)acrylate, hydroxypropyl (meth)acrylate, glycidyl methacrylate, and glycidyl acrylate, and vinyl acetate; acrylonitrile, methacrylonitrile and the like; aromatic vinyl compounds, such as styrene, 2-methylstyrene, vinyltoluene, t-butylstyrene, chlorostyrene, vinylanisole, vinylnaphthalene, and divinylbenzene; halogenated vinylidenes, such as vinylidene chloride and vinylidene fluoride; ethylene, propylene, isopropylene, butadiene, vinylpyrrolidone, vinyl chloride, vinyl ether, vinyl ketone, chloroprene and the like, and carboxyl-containing compounds, for example, ethylenically unsaturated carboxylic acids, such as acrylic acid, methacrylic acid, maleic acid, or monoalkyl esters thereof, itaconic acid or monoalkyl esters thereof, fumaric acid or monoalkyl esters thereof; amido-containing compounds, such as acrylamide and N,N-dimethylacrylamide, and alkylamino esters of acrylic acid or methacrylic acid, for example, amino-containing compounds, such as N-methylaminoethyl methacrylate, N-methylaminoethyl acrylate, dimethylaminoethyl methacrylate, dimethylaminoethyl acrylate, diethylaminoethyl methacrylate, and diethylaminoethyl methacrylate; unsaturated amides containing an alkylamino group, such as N-(2-dimethylaminoethyl) acrylamide, N-(2-dimethylaminoethyl)methacrylamide, and N,N-dimethylaminopropylacrylamide, monovinylpyridines, such as vinylpyridine, and vinyl ethers containing an alkylamino group, such as dimethylaminoethyl vinyl ether; and vinylimidazole and the like and compounds containing a sulfonic group, such as vinylsulfonic acid, styrenesulfonic acid and salts thereof and 2-acryloylamino-2-methylpropanesulfonic acid and salts thereof. These monomers may be used alone or as a mixture of two or more. Copolymers produced from these monomers include ethylene/vinyl acetate copolymer, ethylene/ethyl acrylate copolymer, polyethylene, polypropylene, polystyrene, poly(meth)acrylic ester, styrene/(meth)acrylic ester copolymer, styrene/maleic acid copolymer, styrene/itaconic ester copolymer, polyvinyl acetate, polyester, polyurethane, and polyamide.

According to a preferred embodiment of the present invention, the polymer having in its molecular chain sites possessing ultraviolet absorbing activity and/or photostabilizing activity is thermoplastic.

Polymers produced by graft polymerizing monomers having a site possessing ultraviolet absorbing activity and/or photostabilizing activity include homo- or co-polymers of the above monomers.

According to the present invention, a colorant is provided wherein a dye or a pigment is included in the above polymer, the colorant being in a fine particle form. According to a preferred embodiment of the present invention, the colorant in a fine particle form may be produced, for example, by a mixing method wherein a dye or a pigment is mixed with the polymer, a microencapsulation method wherein a dye or a pigment is encapsulated with the polymer, an emulsion polymerization method wherein a dye or a pigment is dissolved in a monomer followed by emulsion polymerization, or a micro-emulsification method.

The microencapsulation method, wherein a dye or a pigment is encapsulated with the polymer, may be carried out by interfacial polymerization, in-situ polymerization, coacervation, submerged drying, melt-dispersion cooling, spray-drying, or submerged curing-coating. More specifically, methods for producing colored resin emulsion particles comprising a dye or a pigment included in a polymer may be used which are disclosed, for example, in Japanese Patent Laid-Open Nos. 279073/1997, 176130/1998, or 239392/1993.

The colorant having ultraviolet absorbing activity and/or photostabilizing activity is preferably produced by emulsion polymerization. Specifically, the emulsion polymerization may be carried out by dispersing a dye or a pigment in a monomer component for constituting a polymer, subjecting this monomer and a monomer having a site possessing ultraviolet absorbing activity or photostabilizing activity to emulsion polymerization in water in the presence of a polymerization catalyst and an emulsifier.

According to a preferred embodiment of the present invention, the colorant having ultraviolet absorbing activity and/or photostabilizing activity has any one of a functional group selected from a carboxyl group or a sulfonic acid group, and preferably further has an amide, hydroxyl, or amino group. These groups may be allowed to exist in the structure of the monomer by the above production method, or alternatively may be added to the surface of fine particles, for example, by graft polymerization after the production of the fine particles.

According to a preferred embodiment of the present invention, the colorant possessing ultraviolet absorbing activity and/or photostabilizing activity is in the form of fine particles having a diameter of about 5 to 500 nm, more preferably about 5 to 200 nm.

The content of the dye or the pigment in the colorant having ultraviolet absorbing activity and/or photostabilizing activity may be properly determined so far as the color development is not sacrificed. Therefore, the dye or pigment content is preferably about 0.1 to 99% by weight, more preferably 5 to 90% by weight, based on the colorant to which the properties of the polymer have been imparted.

The ink composition according to the present invention may further comprise other dye and/or pigment in addition to the above colorant. In particular, the combined use of the colorant and resin emulsion particles having a film-forming property described below can advantageously realize images possessing better color development, waterfastness, rubbing/scratch resistance, and lightfastness.

Further, according to a preferred embodiment of the present invention, the polymer including the dye or the pigment has a film-forming property. According to a preferred embodiment of the present invention, when the polymer is in a colorant form, the polymer preferably has a glass transition point of 30° C. or below. The term "minimum film-forming temperature" used herein refers to a minimum temperature at which, when a dispersion prepared by dispersing the colorant in water is thinly cast onto a sheet of a metal, such as aluminum, to form a coating which is then gradually heated, a continuous film is formed. According to this embodiment, the ink composition according to the present invention can surely form a film at room temperature, resulting in improved fast drying properties, drying to the touch, rubbing/scratch resistance, and waterfastness of prints.

C. Water-Based Pigment Dispersion

According to a preferred embodiment of the present invention, the colorant may be a water-based pigment dispersion. The "water-based pigment dispersion" according to the present invention comprises minute and stable encapsulated particles of a pigment encapsulated in a polymer produced from a polymerizable surfactant having both nonionic hydrophilicity and anionic hydrophilicity and a monomer.

The "water-based pigment dispersion" refers to a stable dispersion of minute and stable encapsulated particles of a pigment in an aqueous medium. The polymerizable surfactant having both anionic hydrophilicity and nonionic hydrophilicity adsorbs on the surface of pigment particles, has excellent dispersion stability even under conditions for subsequent polymerization, that is, can prevent coagulation among particles, and thus advantageously can easily form encapsulated particles. The pigment for use in the water-based pigment dispersion may be the same as described above.

The water-based pigment dispersion according to the present invention has excellent dispersion stability. The reason for this has not been fully elucidated yet. However, it is believed that, as described above, as compared with mere adsorption of a dispersant on the surface of pigment particles inspired by van der Waals forces, the encapsulation of the pigment can provide mechanically stronger fixation of the dispersant on the surface of pigment particles. The above theory is used only for explaining the present invention, and should not be construed as limiting the scope of the present invention.

According to the present invention, when the water-based pigment dispersion is used as the colorant, the content of the water-based pigment dispersion is preferably about 1 to 20% by weight, more preferably about 1 to 10% by weight, based on the ink composition. When the content of the water-based pigment dispersion is not less than 1% by weight, satisfactory print density can be advantageously provided. On the other hand, when the content of the pigment dispersion is not more than 20% by weight, the viscosity of the ink composition is brought to a viscosity range suitable as an ink for ink jet recording. This enables the ejection stability to be maintained.

The pigment used in the water-based pigment dispersion may be the same as described above. The amount of the pigment added is preferably about 5 to 50% by weight, more preferably about 5 to 30% by weight, based on the water-based pigment dispersion.

Preferred polymerizable surfactants having both anionic hydrophilicity and nonionic hydrophilicity usable in the present invention include compounds represented by formula (I). Polymerizable surfactants represented by formula (I) are disclosed in Japanese Patent Laid-Open Nos. 320276/1993 and 316909/1998.

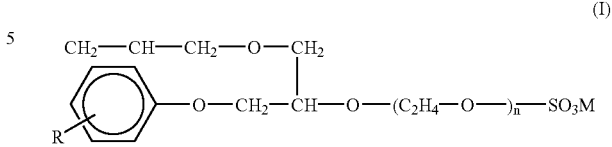

wherein
R represents a hydrogen atom or a hydrocarbon residue having 1 to 12 carbon atoms;
n is a number of 2 to 20; and
M represents an alkali metal atom (preferably lithium, sodium, or potassium), an ammonium salt, or an alkanolamine.

Properly regulating R and n value in formula (I) can cope with the hydrophilicity or the hydrophobicity of the surface of the pigment. Specific examples of preferred polymerizable surfactants represented by formula (I) include compounds represented by formulae (II) to (V). They may be used alone or as a mixture of two or more.

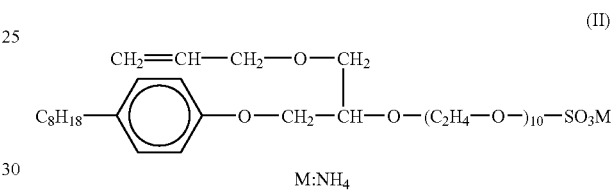

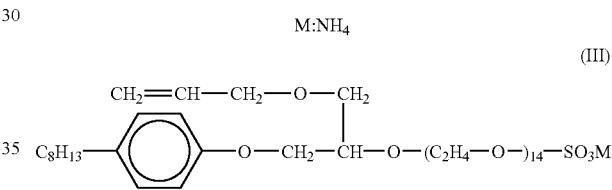

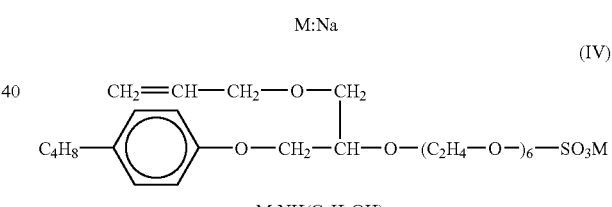

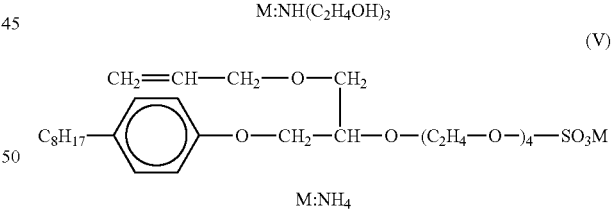

According to the present invention, commercially available products may also be used as the polymerizable surfactant, and examples thereof include Aqualon HS Series manufactured by Dai-Ichi Kogyo Seiyaku Co., Ltd. (Aqualon HS-05, HS-10, HS-20, and HS-1025), Aqualon RN Series manufactured by Dai-Ichi Kogyo Seiyaku Co., Ltd. (RN-10, RN-20, RN-30, RN-50, and RN-2025), New Frontier Series manufactured by Dai-Ichi Kogyo Seiyaku Co., Ltd. (New Frontier N-177E and S-510), Adeka Reasoap SE Series manufactured by Asahi Denka Kogyo Ltd., and Adeka Reasoap NE Series manufactured by Asahi Denka Kogyo Ltd. (NE-10, NE-20, NE-30, NE-40, and NE-50). According to a preferred embodiment of the present invention, the polymerizable surfactant is preferably copolymerized, although the polymerizable surfactant may be homopolymerized.

The amount of the polymerizable surfactant added is preferably about 10 to 150% by weight, more preferably abut 20 to 100% by weight, based on the pigment. The addition of the polymerizable surfactant in an amount of not less than 10% by weight can improve the dispersion stability of the ink composition. The addition of the polymerizable surfactant in an amount of not more than 150% by weight can inhibit the occurrence of the polymerizable surfactant remaining unadsorbed on the pigment and can prevent a polymer other than that involved in encapsulated particles from being produced. This can improve the ejection stability of the ink composition.

Any monomer may be used in the present invention so far as the monomer is highly copolymerizable with the polymerizable surfactant. Since, however, the polymerizable surfactant represented by formula (I) is a monomer having a high electron donating property, the monomer according to the present invention preferably has a high electron accepting property. Specific examples of the monomer having a high electron accepting property include: acrylonitrile, fumaronitrile; diesters of fumaric acid, such as dibutyl fumarate; diesters of maleic acid, such as dibutyl maleate; maleimides, such as N-phenylmaleimide; and vinylidene cyanide. They may be used alone or as a mixture of two or more.

Examples of monomers usable in the present invention include acrylic acid, acrylic esters, methacrylic acid, and methacrylic esters. Specific examples thereof include acrylic acid, methyl acrylate, ethyl acrylate, n-butyl acrylate, butoxyethyl acrylate, benzyl acrylate, phenyl acrylate, phenoxyethyl acrylate, cyclohexyl acrylate, dicyclopentanyl acrylate, dicyclopentynyl acrylate, dicyclopentynyloxyethyl acrylate, tetrahydrofurfuryl acrylate, isobornyl acrylate, 2-hydroxyethyl acrylate, 2-hydroxypropyl acrylate, 2-acryloyloxyethylsuccinic acid, 2-acryloyloxyethylphthalic acid, caprolactone acrylate, glycidyl acrylate, methacrylic acid, methyl methacrylate, ethyl methacrylate, n-butyl methacrylate, 2-ethylhexyl methacrylate, butoxymethyl methacrylate, benzyl methacrylate, phenyl methacrylate, phenoxyethyl methacrylate, cyclohexyl methacrylate, dicyclopentanyl methacrylate, dicyclopentenyl methacrylate, dicyclopentenyloxyethyl methacrylate, tetrahydrofurfuryl methacrylate, isobornyl methacrylate, 2-hydroxyethyl methacrylate, 2-hydroxypropyl methacrylate, 2-hydroxybutyl methacrylate, glycerol methacrylate, 2-methacryloyloxyethylsuccinic acid, 2-methacryloyloxyethylphthalic acid, caprolactone methacrylate, glycidyl methacrylate, sulfoethyl methacrylate, butylacrylamidosulfonic acid, phosphoethyl methacrylate, ethylene glycol diacrylate, diethylene glycol diacrylate, triethylene glycol diacrylate, tetraethylene glycol diacrylate, polyethylene glycol diacrylate, allyl acrylate, bis(acryloxyethyl)hydroxyethyl isocyanurate, bis(acryloxyneopentyl glycol) azipate, 1,3-butylene glycol diacrylate, 1,6-hexanediol diacrylate, neopentyl glycol diacrylate, propylene glycol diacrylate, polypropylene glycol diacrylate, 2-hydroxy-1,3-diacryloxypropane, 2,2-bis[4-(acryloxy)phenyl]propane, 2,2-bis[4-(acryloxyethoxy)phenyl]propane, 2,2-bis[4-(acryloxyethoxy or diethoxy)phenyl]propane, 2,2-bis[4-(acryloxyethoxy or polyethoxy)phenyl]propane, hydroxypivalic acid neopentyl glycol diacrylate, 1,4-butanediol diacrylate, dicyclopentanyl diacrylate, dipentaerythrital hexaacrylate, dipentaerythritol monohydroxypentaacrylate, ditrimethylolpropane tetraacrylate, pentaerythritol triacrylate, tetrabromobisphenol A diacrylate, triglycerol diacrylate, trimethylolpropane triacrylate, tris(acryloxyethyl) isocyanurate, ethylene glycol dimethacrylate, diethylene glycol dimethacrylate, triethylene glycol dimethacrylate, tetraethylene glycol dimethacrylate, polyethylene glycol dimethacrylate, propylene glycol dimethacrylate, polypropylene glycol dimethacrylate, 1,3-butylene glycol dimethacrylate, 1,4-butanediol dimethacrylate, 1,6-hexanediol dimethacrylate, neopentyl glycol dimethacrylate, 2-hydroxy-1,3-dimethacryloxypropane, 2,2bis[4-(methacryloxy)phenyl]propane, 2,2-bis[4-(methacryloxyethoxy)phenyl]propane, 2,2-bis[4-(methacryloxyethoxydiethoxy)phenyl]propane, 2,2-bis[4-(methacryloxyethoxypolyethoxy)phenyl]propane, tetrabromobisphenol A dimethacrylate, dicyclopentanyl dimethacrylate, dipentaerythritol hexamethacrylate, glycerol dimethacrylate, hydroxypivalic acid neopentyl glycol dimethacrylate, dipentaerythritol monohydroxypentamethacrylate, ditrimethylolpropane tetramethacrylate, pentaerythritol trimethacrylate, pentaerythritol tetramethacrylate, triglycerol dimethacrylate, and trimethylolpropane trimethacrylate.

The amount of the monomer added is preferably about 2 to 15 moles, more preferably about 3 to 12 moles, based on one mole of the polymerizable surfactant. The addition of the monomer in an amount of not less than 2 moles based on one mole of the polymerizable surfactant can provide encapsulated pigment particles having excellent dispersion stability in an aqueous medium. On the other hand, the addition of the monomer in an amount of not more than 15 moles based on one mole of the polymerizable surfactant can enhance the dispersion stability of the ink composition, because the monomer can be satisfactorily dissolved in an adsorbed layer of the polymerizable surfactant and this can inhibit the production of water-insoluble polymer and can inhibit a relative reduction in the amount of ionic repellent groups.

Polymerization initiators usable in the present invention include potassium persulfate, ammonium persulfate, sodium persulfate, 2,2-azobis(2-methylpropionamidine) dihydrochloride, and 4,4-azobis(4-cyanovaleric acid).

The water-based pigment dispersion according to the present invention may be produced as follows.

Specifically, the water-based pigment dispersion may be produced by immobilizing a polymerizable surfactant on a pigment, that is, by encapsulization of a pigment. More specifically, a pigment and a polymerizable surfactant are added to an aqueous organic solvent and/or water, and the mixture is wet ground, for example, by ultrasonics, ball mill, or sand grinder. Thereafter, a monomer to be copolymerized and/or a polymerization initiator optionally while continuing grinding are added, and a polymerization reaction is allowed to proceed at 40 to 100° C. for 10 to 60 hr. Thus, encapsulated pigment particles can be prepared. The amount of the polymerization initiator added is preferably 0.1 to 10% by weight, more preferably 1 to 5% by weight, based on the monomer.

The encapsulated pigment particles thus obtained are then centrifuged or filtered to remove coarse particles. Water-soluble organic solvents, such as alcohols, glycols, or amides, water-soluble polymers, surfactants, fungicides and the like may be then added according to contemplated applications. Thus, the water-based pigment dispersion according to the present invention is prepared. More preferably, the water-based pigment dispersion may be prepared according to a production process described in Japanese Patent Laid-Open No. 316909/1998.

2. Resin Emulsion Particles

The ink composition according to the present invention contains resin emulsion particles. The term "resin emulsion particles" used in the present invention refers to fine particles of a polymer component, that is, fine particles of a polymer. The "resin emulsion particles" are preferably formed of a polymer having a film-forming property. The term "resin emulsion" used herein refers to an aqueous dispersion comprising water as a continuous phase and resin emulsion particles as dispersed particles. The "resin emulsion" is often called "polymer emulsion" or "aqueous (water-based) emulsion."

According to the present invention, specific examples of the polymer component constituting the resin emulsion particles include styrene/(meth)acrylic acid copolymer, styrene/(meth)acrylic ester/(meth)acrylic acid copolymer, poly(meth)acrylic ester, styrene/butadiene copolymer, polybutadiene, acrylonitrile/butadiene copolymer, chloroprene copolymer, polyolefine, polystyrene, polyvinyl acetate, polyamide, ethylene/vinyl acetate copolymer, vinyl acetate/acrylic ester copolymer, and polyurethane. According to the present invention, the resin emulsion particles have the effect of promoting the fixation of the colorant onto the surface of the recording medium through an interaction between the resin emulsion particles and the reactant contained in a reaction solution described below, especially a polyvalent metal ion or a polyallylamine or a polyallylamine derivative.

The content of the resin emulsion particles may be properly determined by the content based on the ink composition, and thus is about 0.1 to 30% by weight, preferably 5 to 30% by weight, based on the ink composition.

According to the present invention, in the resin emulsion, the ratio of the resin emulsion particles to water is about 1:1 to 4, preferably about 1:1 to 3. According to a preferred embodiment of the present invention, the resin emulsion particles are formed of a polymer component having both hydrophilic moiety and hydrophobic moiety. The average molecular weight of the resin emulsion particles is not less than about 5,000, preferably not less than about 10,000. The average molecular weight of the resin emulsion particles is measured by removing the water component from the resin emulsion to provide the polymer, dissolving the polymer in an organic solvent, such as tetrahydrofuran, and then subjecting the solution to gel permeation chromatography (GPC). The correction of the molecular weight is carried out using monodispersed polystyrene.

The average particle diameter of the resin emulsion particles is preferably not more than about 400 nm, more preferably about 100 to 200 nm, still more preferably about 10 to 100 nm. The average particle diameter of the resin emulsion particles may be measured by a conventional method. In particular, the average particle diameter is preferably measured by laser scatting.

According to a preferred embodiment of the present invention, the glass transition point of the resin emulsion particles is about 30° C. or below, preferably about 25° C. or below, more preferably about 20° C. or below.

According to a preferred embodiment of the present invention, the minimum film-forming temperature of the resin emulsion containing resin emulsion particles is about 30° C. or below, more preferably about room temperature (about 25° C.) or below, still more preferably about 20° C. or below. When the film formation of the resin emulsion can be carried out at about 30° C. or below, film formation on the printed face can advantageously automatically proceed at room temperature or below without heating and drying the printed recording medium, leading to strong fixation of the dye or pigment as the colorant onto the recording medium.

On the other hand, in the recording method according to the present invention, the resin emulsion particles are preferred when the step of heating and drying is not particularly required. According to the recording method of the present invention, the resin emulsion particles are not limited to only those which per se have a glass transition point of about 30° C. or below and, as a resin emulsion, have a minimum film-forming temperature of about 30° C. or below, and resin emulsion particles which per se have a glass transition point above 30° C. and, as a resin emulsion, have a minimum film-forming temperature above 30° C. may also be preferably used. A person having ordinary skill in the art would naturally understand that heating at the minimum film-forming temperature of the resin emulsion results in film formation which enables the colorant component to be fixed onto the recording medium.

Here the term "minimum film-forming temperature" refers to a minimum temperature at which, when a resin emulsion prepared by dispersing resin emulsion particles in water is thinly cast onto a sheet of a metal, such as aluminum, to form a coating which is then gradually heated, a transparent, continuous film is formed. In this case, a white powder is formed in a temperature region below the minimum film-forming temperature.

The term "film-forming property" means that evaporating a water component as a continuous phase of a resin emulsion prepared by dispersing resin emulsion particles in water results in film formation of a polymer. Likewise, in the case of an ink composition with resin emulsion particles added thereto, when water or the aqueous organic solvent is removed from the periphery of the resin emulsion particles (fine particles of polymer), a polymer film is formed. This polymer film functions to strongly fix the colorant contained in the ink composition onto the surface of the recording medium. This can be considered to realize images possessing excellent rubbing/scratch resistance, waterfastness, and weathering resistance.

According to a preferred embodiment of the present invention, the fine particles of the resin emulsion according to the present invention have, on the surface thereof, at least one functional group selected from the group consisting of carboxyl, sulfonic acid, amide, amino, and hydroxyl groups, independently of whether the resin emulsion particles have a single-particle structure or a core-shell structure. In the case of the core-shell structure, the functional group is present in the shell. In particular, the presence of carboxyl groups is preferred. In the production process described below, the functional group may be allowed to exist in the monomer structure. Alternatively, after the production of the resin emulsion particles, the functional group may be added, for example, by graft polymerization onto the surface of the resin emulsion particles.

The presence of the functional group is considered preferable from the viewpoint of the following expected mechanism. However, it should be noted that the following theory is hypothetical and should not be construed as limiting the scope of the present invention. The hydrophilic group, such as carboxyl, sulfonic acid, amide, amino, or hydroxyl group, on the surface of the fine particles of the resin emulsion can combine with a hydroxyl group (OH group) on the surface of non-absorptive recording media having a plastic, rubber, metallic, ceramic or other surface to form a hydrogen bond. Therefore, in the recording method according to the present invention, the functional group can strongly fix the colorant onto the non-absorptive recording medium. In particular, when the structure of the resin emulsion particles is a core-shell structure and, in addition, hydrophilic groups, such as carboxyl, sulfonic acid, amide, amino, or hydroxyl groups, are contained in the shell layer, the proportion of the hydrophilic groups present in the surface of the particles is enhanced. This can further enhance the effect. Further, ink compositions containing resin emulsion particles having these groups do not wet the surface of a nozzle plate, to which water repellency has been imparted, in a recording head of an ink jet printer. By virtue of this property, for example, a failure of ink ejection due to the wetting of the surface of the nozzle plate by the ink and ink droplets trajectory directionality problem can be avoided, and excellent ejection stability can be realized. Further, ink compositions containing resin emulsion particles having these groups possess excellent storage stability.

According to a preferred embodiment of the present invention, the resin emulsion particles according to the present invention have a high capability of forming coagulate with a divalent metal salt. More specifically, the resin emulsion particles have a capability of forming coagulate with a divalent metal salt such that, when 3 volumes of a 0.1 wt % resin emulsion of the fine particles is brought into contact with one volume of a 1 mol/liter aqueous divalent metal salt solution, the time required for the transmission of light having a wavelength of 700 nm to become 50% of the initial value is not more than $1 \times 10^4$ sec, preferably not more than $1 \times 10^3$ sec, more preferably not more than $1 \times 10^2$ sec. The resin emulsion particles, when brought into contact with divalent metal ions, cause coagulation to form suspended matter which lowers the transparency of the solution. The amount of the resultant suspended matter is measured in terms of light transmission. Divalent metal ions include $Ca^{2+}$, $Cu^{2+}$, $Ni^{2+}$, $Mg^{2+}$, $Zn^{2+}$, and $Ba^{2+}$. Anions, which form salts with divalent metal ions, include $Cl^-$, $NO_3^-$, $I^-$, $Br^-$, $ClO_3^-$, and $CH_3COO^-$.

According to a particularly preferred embodiment of the present invention, the resin emulsion particles according to the present invention have carboxyl group on the surface thereof. This can enhance the capability of forming coagulate with the divalent metal salt. More specifically, the resin emulsion particles have a capability of forming coagulate with a divalent metal salt such that, when 3 volumes of a 0.1 wt % resin emulsion of the fine particles is brought into contact with one volume of a 1 mol/liter aqueous divalent metal salt solution, the time required for the transmission of light having a wavelength of 700 nm to become 50% of the initial value is not more than $1 \times 10^4$ sec, preferably not more than $1 \times 10^2$ sec, more preferably not more than 10 sec. The resin emulsion particles, when brought into contact with divalent metal ions, cause coagulation to form suspended matter which lowers the transparency of the solution. The amount of the resultant suspended matter is measured in terms of light transmission. This high level of coagulation property is considered attributable to the fact that the resin emulsion particles having a relatively large number of carboxyl groups on the surface thereof can further enhance the level of the coagulating property. Ink compositions containing resin emulsion particles having, on the surface thereof, a large amount of carboxyl groups do not have any affinity for a nozzle plate, in a head for ink jet recording, which has been subjected to water repellency-imparting treatment. This can provide a great advantage that problems involved in conventional water-soluble resin-containing ink compositions, that is, an ink droplet trajectory directionality problem and a failure of the ink droplets to be ejected, caused by good wettability of the nozzle plate by the ink composition, can be effectively prevented. Further, the use of the resin emulsion particles having a relatively large amount of carboxyl groups can realize better rubbing/scratch resistance and water resistance. Further, the high hydrophilicity of the surface of the resin emulsion particles can advantageously impart excellent storage stability to ink composition.

According to a preferred embodiment of the present invention, the contact angle of a resin emulsion, prepared by dispersing the resin emulsion particles in water to provide a resin emulsion particle concentration of 10% by weight, on a teflon sheet is not less than about 70 degrees, more preferably not less than about 80 degrees. Further, the surface tension of a resin emulsion, prepared by dispersing the resin emulsion particles in water to provide a resin emulsion particle concentration of 35% by weight is not less than about $40 \times 10^{-3}$ N/m (40 dyne/cm, 20° C.), preferably not less than about $50 \times 10^{-3}$ N/m. The utilization of such resin emulsion particles, when the ink composition is used in ink jet recording, can more effectively prevent the ink droplet trajectory directionality problem and, at the same time, can realize good prints.

According to another preferred embodiment of the present invention, the resin emulsion particles contain 1 to 10% by weight of a structure derived from an unsaturated vinyl monomer having a carboxyl group and have a structure crosslinked by a crosslinkable monomer having two or more polymerizable double bonds with the content of the structure derived from the crosslinkable monomer being 0.2 to 4% by weight. The utilization of a three-dimensionally crosslinked polymer prepared by copolymerization of crosslinkable monomers preferably having two or more polymerizable double bonds, more preferably three or more polymerizable double bonds, makes it more difficult for the surface of the nozzle plate to be wetted by the ink composition. This can more effectively prevent the occurrence of the ink droplet trajectory directionality problem and, at the same time, can further improve the ejection stability.

According to the present invention, the resin emulsion particles used may have a single-particle structure. On the other hand, according to the present invention, resin emulsion particles having a core/shell structure may also be utilized. The core/shell structure comprises a core and a shell surrounding the core. The term "core/shell structure" used in the present invention refers to "a form such that two or more polymers having different compositions are present in a phase separated state in a particle." Therefore, forms of the core/shell structure usable in the present invention include a form wherein the core is entirely covered with the shell, a form wherein the core is partially covered with the shell, and a form wherein a part of the polymer constituting the shell forms a domain or the like within the core particle. Further, the particle may have a multi-layer structure of three or more layers wherein at least one additional layer having a different composition is further interposed between the core and the shell.

According to a preferred embodiment of the present invention, in the resin emulsion particles, the core is formed of a polymer having epoxy groups, and the shell is formed of a polymer having carboxyl groups. The epoxy group is reactive with the carboxyl group. These two groups are allowed to exist separately from each other. That is, the epoxy group and the carboxyl group are present respectively in the core and shell, or vice versa. The reduction in the amount of water or the water-soluble organic solvent causes coalescence of the resin emulsion particles (i.e., fine particles of polymer) with one another, and the resin emulsion particles are deformed by pressure involved in the film formation. As a result, the epoxy groups in the core are bonded to the carboxyl groups in the shell to form a network structure. This can advantageously form a coating having higher strength. The amount of the unsaturated vinyl monomer having an epoxy group is preferably 1 to 10% by weight. According to the present invention, a reaction of a part of the epoxy groups with a part of the carboxyl groups before the film formation is acceptable so far as the film-forming property is not lost. In the present invention, the property such that, when reactive functional groups are allowed to coexist within the resin emulsion particles, these groups are reacted with each other without the addition of any curing agent at the time of film formation to form a network structure, will be referred to as "self-crosslinkable."

The resin emulsion according to the present invention may be prepared by mixing water, a monomer, an emulsifier, and a polymerization initiator together, emulsion polymerizing the mixture, and then adjusting the reaction mixture to a desired pH value by the addition of a PH adjustor. According to the present invention, the resin emulsion particles constituting the dispersed phase in the resin emulsion may be produced by an emulsion polymerization reaction of a monomer (particularly an unsaturated vinyl monomer), an emulsifier, and a polymerization initiator.

According to the present invention, a monomer, preferably an unsaturated vinyl monomer, is used. Specific examples of unsaturated vinyl monomers include those commonly used in emulsion polymerization, such as acrylic ester monomers, methacrylic ester monomers, aromatic vinyl monomers, vinyl ester monomers, vinyl cyanide compound monomers, halogenated monomers, olefin monomers, and diene monomers. Specific examples thereof include: acrylic esters, such as methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, and glycidyl acrylate; methacrylic esters, such as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, and glycidyl methacrylate; vinyl esters, such as vinyl acetate; vinyl cyanide compounds, such as acrylonitrile and methacrylonitrile; halogenated monomers, such as vinylidene chloride and vinyl chloride; aromatic vinyl monomers, such as styrene, 2-methylstyrene, vinyltoluene, t-butylstyrene, chlorostyrene, vinylanisole, and vinylnaphthalene; olefins, such as ethylene, propylene, and isopropylene; dienes, such as butadiene and chloroprene; and vinyl monomers, such as vinyl ether, vinyl ketone, and vinylpyrrolidone. In the case of monomers not having a carboxyl group, an unsaturated vinyl monomer having a carboxyl group should be used. Preferred examples thereof include acrylic acid, methacrylic acid, itaconic acid, fumaric acid, and maleic acid. Among them, methacrylic acid is preferred.

According to the present invention, a structure formed by crosslinking of molecules, derived from the above monomers, with a crosslinkable monomer having two or more polymerizable double bonds is preferred. Examples of crosslinkable monomers having two or more polymerizable double bonds include: diacrylate compounds, such as polyethylene glycol diacrylate, triethylene glycol diacrylate, 1,3-butylene glycol diacrylate, 1,6-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropyloxyphenyl)propane, and 2,2'-bis(4-acryloxydiethoxyphenyl)propane; triacrylate compounds, such as trimethylolpropane triacrylate, trimethylolethane triacrylate, and tetramethylolmethane triacrylate; tetraacrylate compounds, such as ditrimethylol tetraacrylate, tetramethylolmethane tetraacrylate, and pentaerythritol tetraacrylate; hexaacrylate compounds, such as dipentaerythritol hexaacrylate; dimethacrylate compounds, such as ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, and 2,2'-bis(4-methacryloxydiethoxyphenyl)propane; trimethacrylate compounds, such as trimethylolpropane trimethacrylate and trimethylolethane trimethacrylate; methylene bisacrylamide; and divinylbenzene.

The addition of a sulfonic acid group-containing monomer, an acrylamide compound, or a hydroxyl-containing monomer in addition to the above monomer can further improve printing stability. Specific examples of acrylamide compounds (acrylamides) include acrylamide and N,N'-dimethylacrylamide. Specific examples of sulfonic acid group-containing monomers include vinylsulfonic acid and salts thereof, styrenesulfonic acid and salts thereof, and 2-acryloylamino-2-methylpropanesulfonic acid and salts thereof. They may be used alone or as a mixture of two or more. Specific examples of hydroxyl-containing monomers include 2-hydroxyethyl acrylate, 2-hydroxypropyl acrylate, 2-hydroxyethyl methacrylate, and 2-hydroxypropyl methacrylate. They may be used alone or as a mixture of two or more.

Emulsifiers include: anionic surfactants, such as salts of alkylallylsulfonic acids or salts of alkylallylsulfuric acids, salts of alkylsulfonic acids or salts of alkylsulfuric acids, and salts of dialkylsulfosuccinic acids; and nonionic surfactants, such as polyoxyethylene nonylphenyl ether, polyoxyethylenestearic esters, polyoxyethylene alkylallyl ethers, and sorbitan monolauric esters.

Polymerization initiators include potassium persulfate and ammonium persulfate. Other ingredients usable herein include polymerization regulators, chain transfer agents, and molecular weight modifiers.

The resin emulsion particles may be produced by mixing a monomer, an emulsifier, a polymerization initiator, and other optional components together and emulsion polymerizing the mixture. The amount of these components added may be properly determined. The above components are placed in a reaction vessel, and are mixed together. The mixture is emulsion polymerized. The emulsion polymerization reaction temperature is 60 to 90° C., preferably about 70 to 80° C.

The resin emulsion particles having a core/shell structure may be produced by conventional methods, generally multi-step emulsion polymerization and the like, for example, by a method disclosed in Japanese Patent Laid-Open No. 76004/1992. Examples of unsaturated vinyl monomers usable in the polymerization include those described above.

Methods usable for the introduction of epoxy group into the core include a method wherein an epoxy-containing unsaturated vinyl monomer, such as glycidyl acrylate, glycidyl methacrylate, or allylglycidyl ether, is copolymerized with other unsaturated vinyl monomer, and a method wherein, in the polymerization of at least one unsaturated vinyl monomer to prepare core particles, an epoxy compound is simultaneously added to form a composite structure. The former method is preferred from the viewpoints of easiness of the polymerization, polymerization stability and the like.

According to the present invention, the resin emulsion particles produced by the emulsion polymerization is adjusted to a desired pH value by the addition of a pH adjustor.

Preferred pH adjustors usable in the present invention include monovalent alkali metal hydroxides and organic amines.

When the pH is adjusted to a desired value by the addition of a monovalent metal hydroxide, the pH value is specifically adjusted to about 7 to 10, preferably about 7 to 9. Therefore, the monovalent metal hydroxide is added in such an amount that the resin emulsion particles are brought to a pH value falling within the above range.

The production process of the resin emulsion will be briefly described. Water and an emulsifier are charged into a reaction vessel equipped, for example, with a stirrer, a reflux condenser, a dropping device, and a thermometer. A polymerization initiator is added thereto, and the mixture is brought to a predetermined temperature. An emulsified monomer is added to the contents of the reaction vessel, and a reaction is allowed to proceed. Thus, a resin emulsion is prepared. The resin emulsion is adjusted to a desired pH value by the addition of a monovalent metal hydroxide. Thus, the resin emulsion according to the present invention is produced.

Further, according to the present invention, conventional resin emulsions may also be used as the resin emulsion satisfying the above requirements. For example, resin emulsions described, for example, in Japanese Patent Publication No. 1426/1987 and Japanese Patent Laid-Open Nos. 56573/1991, 79678/1991, 160068/1991, and 18462/1992 may be used.

D. Fluoroalkyl-Containing Resin Emulsion Particles

According to a preferred embodiment of the present invention, the ink composition comprises a fluoroalkyl-containing resin emulsion particles. Since the ink composition according to the present invention contains this type of resin emulsion particles, the colorant and the resin emulsion particles are left on the surface of the recording medium and, in addition, are strongly fixed onto the surface of the recording medium. This can realize good images possessing rubbing/scratch resistance and weathering resistance. Although the reason why this effect can be attained has not been fully elucidated yet, the reason may be believed to be as follows. It is considered that the presence of the fluoroalkyl group in the resin emulsion particles permits the colorant fixed onto the recording medium to be coated by the fluorine atom and this can enhance the weathering resistance. The above mechanism is hypothetical and should not be construed as limiting the scope of the present invention.

According to a preferred embodiment of the present invention, the fluoroalkyl group is such that 3 to 41 fluorine atoms, preferably 3 to 27 fluorine atoms, are present in a straight-chain or branched alkyl group having 1 to 13 carbon atoms, preferably 3 to 13 carbon atoms. Specific examples of preferred fluoroalkyl groups include —$CF_3$, —$C_2F_5$, —$C_3F_7$, —$C_4F_9$, —$C_5F_{11}$, —$C_6F_{13}$, —$C_7F_{15}$, —$C_8F_{17}$, —$C_9F_{19}$, —$C_{10}F_{21}$, —$C_{11}F_{23}$, —$C_{12}F_{25}$, —$C_{13}F_{27}$, —$CF_2H$, —$C_3F_4H$, —$C_4F_6H$, and —$CF_2CFHCF_3$.

The fluoroalkyl-containing monomer is preferably selected from the group consisting of compounds represented by formulae (VI) to (VIII):

(VI)

(VII)

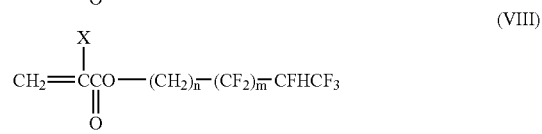

(VIII)

wherein
n is 1 or more; and
m is 1 to 20.

Specific examples of fluoroalkyl-containing monomers include trifluoroethyl methacrylate, heptadecafluorodecyl methacrylate, 2,2,3,3-tetrafluoropropyl methacrylate, 2,2,3,4,4,4-hexafluorobutyl methacrylate, and perfluorooctylethyl methacrylate.

The fluoroalkyl-containing resin emulsion particles have the above properties, and the fundamental structure as resin emulsion particles other than the above properties may be the same as that of the above-described resin emulsion particles.

E. Resin Emulsion Particles Capable of Forming Chelate

According to a preferred embodiment of the present invention, the ink composition contains resin emulsion particles formed of a polymer having a ligand structure, which can combine with a metal ion to form a chelate, and, upon combining with the metal ion to form a chelate, can form coagulate. Since the ink composition according to the present invention contains this type of resin emulsion particles, the colorant and the resin emulsion particles are left on the surface of the recording medium and, in addition, are strongly fixed onto the surface of the recording medium. This can realize good images possessing rubbing/scratch resistance. Although the reason why this effect can be attained has not been fully elucidated yet, it is believed that the resin emulsion particles are formed of a polymer that has a ligand structure, which, together with a metal ion, can form a chelate, and, when combined with the metal ion to form a chelate, can form coagulate. Therefore, the contact of the resin emulsion particles with the reaction solution containing a metal ion is expected to significantly accelerate the formation of coagulate.

According to the present invention, the "ligand structure which, together with a metal ion, can form a chelate" possessed by the resin emulsion particles refers to a structure such that a plurality of atoms capable of feeding electrons for forming a coordination bond are present at suitable spacings and, as a result, can sandwich a metal ion therebetween to form a metal chelate compound.

According to a preferred embodiment of the present invention, examples of preferred "ligand structures" include β-diketone, polyamine, iminodiacetic acid, sarcosine, ethanolamino acid, glycine, xanthogenic acid, amidoxime, amine, pyridine, imidazole, phosphonic acid, phosphinic acid, phosphoric acid, Schiff base, oxime, hydroxame, aminopolycarboxylic acid, thiol, polythioalcohol, 2-pyrrolidone, and 2-oxazolidone structures.

Further, according to a specific embodiment of the present invention, the "ligand structure, which can combine with the metal ion to form a chelate," is represented, for example, by the following formula:

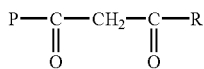

wherein
P represents a polymer structure portion; and
R represents an alkyl group, preferably a $C_{1-20}$ alkyl group, more preferably a $C_{1-10}$ alkyl group, most preferably a methyl group, or an aryl group, for example, a phenyl, naphthyl, or tolyl group.

A possible structure of a metal chelate formed by the ligand structure represented by the above formula and, for example, a divalent metal is considered to be represented by formula:

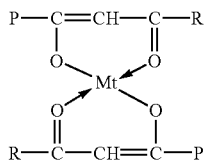

wherein
Mt represents a divalent metal; and
P And R are as defined above.

According to a preferred embodiment of the present invention, monomers which are comonomers of polymers having a ligand structure capable of combining with a metal ion to form a chelate and monomers having a ligand structure capable of combining with a metal ion to form a chelate include 2-acetacetoxyethyl methacrylate, methacryloyl acetone, methacryloyldiacetylmethane, 4-(1,3-dioxypentyl) phenyl-4-(6-acryloyloxyhexyloxy) benzoate, acryloyl acetyl acetone, diethyl acryloylmalonate, diethyl methacryloylmalonate, and 2-(methacryloxy)ethyl acetate.

The resin emulsion particles capable of forming a chelate have the above properties, and the fundamental structure as resin emulsion particles other than the above properties may be the same as that of the above-described resin emulsion particles.

3. Sequestering Agent

According to a preferred embodiment of the present invention, the ink composition according to the present invention contains a sequestering agent. In particular, the sequestering agent is preferably used when the resin emulsion particles capable of forming a chelate are used. According to the present invention, the sequestering agent refers to a compound which can rapidly combine with a divalent or higher metal ion to form a stable water-soluble chelate.

The sequestering agent can effectively capture metal ions as impurities in the ink composition. As a result, the storage stability of the ink composition can be improved, and, in addition, nozzle clogging can be effectively prevented. According to a preferred embodiment of the present invention, the amount of the water-soluble sequestering agent added is in the range of 0.0001 to 5% by weight, more preferably in the range of 0.01 to 0.1% by weight.

According to a preferred embodiment of the present invention, in the production of the ink composition, the sequestering agent is mixed with other ingredients prior to the addition of the resin emulsion particles. This permits metal ions as impurities to be effectively captured.

Examples of sequestering agents usable in the present invention include ethylenediaminetetraacetic acid, iminodiacetic acid, nitriloacetic acid, diethylenetriaminepentaacetic acid, triethylenetetraminehexaacetic acid, cyclohexane-1,2-diaminetetraacetic acid, N-hydroxyethylethylenediaminetriacetic acid, ethylene glycol diethyl ether amine tetraacetic acid, ethylenediaminetetrapropionic acid, pyrophosphoric acid, and triphosphoric acid.

4. Water, Water-Soluble Organic Solvent, and Other Ingredients

The solvent for the ink composition used in the method according to the present invention is composed mainly of water and a water-soluble organic solvent.

According to a preferred embodiment of the present invention, the ink composition used in the present invention further contains a wetting agent comprising a high-boiling organic solvent. Examples of preferred high-boiling organic solvents include: polyhydric alcohols, such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea; 2-pyrrolidone and N-methyl-2-pyrrolidone; 1,3-dimethyl-2-imidazolidinone; and triethanolamine.

Among them, the utilization of water-soluble organic solvents having a boiling point of 180° C. or above is preferred. The use of water-soluble organic solvents having a boiling point of 180° C. or above can impart water retention and wetting properties to the ink composition. As a result, storage of the ink composition for a long period of time neither causes coagulation of colorant nor an increase in the viscosity of the ink composition. Thus, excellent storage stability can be realized. Further, an ink composition can be realized which, even when allowed to stand in an open state, that is, when allowed to stand in contact with air at room temperature, can maintain the fluidity and the redispersibility for a long period of time, and, in addition, when used in ink jet recording, does not cause clogging of nozzles during printing or at the time of restarting after interruption of printing, thus offering high ejection stability.

Examples of water-soluble organic solvents having a boiling point of 180° C. or above include ethylene glycol (b.p.: 197° C.; the boiling point being hereinafter described within parentheses), propylene glycol (187° C.), diethylene glycol (245° C.), pentamethylene glycol (242° C.), trimethylene glycol (214° C.), 2-butene-1,4-diol (235° C.), 2-ethyl-1,3-hexanediol (243° C.), 2-methyl-2,4-pentanediol (197° C.), N-methyl-2-pyrrolidone (202° C.), 1,3-dimethyl-2-imidazolidinone (257–260° C.), 2-pyrrolidone (245° C.), glycerin (290° C.), tripropylene glycol monomethyl ether (243° C.), dipropylene glycol monoethyl glycol (198° C.), dipropylene glycol monomethyl ether (190° C.), dipropylene glycol (232° C.), triethylene glycol monomethyl ether (249° C.), tetraethylene glycol (327° C.), triethylene glycol (288° C.), diethylene glycol monobutyl ether (230° C.), diethylene glycol monoethyl ether (202° C.), and diethylene glycol monomethyl ether (194° C.). Among these water-soluble organic solvents, those having a boiling point of 200° C. or above are particularly preferred. These water-soluble organic solvents may be used alone or as a mixture of two or more.

The water-soluble organic solvent is preferably a low-boiling organic solvent. Examples of preferred low-boiling organic solvents usable herein include methanol, ethanol, n-propyl alcohol, iso-propyl alcohol, n-butanol, sec-butanol, tert-butanol, iso-butanol, and n-pentanol. Particularly preferred are monohydric alcohols.

The content of the water-soluble organic solvent is preferably about 0.5 to 40% by weight, more preferably 2 to 20% by weight, based on the ink composition.

According to a preferred embodiment of the present invention, the ink composition used in the method according to the present invention contains a saccharide, a tertiary amine, an alkali hydroxide, or an alginic acid derivative. The addition of the saccharide and the tertiary amine can impart wetting properties. The addition of the tertiary amine and the alkali hydroxide brings about stable dispersion of the colorant and the resin emulsion particles in the ink composition.

Examples of saccharides include monosaccharides, disaccharides, oligosaccharides (including trisaccharides and tetrasaccharides), and polysaccharides, and preferred examples thereof include glucose, mannose, fructose, ribose, xylose, arabinose, galactose, aldonic acid, glucitol, sorbit, maltose, cellobiose, lactose, sucrose, trehalose, and maltotriose. The polysaccharides refer to saccharides in a wide sense and embrace materials which widely exist in the natural world, such as alginic acid, α-cyclodextrin, and cellulose. Derivatives of these saccharides include reducing sugars of the above saccharides (for example, sugar alcohols represented by the general formula $HOCH_2(CHOH)_nCH_2OH$ wherein n is an integer of 2 to 5), oxidized sugars (for example, aldonic acid and uronic acid), amino acid, and thiosugars. Sugar alcohols are particularly preferred, and specific examples thereof include maltitol and sorbit. The content of the saccharide is preferably about 0.1 to 40% by weight, more preferably about 1 to 30% by weight.

Examples of tertiary amines include trimethylamine, triethylamine, triethanolamine, dimethylethanolamine, diethylethanolamine, triisopropenolamine, and butyldiethanolamine. They may be used alone or as a mixture of two or more. The amount of the tertiary amine added to the ink composition is preferably about 0.1 to 10% by weight, more preferably 0.5 to 5% by weight.

Examples of alkali hydroxides include potassium hydroxide, sodium hydroxide, and lithium hydroxide, and the amount of the alkali hydroxide added to the ink composition is preferably about 0.01 to 5% by weight, more preferably about 0.05 to 3% by weight.

Examples of preferred alginic acid derivatives include alkali metal alginates (for example, sodium salt and potassium salt), organic salts of alginic acid (for example, triethanolamine salt), and ammonium alginate. The amount of the alginic acid derivative added to the ink composition is preferably about 0.01 to 1% by weight, more preferably about 0.05 to 0.5% by weight.

Although the reason why the addition of the alginic acid derivative can realize good images has not been fully elucidated yet, the reason is believed to reside in that the polyvalent metal salt present in the reaction solution reacts with the alginic acid derivative contained in the ink composition to change the state of dispersion of the colorant and consequently to accelerate the fixation of the colorant onto the recording medium.

The ink composition used in the method according to the present invention may further contain a surfactant. Examples of suitable surfactants usable herein include those described above in connection with the preparation of resin emulsion particles.

If necessary, the ink composition may further contain pH adjustors, preservatives, fungicides, etc. from the viewpoint of improving the storage stability.

Production Process of Ink Composition

The ink composition according to the present invention may be prepared by dispersing and mixing the above ingredients together by means of a suitable method. A preferred production process is as follows. A pigment, a polymeric dispersant, and water are first mixed together by means of a suitable dispergator (for example, a ball mill, a sand mill, an attritor, a roll mill, an agitator mill, a Henschel mixer, a colloid mill, an ultrasonic homogenizer, a jet mill, or an angmill) to prepare a homogeneous pigment dispersion. Subsequently, an ink solvent, prepared by satisfactorily mixing water, a water-soluble organic solvent, a saccharide, a pH adjustor, a preservative, an antimold and the like together to prepare a solution, adding the resin emulsion particles to the solution, and then thoroughly stirring the mixture at room temperature by means of a suitable dispergator, is gradually added dropwise to the pigment dispersion, followed by additional thorough stirring. After the thorough stirring, the mixture is filtered to remove coarse particles and foreign matter causative of nozzle clogging to obtain a contemplated ink composition.

Reaction Solution

The reaction solution used in the present invention contains a reactant. The term "reactant" used herein refers to a compound which can break the state of dispersion and/or dissolution of, for example, pigment particles and/or resin emulsion particles in the ink composition to cause coagulation. Examples of reactants usable herein include polyvalent metal salts, polyamines, and polyamine derivatives.

The polyvalent metal salt usable in the reaction solution is a salt that is constituted by divalent or higher polyvalent metal ions and anions bonded to the polyvalent metal ions and is soluble in water. Specific examples of polyvalent metal ions include divalent metal ions, such as $Ca^{2+}$, $Cu^{2+}$, $Ni^{2+}$, $Mg^{2+}$, $Zn^{2+}$, and $Ba^{2+}$, and trivalent metal ions, such as $Al^{3+}$, $Fe^{3+}$, and $Cr^{3+}$. Anions include $Cl^-$, $NO_5^-$, $I^-$, $Br^-$, $ClO_3^-$, and $CH_3COO^-$.

Especially, a metal salt constituted by $Ca^{2+}$ or $Mg^{2+}$ provides favorable results in terms of two points, pH of the reaction solution and the quality of prints.

The concentration of the polyvalent metal salt in the reaction solution may be suitably determined so as to attain the effect of providing good print quality and preventing clogging. The concentration, however, is preferably about 0.1 to 40% by weight, more preferably about 5 to 25% by weight.

According to a preferred embodiment of the present invention, the polyvalent metal salt contained in the reaction solution is constituted by divalent or higher polyvalent metal ions and nitric acid ions or carboxylic acid ions bonded to the polyvalent metal ions and is soluble in water.

Preferably, the carboxylic acid ions have been derived from a saturated aliphatic monocarboxylic acid having 1 to 6 carbon atoms or a carbocyclic monocarboxylic acid having 7 to 11 carbon atoms. Examples of preferred saturated aliphatic monocarboxylic acids having 1 to 6 carbon atoms include formic acid, acetic acid, propionic acid, butyric acid, isobutyric acid, valeric acid, isovaleric acid, pivalic acid, and hexanoic acid. Among them, formic acid and acetic acid are particularly preferred.

A hydrogen atom(s) on the saturated aliphatic hydrocarbon group in the monocarboxylic acid may be substituted by a hydroxyl group. Examples of preferred substituted carboxylic acids include lactic acid.

Examples of preferred carbocyclic monocarboxylic acids having 6 to 10 carbon atoms include benzoic acid and naphthoic acid with benzoic acid being more preferred.

Polyallylamines and polyallylamine derivatives usable in the reaction solution are cationic polymers which are soluble in water and can be positively charged in water. Such polymers include, for example, those represented by the following formulae (IX), (X), and (XI):

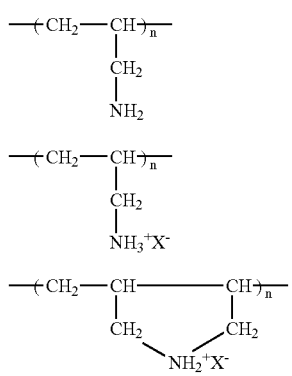

wherein $X^-$ represents chloride, bromide, iodide, nitrate, phosphate, sulfate, acetate or other ions.

In addition, a copolymer of an allylamine with a diallylamine and a copolymer of diallylmethylammonium chloride with sulfur dioxide may also be used.

The content of the polyallylamine and the polyallylamine derivative is preferably 0.5 to 10% by weight based on the reaction solution.

According to a preferred embodiment of the present invention, the reaction solution may further contain a polyol in addition to the polyvalent metal salt. The polyol has a vapor pressure of not more than 0.01 mmHg at 20° C., and the amount of the polyol added is such that the weight ratio of the polyol to the polyvalent metal salt is not less than 1, preferably 1.0 to 5.0. Further, according to a preferred embodiment of the present invention, the amount of the polyol added is not less than 10% by weight, more preferably about 10 to 30% by weight, based on the reaction solution.

Specific examples of preferred polyols usable herein include polyhydric alcohols, for example, glycerin, diethylene glycol, triethylene glycol, 1,5-pentanediol, and 1,4-butanediol. Further specific examples of preferred polyols include saccharides, for example, monosaccharides, disaccharides, oligosaccharides including trisaccharides and tetrasaccharides, and other polysaccharides, preferably glucose, mannose, fructose, ribose, xylose, arabinose, galactose, aldonic acid, glucitol, sorbitol, maltose, cellobiose, lactose, sucrose, trehalose, and maltotriose.

These polyols may be added alone or as a mixture of two or more. When the polyols are added as a mixture of two or more, the amount of these polyols added is such that the weight ratio of the total amount of the polyols to the polyvalent metal salt is not less than 1.

According to a preferred embodiment of the present invention, the reaction solution comprises a wetting agent comprising a high-boiling organic solvent. The high-boiling organic solvent functions to prevent the reaction solution from drying out. Examples of preferred high-boiling organic solvents usable herein, some of which are described above in connection with the polyol, include: polyhydric alcohols, such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea; 2-pyrrolidone; N-methyl-2-pyrrolidone; 1,3-dimethyl-2-imidazolidinone; and triethanolamine. According to a preferred embodiment of the present invention, the reaction solution contains triethylene glycol monobutyl ether and glycerin in combination.

Although the amount of the high-boiling organic solvent added is not particularly limited, it is preferably about 0.5 to 40% by weight, more preferably about 2 to 20% by weight, based on the reaction solution.

According to a preferred embodiment of the present invention, the reaction solution further contains a low-boiling organic solvent. Examples of preferred low-boiling organic solvents usable herein include methanol, ethanol, n-propyl alcohol, iso-propyl alcohol, n-butanol, sec-butanol, tert-butanol, iso-butanol, and n-pentanol. Particularly preferred are monohydric alcohols. The low-boiling organic solvent has the effect of shortening the time required for drying ink. The amount of the low-boiling organic solvent added is preferably in the range of 0.5 to 10% by weight, more preferably in the range of 1.5 to 6% by weight.

According to a preferred embodiment of the present invention, the reaction solution further contains a penetrating agent. Penetrating agents usable herein include various surfactants, such as anionic, cationic, and amphoteric surfactants; alcohols, such as methanol, ethanol, and iso-propyl alcohol; and lower alkyl ethers of polyhydric alcohols, such as ethylene glycol monomethyl ether, diethylene glycol monoethyl ether, diethylene glycol monobutyl ether, triethylene glycol monobutyl ether, propylene glycol monobutyl ether, and dipropylene glycol monobutyl ether.

More preferred penetrating agents usable in the present invention are compounds represented by formula (XII) and/or lower alcohol ethers of polyhydric alcohols:

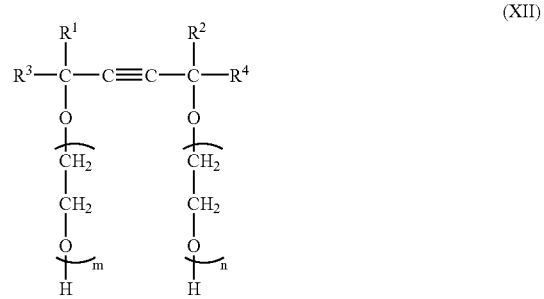

wherein $0 \leq m+n \leq 50$ and $R^1$, $R^2$, $R^3$, and $R^4$ each independently represent an alkyl group.

Specific examples of representative compounds represented by formula (XII) include OLFINE Y, Surfynol 82, Surfynol 440, Surfynol 465, and Surfynol 485 (all the above products being manufactured by Air Products and Chemicals Inc.). They may be used alone or in combination of two or more.

According to a preferred embodiment of the present invention, the reaction solution contains triethanolamine for pH adjustment purposes. The amount of the triethanolamine added is preferably about 0 to 2.0% by weight.

A method may also be used wherein a colored colorant described above in connection with the ink composition is added to the reaction solution to color the reaction solution which can function also as an ink composition.

According to a preferred embodiment of the present invention, the reaction solution comprises cationic inorganic fine particles and/or fine particles of a cationic polymer as the reactant.

In the present invention, the cationic inorganic fine particles refer to fine particles which have been cationized by treating inorganic fine particles by various methods. A specific example of a preferred treatment method is to hydrate inorganic fine particles or to treat inorganic fine particles with a cationic material to cationize the inorganic fine particles. Specific examples of the method, wherein inorganic fine particles are treated with a cationic material to cationize the inorganic fine particles, include a method wherein the surface of inorganic fine particles is treated with a cationic material, and a method wherein inorganic fine particles are dispersed and stabilized by a cationic material.

Fine particles of various inorganic materials may be used as the inorganic fine particles, and specific preferred examples thereof include inorganic colloid particles. The inorganic colloid particles refer to those that have a diameter in the range of about 1 to 500 nm and comprise about $10^3$ to $10^9$ atoms. The inorganic colloid particles are dispersed in a liquid using the liquid as a dispersant to form a colloid solution. Specific examples of inorganic fine particles include silica (including noncrystalline or amorphous silica), colloidal silica, silicic anhydride, hydrous silicic acid, finely divided silica, silica gel, alumina, boehmite, pseudo-boehmite, aluminum hydroxide, calcium silicate, aluminum silicate, barium sulfate, alumina sol, calcium carbonate, and silicic acids called white carbon or the like. Specific examples of preferred inorganic colloid particles include colloidal silica and alumina.

Specific examples of cationic materials include alumina sols (also called alumina hydrate), basic aluminum chlorides, cationic surfactants, and polycation compounds.

Specific examples of cationic surfactants include: primary fatty amine salts; secondary fatty amine salts; tertiary fatty amine salts; and quaternary ammonium salts, such as tetraalkylammonium salts, trialkylbenzylammonium salts, alkylpyridinium salts, 2-alkyl-1-alkyl-1-hydroxyethylimidazolinium salts, N,N-dialkylmorpholinium salts, polyethylenepolyamine fatty acid amide salts, salts of urea condensates of polyethylenepolyamine fatty acid amides, and quaternary ammonium salts of urea condensates of polyethylenepolyamine fatty acid amides.

Specific examples of polycation compounds include polyamines, polyamine derivatives, polyaminesulfone, and polyaminesulfone derivatives.

The average primary particle diameter of cationic inorganic fine particles is in the range of 0.1 to 200 nm, preferably in the range of 1 to 100 nm, more preferably in the range of 1 to 50 nm. When the average primary particle diameter of cationic inorganic fine particles is in the above defined range, the colorant component of the ink composition can be firmly fixed onto recording media.

Specific examples of preferred cationic inorganic fine particles include alumina sols and cationic colloidal silicas. Commercially available alumina sols may be used, and specific examples thereof include Cataloid AS-3 (manufactured by Catalysts, and Chemicals Industries Co., Ltd.; primary particle diameter about 10 nm), Aluminasol 100 (manufactured by Nissan Chemical Industries Ltd.), Aluminasol 200 (manufactured by Nissan Chemical Industries Ltd.), and Aluminasol 520 (manufactured by Nissan Chemical Industries Ltd.).

Commercially available cationic colloidal silica may be used, and specific examples thereof include Snowtex UP-AK (manufactured by Nissan Chemical Industries Ltd.; primary particle diameter 10 to 20 nm), Snowtex AK (manufactured by Nissan Chemical Industries Ltd.; primary particle diameter 10 to 20 nm), and Cataloid SN (manufactured by Catalysts and Chemicals Industries Co., Ltd.; primary particle diameter 40 to 50 nm).

Fine particles of a cationic polymer may be those produced by various methods. Preferred production methods include a method wherein fine particles of a polymer are treated with a cationic material to cationize the fine particles, and a method wherein a cationic monomer is polymerized. Specific examples of the method, wherein fine particles of a polymer are treated with a cationic material to cationize the fine particles, include a method wherein the surface of fine particles of a polymer is treated with a cationic material, and a method wherein fine particles of a polymer are dispersed and stabilized by a cationic material. The cationic material may be the same as that described above in connection with the cationic inorganic fine particles.

The average primary particle diameter of the fine particles of a cationic polymer is in the range of 0.1 to 200 nm, preferably in the range of 1 to 100 nm. When the average primary particle diameter of cationic inorganic fine particles is in the above range, the colorant component of the ink composition can be firmly fixed onto recording media.

Fine particles of a polymer may be those synthesized by various methods. Specific examples of fine particles of a polymer are those formed of a polymer selected from the group consisting of acrylic resins, polyester resins, epoxy resins, styrene-butadiene copolymers, polybutadienes, polyolefins, polystyrenes, polyamides, ethylene-vinyl acetate copolymers, polysiloxanes, and polyurethanes, preferably selected from the group consisting of acrylic resins, polyester resins, polyamides, polysiloxanes, and polyurethanes.

In the present invention, fine particles formed of a polymer produced by polymerizing a cationic monomer may be used as the fine particles of a cationic polymer. A preferred cationic monomer is a monomer represented by formula (A). Fine particles of a cationic polymer can be produced by copolymerizing the monomer represented by formula (A) with a vinyl monomer. Monomers represented by formula (A) and vinyl monomers may be conventional ones disclosed in Japanese Patent Laid-Open No. 99632/1997. Therefore, specific examples of these monomers, copolymerization methods and the like may be the same as those described in the above publication.

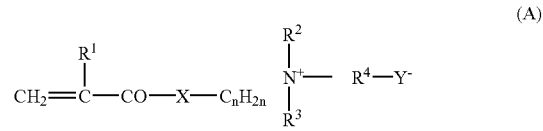

(A)

wherein $R^1$ represents a hydrogen atom or a methyl group;

X represents an oxygen atom or an NH group;

$R^2$ and $R^3$ each independently represent a straight-chain or branched alkyl group having 1 to 4 carbon atoms;

$R^4$ represents a hydrogen atom or an optionally substituted straight-chain or branched alkyl group having 1 to 4 carbon atoms;

n is an integer of 2 to 5; and $Y^-$ represents a salt forming anion.

In the present invention, the content of the cationic inorganic fine particles and/or the fine particles of a cationic polymer is in the range of 0.1 to 30% by weight, preferably in the range of 1 to 20% by weight, based on the total amount of the reaction solution.

Applications of Recording Method

The recording method according to the present invention may be used for providing text information, image information, or design on a recording medium, preferably a non-absorptive recording medium, that is, may be used, for example, in recording, printing, coating, or dying. More specifically, the recording method may be used in: recording or printing of, for example, text information, image information, or design information on industrial products, signboards, or display plates; coating for use in interior or exterior decoration of building articles and industrial products; and dyeing of fibers.

Further, according to the recording method of the present invention, printing may be performed on various recording media. Specific examples of recording media include industrial products, industrial articles, domestic electric appliances, articles for buildings, furniture, tableware, aircrafts, vehicles, ships, cards, packaging containers, medical supplies or devices, clothing, boots or shoes, bags, office supplies, stationery, toys, signs, and fibers. More specifically, printing may be performed, for example, on labels of compact disks (CD), wall surfaces, building articles, such as building materials, displays, for example, for electric power supplies and switches, wall papers, umbrellas, tents, swimming suits, rubber pools, vinyl pools, footgears, such as boots and shoes, glasses, earthenware, porcelains, tableware, TEPRA, surfboards, ships (for example, motorboats, fishing boats, and tankers), vehicles (passenger cars, buses, and trucks), railways or railroad (for example, electric railcars and rails), aircrafts (for example, passenger airplanes, fighter planes, Cessna, and gliders), ski goods (for example, skis, ski sticks, ski boots, and skiwears), snowboard goods (for example, snowboards and wears), diving goods (for example, wet suits, Aqualung, snorkels, weights, and fins), suitcases, furniture (for example, desks, tables, and chairs), medical instruments (for example, syringes, catheters, and containers for drips), cans (for example, designs and indication of contents), watches and clocks (for example, clockfaces and designs), domestic electric appliances (for example, televisions, refrigerators, radios, personal computers, cassette tape recorders, CD players, and vacuum cleaners), bar codes, card products, for example, various member's cards, prepaid cards (such as Teleca (prepaid telephone cards), Highca (highway cards), Orange Card, and Creca (credit telephone cards)), credit cards, and bank cards, nail arts, doorplates, toys, dolls, and mannequins. These recording media is examples of the recording media usable in the present invention, and the present invention is not limited to these recording media only.

Recording Apparatus

The recording apparatus according to the present invention will be described with reference to the accompanying drawings.

The construction of the recording apparatus according to the present invention will be described with reference to FIG. 1. A recording medium is transferred from a supply source 1 housing recording media to the step of printing wherein an ink jet recording mechanism 2 is used. A reaction solution and an ink composition are ejected from a recording head provided in the ink jet recording mechanism 2 onto the surface of the recording medium to form a print layer 3 on the surface of the recording medium. The recording head comprises reaction solution ejection nozzles and ink composition ejection nozzles (not shown). The recording medium with the print layer 3 formed thereon is transferred to the step of washing, and is washed with a polar solvent by means of a washing mechanism 4. The washing mechanism 4 is provided with means (not shown) for recovering and separating washings. After washing, the recording medium is transferred to the step of drying. The recording medium is dried by means of a drying mechanism 5. The drying mechanism 5 may be of either a type such that the drying mechanism 5 is brought into contact with the recording medium to heat the recording medium, or a type such that heating is carried out, without contact with the recording medium, for example, by applying an infrared radiation or the like or by blowing hot air. After drying, the recording medium is received as a product in a product receiver 6. In the recording apparatus, rolls shown in the drawing, conveyors (not shown) or the like are used as recording medium carrying means. The recording apparatus according to the present invention can realize real image printing, mirror image printing, or a combination of real image printing with mirror image printing.

Figure 2:
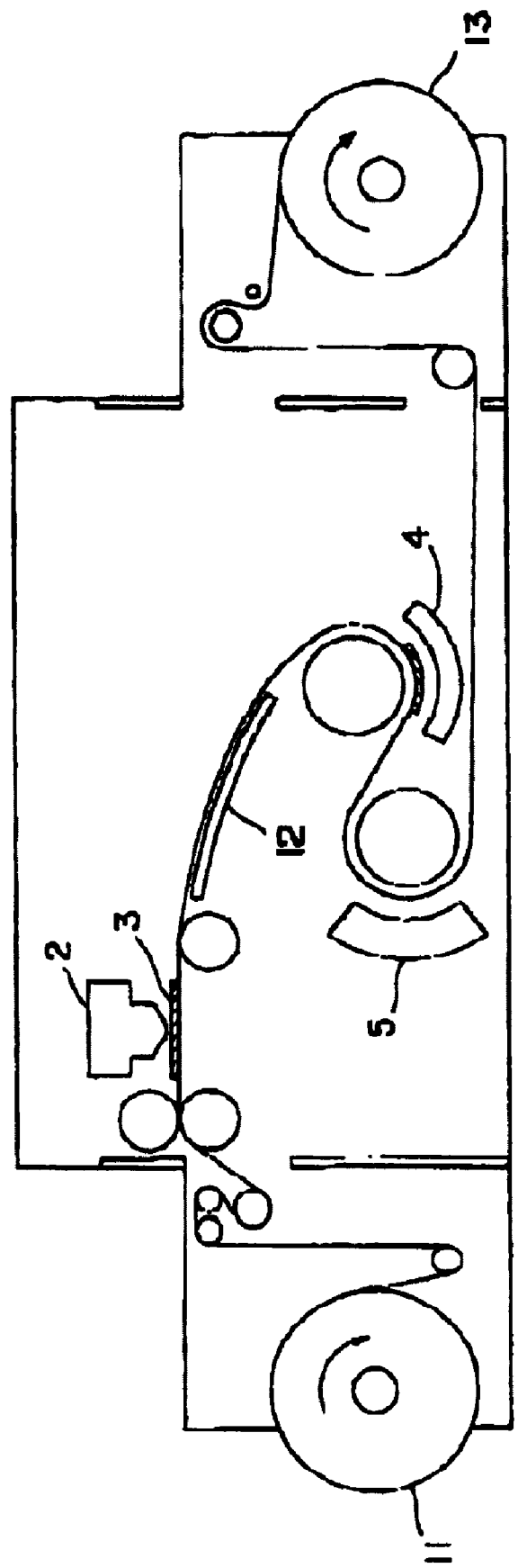
FIG. 2 is a diagram showing one embodiment of the recording apparatus according to the present invention for use in printing on a PET film.

One embodiment of the recording apparatus according to the present invention is shown in FIG. 2. In FIGS. 1 and 2, like parts such as the mechanism are identified with the same reference numerals.

A PET film is transferred from a PET film roll 11 to the step of printing wherein an ink jet recording mechanism 2 is used. A reaction solution and an ink composition are ejected from a recording head provided in the ink jet recording mechanism 2 onto the surface of the PET film to form a print layer 3 on the surface of the PET film. The PET film with the print layer 3 formed thereon is passed through a support table 12, and is transferred to the step of washing. The PET film with the print layer 3 formed thereon is washed with a polar solvent by means of a washing mechanism 4. After washing, the PET film is transferred to the step of drying. The PET film is dried by means of a drying mechanism 5. After drying, the PET film is wound as a printed PET film product on a roll 13. The recording apparatus according to the present invention can provide PET films, on which real image printing, mirror image printing, or a combination of real image printing with mirror image printing has been performed, as products.

EXAMPLES

The present invention is further illustrated by the following examples, which are intended to be illustrative and not to be limiting the scope of the present invention.

Example A

Preparation of Resin Emulsion A

Resin Emulsion 1

To a flask equipped with a stirrer, a thermometer, a reflux condenser, and a dropping funnel were added 100 ml of distilled water and 0.1 g of potassium persulfate. The flask was heated to raise the internal temperature of the flask to 70° C. while replacing the air in the flask by nitrogen with stirring. Separately, 100 ml of distilled water, 1.0 g of sodium dodecylbenzenesulfonate, 30 g of styrene, 55 g of 2-ethylhexyl acrylate, and 5 g of methacrylic acid were mixed together with stirring to prepare an emulsion. The emulsion was gradually added dropwise to the contents of the flask through the dropping funnel. The emulsion was cooled to room temperature, was filtered through a 0.4-μm filter, and was then diluted with distilled water to a resin emulsion concentration of 30%. The emulsion had a minimum film-forming temperature of about 20° C., and had a property such that, upon mixing with a reaction solution 1 or 2 described below, coagulate is formed.

Resin Emulsion 2

To a flask equipped with a stirrer, a thermometer, a reflux condenser, and a dropping funnel were added 100 ml of distilled water and 0.1 g of potassium persulfate. The flask was heated to raise the internal temperature of the flask to 70° C. while replacing the air in the flask by nitrogen with stirring. Separately, 100 ml of distilled water, 1.0 g of sodium dodecylbenzenesulfonate, 50 g of styrene, 35 g of 2-ethylhexyl acrylate, and 5 g of methacrylic acid were mixed together with stirring to prepare an emulsion. The emulsion was gradually added dropwise to the contents of the flask through the dropping funnel. The emulsion was cooled to room temperature, was filtered through a 0.4-μm filter, and was then diluted with distilled water to a resin emulsion concentration of 30%. The emulsion had a minimum film-forming temperature of about 60° C., and had a property such that, upon mixing with a reaction solution 1 or 2 described below, coagulate is formed.

Preparation of Ink Composition A

Ink compositions composed of the following ingredients were prepared according to the following procedure.

The pigment, the dispersant, and a part of water were mixed together, and the mixture, together with glass beads (diameter: 1.7 mm, amount: 1.5 times (by weight) larger than the mixture), was dispersed for 2 hr in a sand mill (manufactured by Yasukawa Seisakusho). Thereafter, the glass beads were removed to prepare a dispersion of the pigment.

Separately, all the above ingredients except for the pigment, the dispersant and the part of water used in the preparation of the carbon black dispersion were mixed together to prepare an ink solvent. The ink solvent was gradually added dropwise to the pigment dispersion while stirring the pigment dispersion. The mixture was stirred at room temperature for 20 min, and the mixture was then filtered through a 5-μm membrane filter to prepare an ink composition for ink jet recording.

| Ink composition 1 | |
|---|---|
| Carbon Black MA 7 (manufactured by Mitsubishi Chemical Corporation) | 5 wt % |
| Styrene/acrylic acid copolymer (dispersant) | 1 wt % |
| Resin emulsion 1 (as concentration of resin emulsion particles) | 10 wt % |
| Glycerin | 10 wt % |
| Ion-exchanged water | Balance |
| Ink composition 2 | |
| Carbon Black MA 7 (manufactured by Mitsubishi Chemical Corporation) | 5 wt % |
| Styrene/acrylic acid copolymer (dispersant) | 1 wt % |
| Resin emulsion 2 (as concentration of resin emulsion particles) | 10 wt % |
| Glycerin | 10 wt % |
| Ion-exchanged water | Balance |
| Ink composition 3 | |
| C.I. Pigment Black 1 | 1 wt % |
| Styrene/acrylic acid copolymer (dispersant) | 1 wt % |
| Glycerin | 15 wt % |
| Ion-exchangod water | Balance |

Color Ink Set A

A color ink set comprising a combination of the following ink compositions having the following compositions was prepared.

Color Ink Set 1

| Cyan ink 1 | |
|---|---|
| C.I. Pigment Cyan 15:3 | 2 wt % |
| Styrene/acrylic acid copolymer (dispersant) | 1 wt % |
| Resin emulsion 1 (as concentration of resin emulsion particles) | 10 wt % |
| Diethylene glycol | 10 wt % |
| Ion-exchanged water | Balance |
| Magenta ink 1 | |
| C.I. Pigment Red 122 | 3 wt % |
| Styrene/acrylic acid copolymer (dispersant) | 1 wt % |
| Resin emulsion 1 (as concentration of resin emulsion particles) | 20 wt % |
| Glycerin | 5 wt % |
| Diethylene glycol | 5 wt % |
| Ion-exchanged water | Balance |
| Yellow ink 1 | |
| C.I. Pigment Yellow 74 | 3.5 wt % |
| Styrene/acrylic acid copolymer (dispersant) | 1 wt % |
| Resin emulsion 1 (as concentration of resin emulsion particles) | 15 wt % |
| Glycerin | 8 wt % |
| Ion-exchanged water | Balance |

Color Ink Set 2

| Cyan ink 2 | |
|---|---|
| C.I. Pigment Cyan 15:3 | 2 wt % |
| Styrene/acrylic acid copolymer (dispersant) | 1 wt % |
| Resin emulsion 2 (as concentration of resin emulsion particles) | 10 wt % |
| Diethylene glycol | 10 wt % |
| Ion-exchanged water | Balance |
| Magenta ink 2 | |
| C.I. Pigment Red 122 | 3 wt % |
| Styrene/acrylic acid copolymer (dispersant) | 1 wt % |
| Resin emulsion 2 (as concentration of resin emulsion particles) | 20 wt % |
| Glycerin | 5 wt % |
| Diethylene glycol | 5 wt % |
| Ion-exchanged water | Balance |
| Yellow ink 2 | |
| C.I. Pigment Yellow 74 | 3.5 wt % |
| Styrene/acrylic acid copolymer (dispersant) | 1 wt % |
| Resin emulsion 2 (as concentration of resin emulsion particles) | 15 wt % |
| Glycerin | 8 wt % |
| Ion-exchanged water | Balance |

Color Ink Set 3

| Cyan ink 3 | |
|---|---|
| Pigment: KET BLUE EX-1 (manufactured by Dainippon Ink and Chemicals, Inc.) | 3 wt % |
| Styrene/acrylic acid copolymer (dispersant) | 1 wt % |
| Glycerin | 10 wt % |
| Ion-exchanged water | Balance |
| Magenta ink 3 | |
| Pigment: KET Red 309 (manufactured by Dainippon Ink and Chemicals, Inc.) | 4 wt % |
| Styrene acrylic acid copolymer (dispersant) | 1 wt % |
| Diethylene glycol | 15 wt % |
| Ion-exchanged water | Balance |

-continued

| Yellow ink 3 | |
|---|---|
| Pigment: KET Yellow 403 (manufactured by Dainippon Ink and Chemicals, Inc.) | 3 wt % |
| Styrene/acrylic acid copolymer (dispersant) | 1 wt % |
| Diethylene glycol | 10 wt % |
| Ion-exchanged water | Balance |

Preparation of Reaction Solution A

A reaction solution A was prepared according to the following formulation.

| Reaction solution 1 | |
|---|---|
| Magnesium nitrate hexahydrate | 25 wt % |
| Triethylene glycol monobutyl ether | 10 wt % |
| Glycerin | 10 wt % |
| Ion-exchanged water | Balance |
| Reaction solution 2 | |
| Polyallylamine PAA-HCL-3L (resin component 50%, manufactured by Nitto Boseki Co., Ltd.) | 20 wt % |
| Diethylene glycol | 15 wt % |
| Ion-exchanged water | Balance |

Print Evaluation Test A

Combinations as described in the following Table A1 were provided as examples. The following prints to be evaluated were obtained by printing the ink composition and the reaction solution in the above examples on a PET film at room temperature under atmospheric pressure by means of an ink jet printer MJ-930C manufactured by Seiko Epson Corp. In this case, the reaction solution, the black ink, and the color ink were simultaneously printed at 100% duty on the PET film. Only prints obtained in Examples 1 and 2 and Comparative Example 3 were washed with water. The unit "duty" used herein refers to a unit of a value D defined and calculated by equation (I):

$$D = \frac{\text{number of actually printed dots}}{\text{longitudinal resolution} \times \text{transverse resolution}} \times 100 \text{ (duty)} \quad (I)$$

TABLE A1

| | Reaction solution | Black ink | Color ink set | Washing with water after printing |
|---|---|---|---|---|
| Ex. 1 | 1 | 1 | 1 | Done |
| Ex. 2 | 2 | 2 | 2 | Done |
| Comp. Ex. 1 | 1 | 1 | 1 | Not done |
| Comp. Ex. 2 | 2 | 2 | 2 | Not done |
| Comp. Ex. 3 | 1 | 3 | 3 | Done |
| Comp. Ex. 4 | 2 | 3 | 3 | Not done |

Evaluation 1: Evaluation on Fixation of Inks after Washing with Water

The printed face of the print was strongly rubbed with a finger to evaluate the fixation of ink according to the following criteria.

A: The ink was not separated at all.
B: The ink was slightly separated.
C: The ink was completely separated.

Evaluation 2: Evaluation on Color Bleeding

The prints were visually inspected for uneven color mixing in boundaries of different colors. The results were evaluated according to the following criteria.

A: No color mixing occurred, and the boundaries between adjacent colors were clear.

B: Slight color mixing occurred.

C: Feather-like color mixing occurred.

D: Significant color mixing occurred to such an extent that the boundaries between adjacent colors blurred.

Evaluation A3: Evaluation on Fixation of Inks by Heating

The prints were heated from the backside by means of a heater at 80° C. for 5 sec. Immediately after the heating, the printed face of the prints was strongly rubbed with a finger to evaluate the fixation of ink according to the following criteria.

A: The ink was not separated at all.
B: The ink was slightly separated.
C: The ink was completely separated.

The results of the evaluation tests were as summarized in Table A2 below. The results of the evaluation on the printing tests are those for printing of actual images. The same results were obtained for printing of mirror images.

TABLE A2

| | Evaluation 1 | Evaluation 2 | Evaluation 3 |
|---|---|---|---|
| Ex. 1 | A | A | A |
| Ex. 2 | B | A | A |
| Comp. Ex. 1 | C | A | B |
| Comp. Ex. 2 | C | A | B |
| Comp. Ex. 3 | C | D | C |
| Comp. Ex. 4 | C | D | C |

Example B

Preparation of Resin Emulsion B

Resin Emulsion 1

To a reaction vessel equipped with a stirrer, a reflux condenser, a dropping funnel, a thermometer, and a nitrogen inlet tube were added 200 ml of distilled water and 0.6 g of sodium dodecylbenzenesulfonate. The reaction vessel was heated to raise the internal temperature of the reaction vessel to 70° C. with stirring in a nitrogen atmosphere, and 2 g of potassium persulfate was then added. Separately, 40 g of butyl acrylate, 50 g of styrene, 5 g of acrylamide, 5 g of acrylic acid, 0.1 g of t-dodecylmercaptan, 5 g of a monomer having a skeleton with ultraviolet absorbing activity, 2-(2'-hydroxy-5'-methacryloxyethylphenyl)-2H-benzotriazole (RUVA-93, manufactured by Otsuka Chemical Co., Ltd.), and 1 g of a monomer having a skeleton with photostabilizing activity, 1,2,2,6,6-pentamethyl-4-piperidyl methacrylate (ADK STAB LA-82, manufactured by Asahi Denka Kogyo Ltd.), were mixed together to prepare a solution. This solution was then added dropwise to the contents of the reaction vessel. A reaction was further allowed to proceed at 70° C. for additional 6 hr. The reaction vessel was then cooled to room temperature, and the pH value of the reaction mixture was adjusted by the addition of aqueous ammonia as a neutralizing agent, followed by filtration through a 0.4-µm filter to prepare a resin emulsion containing, as dispersed particles, fine particles of a polymer having in its structure sites possessing ultraviolet absorbing activity and photostabilizing activity.

This resin emulsion had a glass transition point of 20° C., a minimum film-forming temperature of 25° C., a surface tension of 57×10⁻³ N/m, a contact angle of 89 degrees, a particle diameter of 0.2 μm, and a half-value period in a reaction with $Mg^{2+}$ ion of 3800 sec.

Resin Emulsion 2

A reaction vessel equipped with a stirrer, a reflux condenser, a dropping funnel, and a thermometer was charged with 900 g of ion-exchanged water. The internal temperature of the reaction vessel was raised to 70° C. with stirring while replacing the air in the reaction vessel by nitrogen. While maintaining the internal temperature at 70° C., 2 g of potassium persulfate as a polymerization initiator was added to and dissolved in the ion-exchanged water. Separately, 53 g of styrene, 59 g of butyl acrylate, 48 g of glycidyl methacrylate, 5 g of a monomer having a skeleton with ultraviolet absorbing activity, 2-(2'-hydroxy-5'-methacryloxyethyl-phenyl)-2H-benzotriazole (RUVA-93, manufactured by Otsuka Chemical Co., Ltd.), 1 g of a monomer having a skeleton with photostabilizing activity, 1,2,2,6,6-pentamethyl-4-piperidyl methacrylate (ADK STAB LA-82, manufactured by Asahi Denka Kogyo Ltd.), and 0.16 g of t-dodecylmercaptan as a molecular weight modifier were added to 70 g of ion-exchanged water and 1.0 g of sodium laurylsulfate with stirring to prepare an emulsion. This emulsion was then continuously added dropwise to the contents of the reaction vessel over a period of 1 hr. After the completion of the dropwise addition, the mixture was ripened for one hr.

Subsequently, an emulsion prepared by adding 79 g of styrene, 80 g of butyl acrylate, and 0.16 g of t-dodecylmercaptan to 70 g of ion-exchanged water, 1.0 g of sodium laurylsulfate, and 1 g of acrylamide with stirring was then continuously added dropwise to the contents of the reaction vessel over a period of 1 hr. After the completion of the dropwise addition, the mixture was ripened for one hr.

A solution of 2 g of ammonium persulfate as a polymerization initiator in 20 g of ion-exchanged water was then added to the contents of the reaction vessel. Further, an emulsion, prepared by adding 298 g of styrene, 297 g of butyl acrylate, 29 g of methacrylic acid, and 0.65 g of t-dodecylmercaptan to a mixture of 300 g of ion-exchanged water, 2 g of sodium laurylsulfate, and 16 g of acrylamide with stirring, was continuously added dropwise to the contents of the reaction vessel over a period of 3 hr. After the completion of the dropwise addition, the mixture was ripened for 3 hr.

The resin emulsion thus obtained was cooled to room temperature, and was then adjusted to a solid content of 40% by weight and pH 8 by the addition of ion-exchanged water and aqueous ammonia.

This resin emulsion had a minimum film-forming temperature of 24° C., a surface tension of 57×10⁻³ N/m, a contact angle of 90 degrees, a particle diameter of 0.09 μm, and a half-value period in a reaction with $Mg^{2+}$ ion of 80 sec.

Resin Emulsion 3

To a reaction vessel equipped with a stirrer, a reflux condenser, a dropping funnel, a thermometer, and a nitrogen inlet tube were added 200 ml of distilled water and 0.6 g of sodium dodecylbenzenesulfonate. The reaction vessel was heated to raise the internal temperature of the reaction vessel to 70° C. with stirring in a nitrogen atmosphere, and 2 g of potassium persulfate was then added. Separately, 40 g of butyl acrylate, 50 g of styrene, 5 g of acrylamide, 5 g of acrylic acid, 0.1 g of t-dodecylmercaptan, 5 g of a monomer having a skeleton with ultraviolet absorbing activity, 2-(2'-hydroxy-5'-methacryloxyethylphenyl)-2H-benzotriazole (RUVA-93, manufactured by Otsuka Chemical Co., Ltd.), 1 g of a monomer having a skeleton with photostabilizing activity, 1,2,2,6,6-pentamethyl-4-piperidyl methacrylate (ADK STAB LA-82, manufactured by Asahi Denka Kogyo Ltd.), and 2 g of ethylene glycol dimethacrylate were mixed together to prepare a solution. This solution was then added dropwise to the contents of the reaction vessel. A reaction was further allowed to proceed at 70° C. for additional 6 hr. The reaction vessel was then cooled to room temperature, and the pH value of the reaction mixture was adjusted by the addition of aqueous ammonia as a neutralizing agent, followed by filtration through a 0.4-μm filter to prepare a resin emulsion containing, as dispersed particles, fine particles of a polymer having in its structure sites possessing ultraviolet absorbing activity and photostabilizing activity.

This resin emulsion had a glass transition point of 20° C., a minimum film-forming temperature of 25° C., a surface tension of 58×10⁻³ N/m, a contact angle of 90 degrees, a particle diameter of 0.1 μm, and a half-value period in a reaction with $Mg^{2+}$ ion of 70 sec.

Resin Emulsion 4

A reaction vessel equipped with a stirrer, a reflux condenser, a dropping funnel, and a thermometer was charged with 900 g of ion-exchanged water. The internal temperature of the reaction vessel was raised to 70° C. with stirring while replacing the air in the reaction vessel by nitrogen. While maintaining the internal temperature at 70° C., 2 g of potassium persulfate as a polymerization initiator was added to and dissolved in the ion-exchanged water. Separately, 53 g of styrene, 59 g of butyl acrylate, 48 g of glycidyl methacrylate, 5 g of a monomer having a skeleton with ultraviolet absorbing activity, 2-(2'-hydroxy-5'-methacryloxyethyl-phenyl)-2H-benzotriazole (RUVA-93, manufactured by Otsuka Chemical Co., Ltd.), 1 g of a monomer having a skeleton with photostabilizing activity, 1,2,2,6,6-pentamethyl-4-piperidyl methacrylate (ADK STAB LA-82, manufactured by Asahi Denka Kogyo Ltd.), 10 g of diethylene glycol dimethacrylate, and 0.16 g of t-dodecylmercaptan as a molecular weight modifier were added to 70 g of ion-exchanged water and 1.0 g of sodium laurylsulfate with stirring to prepare an emulsion. This emulsion was then continuously added dropwise to the contents of the reaction vessel over a period of 1 hr. After the completion of the dropwise addition, the mixture was ripened for one hr.

Subsequently, an emulsion prepared by adding 79 g of styrene, 80 g of butyl acrylate, and 0.16 g of t-dodecylmercaptan to 70 g of ion-exchanged water, 1.0 g of sodium laurylsulfate, and 1 g of acrylamide with stirring was then continuously added dropwise to the contents of the reaction vessel over a period of 1 hr. After the completion of the dropwise addition, the mixture was ripened for one hr.

A solution of 2 g of ammonium persulfate as a polymerization initiator in 20 g of ion-exchanged water was then added to the contents of the reaction vessel. Further, an emulsion, prepared by adding 298 g of styrene, 297 g of butyl acrylate, 29 g of methacrylic acid, 5 g of sodium 2-sulfoethylmethacrylate, and 0.65 g of t-dodecylmercaptan to a mixture of 300 g of ion-exchanged water, 2 g of sodium laurylsulfate, and 16 g of acrylamide with stirring, was continuously added dropwise to the contents of the reaction vessel over a period of 3 hr. After the completion of the dropwise addition, the mixture was ripened for 3 hr.

The resin emulsion thus obtained was cooled to room temperature, and was then adjusted to a solid content of 40% by weight and pH 8 by the addition of ion-exchanged water and aqueous ammonia.

This resin emulsion had a minimum film-forming temperature of 24° C., a surface tension of $57 \times 10^{-3}$ N/m, a contact angle of 90 degrees, a particle diameter of 0.09 μm, and a half-value period in a reaction with $Mg^{2+}$ ion of 70 sec.

Resin Emulsion 5

To a reaction vessel equipped with a stirrer, a reflux condenser, a dropping funnel, a thermometer, and a nitrogen inlet tube were added 200 ml of distilled water and 0.6 g of sodium dodecylbenzenesulfonate. The reaction vessel was heated to raise the internal temperature of the reaction vessel to 70° C. with stirring in a nitrogen atmosphere, and 2 g of potassium persulfate was then added. Separately, 40 g of butyl acrylate, 50 g of styrene, 1 g of acrylamide, 0.1 g of acrylic acid, and 0.1 g of t-dodecylmercaptan were mixed together to prepare a solution. This solution was then added dropwise to the contents of the reaction vessel. A reaction was further allowed to proceed at 70° C. for additional 6 hr. The reaction vessel was then cooled to room temperature, and the pH value of the reaction mixture was adjusted by the addition of aqueous ammonia as a neutralizing agent, followed by filtration through a 0.4-μm filter to prepare a resin emulsion containing, as dispersed particles, fine particles of a polymer having in its structure sites possessing ultraviolet absorbing activity and photostabilizing activity.

This resin emulsion had a glass transition point of 20° C., a minimum film-forming temperature of 25° C., a surface tension of $35 \times 10^{-3}$ N/m, a content angle of 56 degrees, a particle diameter of 0.2 μm, and a half-value period in a reaction with $Mg^{2+}$ ion of $1 \times 10^3$ sec.

Resin Emulsion 6

To a reaction vessel equipped with a stirrer, a reflux condenser, a dropping funnel, a thermometer, and a nitrogen inlet tube were added 200 ml of distilled water and 0.6 g of sodium dodecylbenzenesulfonate. The reaction vessel was heated to raise the internal temperature of the reaction vessel to 70° C. with stirring in a nitrogen atmosphere, and 2 g of potassium persulfate was then added. Separately, 40 g of butyl acrylate, 50 g of styrene, 5 g of acrylamide, 5 g of acrylic acid, 0.1 g of t-dodecylmercaptan, and 6 g of ethylene glycol dimethacrylate were mixed together to prepare a solution. This solution was then added dropwise to the contents of the reaction vessel. A reaction was further allowed to proceed at 70° C. for additional 6 hr. The reaction vessel was then cooled to room temperature, and the pH value of the reaction mixture was adjusted by the addition of aqueous ammonia as a neutralizing agent, followed by filtration through a 0.4-μm filter to prepare a resin emulsion containing, as dispersed particles, fine particles of a polymer having in its structure sites possessing ultraviolet absorbing activity and photostabilizing activity.

This resin emulsion had a surface tension of $58 \times 10^{-3}$ N/m, a contact angle of 91 degrees, a particle diameter of 0.1 μm, and a half-value period in a reaction with $Mg^{2+}$ ion of 30 sec.

Measurement

In connection with the above preparation, the glass transition point was measured by drying the resin emulsion to remove water contained in the resin emulsion to form a film and measuring the glass transition points with a differential scanning calorimeter (DSC) at a temperature rise rate of 10° C./min. Further, in connection with the above preparation, the minimum film-forming temperature was measured as follows. Specifically, a minimum film-forming temperature measuring device was set, and, when the temperature gradient on a sample plate made of aluminum had reached equilibrium, the resin emulsion as a sample was thinly spread on the sample plate to dry the emulsion. When the dried portion on the sample plate was inspected after the completion of the drying, it was found that a transparent continuous film was formed in the temperature region of the minimum film-forming temperature or above, whereas a white powder was formed in the temperature region below the minimum film-forming temperature. The temperature of the boundary between the temperature, at which the transparent continuous film was formed, and the temperature, at which the white powder was formed, was measured and regarded as the minimum film-forming temperature.

Preparation of Reaction Solution B

A reaction solution was prepared according to the following formulation.

| Reaction solution 1 | |
|---|---|
| Magnesium nitrate hexahydrate | 25 wt % |
| Triethylene glycol monobutyl ether | 10 wt % |
| Glycerin | 10 wt % |
| Pure water | Balance |
| Reaction solution 2 | |
| Polyallylamine represented by formula (I) | 25 wt % |
| Triethylene glycol monobutyl ether | 10 wt % |
| Glycerin | 20 wt % |
| Pure water | Balance |

Preparation of Ink Composition B

Ink compositions composed of the following ingredients shown in Tables B1 and B2 were prepared according to the following procedure.

The pigment, the dispersant, and a part of water were mixed together, and the mixture, together with glass beads (diameter: 1.7 mm, amount: 1.5 times (by weight) larger than the mixture), was dispersed for 2 hr in a sand mill (manufactured by Yasukawa Seisakusho). Thereafter, the glass beads were removed to prepare a dispersion of the pigment.

Separately, all the above ingredients except for the pigment, the dispersant and the part of water used in the preparation of the carbon black dispersion were mixed together to prepare an ink solvent. The ink solvent was gradually added dropwise to the pigment dispersion while stirring the pigment dispersion. The mixture was stirred at room temperature for 20 min. The mixture was filtered through a 5-μm membrane filter to prepare an ink composition for ink jet recording.

TABLE B1

| | (Examples) | | | | | |
|---|---|---|---|---|---|---|
| | Color ink 1 | | | Yellow ink 2 | Yellow ink 3 | Yellow ink 4 |
| | Cyan ink 1 | Magenta ink 1 | Yellow ink 1 | | | |
| C.I. Pigment Blue 15:3 | 2 | | | | | |
| C.I. Pigment Red 122 | | 2 | | | | |
| C.I. Pigment Yellow 73 | | | 3 | 3 | 3 | 3 |
| Ammonium salt of styrene-acrylic acid copolymer (molecular weight 7000, polymer component: at the time of disersion) | 1 | 1 | 1 | 1 | 1 | 1 |
| Resin emulsion 1 | 8 | 8 | 8 | | | |
| Resin emulsion 2 | | | | 8 | | |
| Resin emulsion 3 | | | | | 8 | |
| Resin emulsion 4 | | | | | | 8 |
| Glycerin | 10 | 10 | 10 | 10 | 10 | 10 |
| Maltitol | 7 | 7 | 7 | 7 | 7 | 7 |
| 2-Pyrrolidone | 2 | 2 | 2 | 2 | 2 | 2 |
| Triethanolamine | 1 | 1 | 1 | 1 | 1 | 1 |
| KOH | 0.1 | 0.1 | 0.1 | 0.1 | 0.1 | 0.1 |
| Pure Water | Balance | Balance | Balance | Balance | Balance | Balance |

TABLE B2

| | (Comparative examples) | | | | |
|---|---|---|---|---|---|
| | Color ink 2 | | | | |
| | Cyan ink 2 | Magenta ink 2 | Yellow ink 5 | Yellow ink 6 | Yellow ink 7 |
| C.I. Pigment Blue 15:3 | 2 | | | | |
| C.I. Pigment Red 122 | | 2 | | | |
| C.I. Pigment Yellow 73 | | | 3 | 3 | 3 |
| Ammonium salt of styrene-acrylic acid copolymer (molecular weight 7000, polymer component: at the time of dispersion) | 1 | 1 | 1 | 1 | 1 |
| Resin emulsion 5 | 8 | 8 | 8 | | |
| Resin emulsion 6 | | | | | 8 |
| Microgel E-5002 (styrene-acrylic resin emulsion: polymer component 29.2%, MFT about 80° C., manufactured by Nippon Paint Co., Ltd.) | | | | 8 | |
| Glycerin | 10 | 10 | 10 | 10 | 10 |
| Maltitol | 7 | 7 | 7 | 7 | 7 |
| 2-Pyrrolidone | 2 | 2 | 2 | 2 | 2 |
| Triethanolamine | 1 | 1 | 1 | 1 | 1 |
| KOH | 0.1 | 0.1 | 0.1 | 0.1 | 0.1 |
| Pure water | Balance | Balance | Balance | Balance | Balance |

Print Evaluation Test B

Printing Method

The recording apparatus according to the present invention was used to print yellow, magenta, and cyan inks in the color inks 1 and 2 and the yellow inks 2 to 4, 6 and 7 in combination with the reaction solutions on a PET film and an iron plate. After printing, the PET film and the iron plate were washed with water. Thus, the following prints were formed.

Example 1

Prints produced using the reaction solution 1 and the color ink 1.

Example 2

Prints produced using the reaction solution 1 and the yellow ink 2.

Example 3

Prints produced using the reaction solution 1 and the yellow ink 3.

Example 4

Prints produced using the reaction solution 1 and the yellow ink 4.

Example 5

Prints produced using the reaction solution 2 and the color ink 1.

Comparative Example 1

Prints produced using the reaction solution 1 and the color ink 2.

Comparative Example 2

Prints produced using the reaction solution 1 and the yellow ink 6.

Comparative Example 3

Prints produced using the reaction solution 1 and the yellow ink 7.

Comparative Example 4

Prints produced using the reaction solution 2 and the color ink 2.

Evaluation 1: Lightfastness

Evaluation Method 1

The blotted images prints thus obtained were subjected to an 800-hr lightfastness test using a xenon fadeometer. In this case, for the blotted image area, the color before exposure and the color after exposure were measured with a Macbeth CE-7000 spectrophotometer (manufactured by Macbeth) and expressed in terms of the L*a*b* color system of the color difference indication method specified in CIE (Commission International de l'Eclairage), and a change in color between before the exposure and after the exposure in the blotted image area was expressed in terms of the color difference determined by the following equation. This value was evaluated according to the following criteria. The results were as shown in Table B3 below.

Color difference:

$$\Delta E^{+}{}_{ab} = [(\Delta L^{+})^2 + (\Delta a^{+})^2 + (\Delta b^{+})^2]^{1/2}$$

Evaluation Criteria

A: $\Delta E^{+}{}_{ab} \leq 4$
B: $4 < \Delta E^{+}{}_{ab} \leq 6$
C: $6 < \Delta E^{+}{}_{ab} \leq 8$
D: $8 < \Delta E^{+}{}_{ab} \leq 10$
E: $10 < \Delta E^{+}{}_{ab} \leq 20$
F: $\Delta E^{+}{}_{ab} > 20$ Evaluation Method 2

Further, for the blotted image area, the color density before the exposure and the color density after the exposure were measured with a Macbeth densitometer TR927 (manufactured by Macbeth), and a change in color density between before and after the exposure in the blotted image area was determined. The results were evaluated according to the following criteria. The evaluation results were as shown in Table B3 below.

A: OD value change of not more than 3%
B: OD value change of more than 3 to less than 5%
C: OD value change of more than 5 to less than 10%
D: OD value change of not less than 10%

Evaluation 2: Ejection Stability

The ink composition was loaded into an ink jet printer MJ-700 V2C manufactured by Seiko Epson Corporation, and alphabetical characters were continuously printed at room temperature. The amount of the ink composition ejected was 0.04 μg/dot, and the density was 360 dpi. At that time, inspection was performed on dropouts of dots and scattering of ink. The results were evaluated according to the following criteria. The evaluation results were as shown in Table B4 below.

A: 10 times in total of dropouts of dots or scattering of ink did not occur even after the elapse of 48 hr or more from the start of the printing.

B: 10 times in total of dropouts of dots or scattering of ink occurred in a period between the elapse of 24 hr from the start of the printing and the elapse of 48 hr from the start of the printing.

C: 10 times in total of dropouts of dots or scattering of ink occurred in a period between the elapse of one hr from the start of the printing and the elapse of less than 24 hr from the start of the printing.

D: 10 or more times in total of dropouts of dots or scattering of ink occurred before one hr elapsed from the start of the printing.

Evaluation 3: Effect of Washing with Water on Fixation of Ink

In the prints, the printed portion was rubbed with a water-base yellow fluorescent marker pen (ZEBRA PEN 2 (tradename)) manufactured by ZEBRA at a marking force of 4.9 N/mm², and the fixation of ink was evaluated according to the following criteria. The evaluation results were as shown in Table B5 below.

A: The separation of the printed portion did not occur at all.

B: The separation of the printed portion occurred.

C: The printed portion was completely separated.

Evaluation 4: Color Bleeding

In the prints, the printed portion was visually inspected for uneven color mixing in boundaries of different colors. The results were evaluated according to the following criteria. The evaluation results were as shown in Table B5 below.

A: There was no color mixing.

B: There was color mixing.

C: There was significant color mixing on such a level that rendered the boundaries of different colors unclear.

TABLE B3

| | Ink | | Reaction solution | Difference in color between before and after exposure | Change in OD value between before and after exposure |
|---|---|---|---|---|---|
| Ex. 1 | Color ink 1 | Cyan ink 1 | 1 | A | A |
| | | Magenta ink 1 | | A | A |
| | | Yellow ink 1 | | A | A |
| Ex. 2 | | Yellow ink 2 | 1 | A | A |
| Ex. 3 | | Yellow ink 3 | 1 | A | A |
| Ex. 4 | | Yellow ink 4 | 1 | A | A |
| Ex. 5 | Color ink 1 | Cyan ink 1 | 2 | A | A |
| | | Magenta ink 1 | | A | A |
| | | Yellow ink 1 | | A | A |
| Comp. Ex. 1 | Color ink 2 | Cyan ink 2 | 1 | C | B |
| | | Magenta ink 2 | | C | B |
| | | Yellow ink 5 | | F | D |
| Comp. Ex. 2 | | Yellow ink 6 | 1 | F | D |
| Comp. Ex. 3 | | Yellow ink 7 | 1 | F | D |

TABLE B4

| | | Results of evaluation 2 | |
|---|---|---|---|
| | | Ink | Evaluation 2 |
| Ex. 6 | Color ink 1 | Cyan ink 1 | A |
| | | Magenta ink 1 | A |
| | | Yellow ink 1 | A |
| Ex. 7 | | Yellow ink 2 | A |
| Ex. 8 | | Yellow ink 3 | A |
| Ex. 9 | | Yellow ink 4 | A |
| Comp. Ex. 5 | Color ink 2 | Cyan ink 2 | D |
| | | Magenta ink 2 | D |
| | | Yellow ink 5 | D |
| Comp. Ex. 6 | | Yellow ink 6 | D |

TABLE B5

Results of evaluations 3 and 4

| | | Ink | Reaction solution | Washing with water | Evaluation 3 | Evaluation 4 |
|---|---|---|---|---|---|---|
| Ex. 10 | Color ink 1 | Cyan ink 1 | 1 | Done | A | A |
| | | Magenta ink 1 | | | A | |
| | | Yellow ink 1 | | | A | |
| Comp. Ex. 7 | Color ink 1 | Cyan ink 1 | 1 | Not Done | C | A |
| | | Magenta ink 1 | | | C | |
| | | Yellow ink 1 | | | C | |
| Comp. Ex. 8 | Color ink 1 | Cyan ink 1 | None | Done | C | C |
| | | Magenta ink 1 | | | C | |
| | | Yellow ink 1 | | | C | |
| Comp. Ex. 9 | Color ink 1 | Cyan ink 1 | None | Not Done | C | C |
| | | Magenta ink 1 | | | C | |
| | | Yellow ink 1 | | | C | |
| Comp. Ex. 10 | Color ink 2 | Cyan ink 2 | 1 | Done | B | C |
| | | Magenta ink 2 | | | B | C |
| | | Yellow ink 5 | | | B | C |

Example C

Preparation of Pigment Dispersions C

Dispersion 1 of Pigment

Dispersion 1 of pigment was prepared in the same manner as described in Example 1 of Japanese Patent Laid-Open No. 316909/1998. Specifically, a reaction vessel equipped with an ultrasonic generator, a stirrer, and a temperature controller was charged with 5 parts by weight of carbon black, 3 parts by weight of a polymerizable surfactant represented by formula (II), and 80 parts by weight of water. Ultrasonic waves were applied to the mixture in the reaction vessel for 4 hr to comminute the mixture. Next, 1.6 parts by weight of acrylonitrile and 0.05 part by weight of potassium persulfate were further added to the reaction vessel, and a polymerization reaction was allowed to proceed at 60° C. for 48 hr. The desired product thus obtained was filtered through a 0.4-μm filter to remove coarse particles. Thus, the dispersion of pigment was prepared.

Dispersion 2 of Pigment

Carbon black (100 g) and 60 g of a polymerizable surfactant SE-10N manufactured by Asahi Denka Kogyo Ltd. were added to 1,000 g of ion-exchanged water. Ultrasonic waves generated by an ultrasonic generator were applied to the mixture for 2 hr to perform dispersion, followed by dispersion in a sand mill for additional about 2 hr. The dispersion was introduced into a reaction vessel equipped with an ultrasonic generator, a stirrer, a temperature controller, a reflux condenser, and a dropping funnel. Subsequently, a mixed monomer solution, previously prepared by mixing 20 g of phenoxyethyl methacrylate, 10 g of butyl methacrylate, and 10 g of methacrylic acid together, and 1 g of potassium persulfate were further added to the reaction vessel, and a polymerization reaction was allowed to proceed at 60° C. for 48 hr. The desired product thus obtained was adjusted to pH 8 by the addition of potassium hydroxide, and then passed through a 0.4-μm filter to remove coarse particles. Thus, the contemplated dispersion of pigment was prepared.

Dispersion of Magenta Pigment

C.I. Pigment Red 122 (100 g) and 60 g of a polymerizable surfactant SE-10N manufactured by Asahi Denka Kogyo Ltd. were added to 1,000 g of ion-exchanged water. Ultrasonic waves generated by an ultrasonic generator were applied to the mixture for 2 hr to perform dispersion, followed by dispersion in a sand mill for additional about 2 hr. The dispersion was introduced into a reaction vessel equipped with an ultrasonic generator, a stirrer, a temperature controller, a reflux condenser, and a dropping funnel. Subsequently, a mixed monomer solution, previously prepared by mixing 5 g of benzyl methacrylate, 15 g of butyl methacrylate, 10 g of dicyclopentanyl dimethacrylate, and 10 g of methacrylic acid together, and 1 g of potassium persulfate were further added to the reaction vessel, and a polymerization reaction was allowed to proceed at 60° C. for 48 hr. The desired product thus obtained was adjusted to pH 8 by the addition of potassium hydroxide, and then passed through a 0.4-μm filter to remove coarse particles. Thus, the contemplated dispersion of magenta pigment was prepared.

Dispersion of Cyan Pigment

C.I. Pigment Blue 15:3 (100 g) and 60 g of a polymerizable surfactant SE-10N manufactured by Asahi Denka Kogyo Ltd. were added to 1,000 g of ion-exchanged water. Ultrasonic waves generated by an ultrasonic generator were applied to the mixture for 2 hr to perform dispersion, followed by dispersion in a sand mill for additional about 2 hr. The dispersion was introduced into a reaction vessel equipped with an ultrasonic generator, a stirrer, a temperature controller, a reflux condenser, and a dropping funnel. Subsequently, a mixed monomer solution previously prepared by mixing 10 g of 2-acrylamido-2-methylpropanesulfonic acid, 10 g of acrylonitrile, 10 g of benzyl methacrylate, and 10 g of butyl methacrylate together and 1 g of potassium persulfate were further added to the reaction vessel, and a polymerization reaction was allowed to proceed at 60° C. for 48 hr. The desired product thus obtained was adjusted to pH 8 by the addition of potassium hydroxide, and then passed through a 0.4-μm filter to remove coarse particles. Thus, the contemplated dispersion of cyan pigment was prepared.

Dispersion of Yellow Pigment

C.I. Pigment Yellow 185 (100 g) and 60 g of a polymerizable surfactant SE-10N manufactured by Asahi Denka Kogyo Ltd. were added to 1,000 g of ion-exchanged water. Ultrasonic waves generated by an ultrasonic generator were applied to the mixture for 2 hr to perform dispersion, followed by dispersion in a sand mill for additional about 2 hr. The dispersion was introduced into a reaction vessel equipped with an ultrasonic generator, a stirrer, a temperature controller, a reflux condenser, and a dropping funnel. Subsequently, a mixed monomer solution, previously prepared by mixing 20 g of acrylonitrile and 20 g of dibutyl fumarate together, and 1 g of potassium persulfate were further added to the reaction vessel, and a polymerization reaction was allowed to proceed at 60° C. for 48 hr. The desired product thus obtained was adjusted to pH 8 by the addition of potassium hydroxide, and then passed through a 0.4-μm filter to remove coarse particles. Thus, the contemplated dispersion of yellow pigment was prepared.

Preparation of Resin Emulsion

Resin Emulsion 1

A flask equipped with a stirrer, a thermometer, a reflux condenser, and a dropping funnel was charged with 0.5 part by weight of potassium persulfate and 80 parts by weight of pure water to prepare a solution. The flask was heated while stirring the solution to raise the internal temperature of the flask to 70° C. Separately, 40 parts by weight of styrene, 45 parts by weight of butyl acrylate, 5 parts by weight of methacrylic acid, 1 part by weight of 2-hydroxyethyl acrylate, 1 part by weight of 1,6-hexanediol dimethacrylate, 1 part by weight of sodium laurylsulfate, and 40 parts by weight of pure water were stirred to mix them together. Thus, an emulsion was prepared. This emulsion was gradually added dropwise to the flask through the dropping funnel over a period of 3 hr to allow a polymerization reaction to proceed.

The fine particles of a resin thus obtained were adjusted to solid content 35% by weight and pH 8 by the addition of ion-exchanged water and aqueous ammonia, and then passed through a 0.2-μm filter. The average particle diameter was measured by a laser scattering method and found to be 180 nm. The aqueous emulsion of fine particles of the resin had a minimum film-forming temperature of 20° C. When 3 volumes of an aqueous emulsion containing 0.1% by weight of the fine particles of the resin was brought into contact with one volume of a 1 mol/liter aqueous magnesium nitrate solution, the time required for the transmission of light having a wavelength of 700 nm to become 50% of the initial value (half-value period) was 500 sec. The contact angle of an aqueous emulsion, prepared so as to contain 10% by weight of the fine particles of the resin, on a teflon sheet was 80 degrees.

Resin Emulsion 2

A reaction vessel equipped with a stirrer, a thermometer, a reflux condenser, and a dropping funnel was charged with 100 g of ion-exchanged water and 1.5 g of potassium persulfate. The internal temperature of the reaction vessel was raised to 70° C. under stirring while replacing the air in the reaction vessel by nitrogen. Separately, 100 g of ion-exchanged water, 2 g of sodium dodecylbenzenesulfonate, 60 g of styrene, 80 g of n-lauryl methacrylate, 10 g of methacrylic acid, and 5 g of acrylamide were stirred to mix them together. Thus, an emulsion was prepared. This emulsion was gradually added dropwise to the reaction vessel through the dropping funnel. The aqueous emulsion of fine particles of the resin thus obtained was cooled to room temperature, adjusted to solid content 35% by weight and pH 8 by the addition of ion-exchanged water and aqueous ammonia, and then passed through a 0.1-μm filter. The average particle diameter was measured by a laser scattering method and found to be 90 nm.

The aqueous emulsion of fine particles of the resin had a minimum film-forming temperature of 23° C. When 3 volumes of an aqueous emulsion containing 0.1% by weight of the fine particles of the resin was brought into contact with one volume of a 1 mol/liter aqueous magnesium nitrate solution, the time required for the transmission of light having a wavelength of 700 nm to become 50% of the initial value (half-value period) was 30 sec. The contact angle of an aqueous emulsion, prepared so as to contain 10% by weight of the fine particles of the resin, on a teflon sheet was 83 degrees.

Resin Emulsion 3

A reaction vessel equipped with a stirrer, a thermometer, a reflux condenser, and a dropping funnel was charged with 900 g of ion-exchanged water and 4 g of sodium laurylsulfate. The internal temperature of the reaction vessel was raised to 70° C. under stirring while replacing the air in the reaction vessel by nitrogen. While maintaining the internal temperature of the reaction vessel at 70° C., 2 g of potassium persulfate as a polymerization initiator was added to and dissolved in the system. Subsequently, an emulsion previously prepared by adding 450 g of ion-exchanged water, 3 g of sodium laurylsulfate, 435 g of styrene, 20 g of acrylamide, 475 g of butyl acrylate, 30 g of methacrylic acid, and 10 g of ethylene glycol dimethacrylate with stirring was then continuously added dropwise to the reaction vessel over a period of 3 hr. After the completion of the dropwise addition, the mixture was ripened for 3 hr.

The aqueous emulsion of fine particles of the resin thus obtained was cooled to room temperature, adjusted to solid content 35% by weight and pH 8 by the addition of ion-exchanged water and aqueous ammonia, and then passed through a 0.1-μm filter. The average particle diameter was measured by a laser scattering method and found to be 80 nm. The aqueous emulsion of fine particles of the resin had a minimum film-forming temperature of 22° C. When 3 volumes of an aqueous emulsion containing 0.1% by weight of the fine particles of the resin was brought into contact with one volume of a 1 mol/liter aqueous magnesium nitrate solution, the time required for the transmission of light having a wavelength of 700 nm to become 50% of the initial value (half-value period) was 5 sec. The contact angle of an aqueous emulsion, prepared so as to contain 10% by weight of the fine particles of the resin, on a teflon sheet was 113 degrees.

Resin Emulsion 4

A reaction vessel equipped with a stirrer, a thermometer, a reflux condenser, and a dropping funnel was charged with 900 g of ion-exchanged water and 4 g of sodium laurylsulfate. The internal temperature of the reaction vessel was raised to 70° C. under stirring while replacing the air in the reaction vessel by nitrogen. While maintaining the internal temperature of the reaction vessel at 70° C., 8 g of potassium persulfate as a polymerization initiator was added to and dissolved in the system. Subsequently, an emulsion previously prepared by adding 450 g of ion-exchanged water, 3 g of sodium laurylsulfate, 435 g of styrene, 475 g of butyl acrylate, 15 g of 2-acryloylamino-2-methylpropanesulfonic acid, 30 g of methacrylic acid, and 10 g of diethylene glycol dimethacrylate with stirring was then continuously added dropwise to the reaction vessel over a period of 3 hr. After the completion of the dropwise addition, the mixture was ripened for 3 hr.

The aqueous emulsion of fine particles of the resin thus obtained was cooled to room temperature, adjusted to solid content 35% by weight and pH 8 by the addition of ion-exchanged water and aqueous ammonia, and then passed through a 0.1-μm filter. The average particle diameter was measured by a laser scattering method and found to be 90 nm. The aqueous emulsion of fine particles of the resin had a minimum film-forming temperature of 20° C. When 3 volumes of an aqueous emulsion containing 0.1% by weight of the fine particles of the resin was brought into contact with one volume of a 1 mol/liter aqueous magnesium nitrate solution, the time required for the transmission of light having a wavelength of 700 nm to become 50% of the initial value (half-value period) was 7 sec. The contact angle of an aqueous emulsion, prepared so as to contain 10% by weight of the fine particles of the resin, on a teflon sheet was 115 degrees.

Resin Emulsion 5

A reaction vessel equipped with a stirrer, a thermometer, a reflux condenser, and a dropping funnel was charged with 900 g of ion-exchanged water. The internal temperature of the reaction vessel was raised to 70° C. while replacing the air in the reaction vessel by nitrogen under stirring. While holding the internal temperature of the reaction vessel at 70° C., 3.5 g of potassium persulfate as a polymerization initiator was added to and dissolved in the system. Subsequently, an emulsion previously prepared by adding 70 g of ion-exchanged water, 1 g of sodium laurylsulfate, 53 g of styrene, 59 g of butyl acrylate, and 0.16 g of t-dodecylmercaptan as a molecular weight modifier under stirring was then continuously added dropwise to the reaction vessel over a period of one hr. After the completion of the dropwise addition, the mixture was ripened for one hr.

Subsequently, an emulsion previously prepared by adding 79 g of styrene, 80 g of butyl acrylate, and 0.16 g of t-dodecylmercaptan to a mixture of 70 g of ion-exchanged water, 1 g of sodium laurylsulfate, and 1 g of acrylamide under stirring was continuously added dropwise to the reaction vessel over a period of one hr. After the completion of the dropwise addition, the mixture was ripened for one hr.

An aqueous solution of 3.5 g of ammonium persulfate as a polymerization initiator dissolved in 20 g of ion-exchanged water was then added to the reaction vessel. Further, an emulsion previously prepared by adding 300 g of ion-exchanged water, 2 g of sodium laurylsulfate, 16 g of acrylamide, 298 g of styrene, 297 g of butyl acrylate, 29 g of methacrylic acid, 30 g of diethylene glycol dimethacrylate, and 0.65 g of t-dodecylmercaptan under stirring was continuously added dropwise to the reaction vessel over a period of 3 hr. The aqueous emulsion of fine particles of the resin thus obtained was cooled to room temperature, adjusted to solid content 35% by weight and pH 8 by the addition of ion-exchanged water and aqueous ammonia, and then passed through a 0.1-μm filter. The average particle diameter was measured by a laser scattering method and found to be 90 nm.

The aqueous emulsion of fine particles of the resin had a minimum film-forming temperature of 23° C. When 3 volumes of a resin emulsion containing 0.1% by weight of the fine particles of the resin was brought into contact with one volume of a 1 mol/liter aqueous magnesium nitrate solution, the time required for the transmission of light having a wavelength of 700 nm to become 50% of the initial value (half-value period) was 6 sec. The contact angle of an aqueous emulsion, prepared so as to contain 10% by weight of the fine particles of the resin, on a teflon sheet was 114 degrees.

Resin Emulsion 6

A reaction vessel equipped with a stirrer, a thermometer, a reflux condenser, and a dropping funnel was charged with 900 g of ion-exchanged water. The internal temperature of the reaction vessel was raised to 70° C. while replacing the air in the reaction vessel by nitrogen under stirring. While holding the internal temperature of the reaction vessel at 70° C., 4 g of potassium persulfate as a polymerization initiator was added to and dissolved in the system. Subsequently, an emulsion previously prepared by adding 70 g of ion-exchanged water, 1 g of sodium laurylsulfate, 53 g of styrene, 59 g of butyl acrylate, 48 g of glycidyl methacrylate, and 0.16 g of t-dodecylmercaptan as a molecular weight modifier under stirring was then continuously added dropwise to the reaction vessel over a period of one hr. After the completion of the dropwise addition, the mixture was ripened for one hr.

Subsequently, an emulsion previously prepared by adding 79 g of styrene, 80 g of butyl acrylate, and 0.16 g of t-dodecylmercaptan to a mixture of 70 g of ion-exchanged water, 1 g of sodium laurylsulfate, and 1 g of acrylamide under stirring was continuously added dropwise to the reaction vessel over a period of one hr. After the completion of the dropwise addition, the mixture was ripened for one hr.

An aqueous solution of 4 g of ammonium persulfate as a polymerization initiator dissolved in 20 g of ion-exchanged water was then added to the reaction vessel. Further, an emulsion previously prepared by adding 300 g of ion-exchanged water, 2 g of sodium laurylsulfate, 16 g of acrylamide, 298 g of styrene, 297 g of butyl acrylate, 29 g of methacrylic acid, and 0.65 g of t-dodecylmercaptan under stirring was continuously added dropwise to the reaction vessel over a period of 3 hr. The aqueous emulsion of fine particles of the resin thus obtained was cooled to room temperature, adjusted to solid content 35% by weight and pH 8 by the addition of ion-exchanged water and aqueous ammonia, and then passed through a 0.1-μm filter. The average particle diameter was measured by a laser scattering method and found to be 90 nm.

The aqueous emulsion of fine particles of the resin had a minimum film-forming temperature of 24° C. When 3 volumes of an aqueous emulsion containing 0.1% by weight of the fine particles of the resin was brought into contact with one volume of a 1 mol/liter aqueous magnesium nitrate solution, the time required for the transmission of light having a wavelength of 700 nm to become 50% of the initial value (half-value period) was 10 sec. The contact angle of an aqueous emulsion, prepared so as to contain 10% by weight of the fine particles of the resin, on a teflon sheet was 108 degrees.

Preparation of Ink Composition C

Ink compositions as shown in Tables C1 to C3 below were prepared according to the following procedure. Ion-exchanged water, a water-soluble organic solvent, an acetylene glycol surfactant and the like and optional additives, such as a pH adjustor, a preservative, and a fungicide, were previously added and mixed together while stirring at room temperature to prepare a liquid mixture. The stirring liquid mixture was then gradually added to a predetermined amount of the aqueous emulsion of fine particles of a resin under stirring, followed by stirring for one hr. This was then gradually added to a predetermined amount of the dispersion of pigment under stirring, and the mixture was thoroughly stirred for additional one hr and then passed through a 5-μm membrane filter to prepare an ink composition.

TABLE C1

|  | Ink 1 | Ink 2 | Ink 3 | Ink 4 | Ink 5 | Ink 6 | Ink 7 | Ink 8 |
|---|---|---|---|---|---|---|---|---|
| Dispersion 1 of pigment (carbon black) | 10.0 |  |  |  |  |  |  |  |
| Dispersion 2 of pigment (carbon black) |  | 8.0 |  |  |  |  |  |  |
| Dispersion of magenta pigment |  |  | 8.0 |  |  | 8.0 |  |  |
| Dispersion of cyan pigment |  |  |  | 8.0 |  |  | 8.0 |  |
| Dispersion of yellow pigment |  |  |  |  | 8.0 |  |  | 8.0 |
| Resin emulsion particles 1 | 10.0 | 10.0 |  |  |  |  |  |  |
| Resin emulsion particles 2 |  |  | 10.0 |  |  |  |  |  |
| Resin emulsion particles 3 |  |  |  | 10.0 |  | 15.0 | 15.0 | 15.0 |

TABLE C1-continued

|  | Ink 1 | Ink 2 | Ink 3 | Ink 4 | Ink 5 | Ink 6 | Ink 7 | Ink 8 |
|---|---|---|---|---|---|---|---|---|
| Resin emulsion particles 4 |  |  |  |  | 10.0 |  |  |  |
| Maltitol | 5.0 | 2.0 | 2.0 | 2.0 | 2.0 | 2.0 | 2.0 | 2.0 |
| Xylol |  | 3.0 | 3.0 | 3.0 | 3.0 | 3.0 | 3.0 | 3.0 |
| Glycerin | 15.0 | 15.0 | 15.0 | 15.0 | 15.0 | 15.0 | 15.0 | 15.0 |
| 2-Pyrrolidone | 3.0 | 3.0 | 3.0 | 3.0 | 3.0 | 3.0 | 3.0 | 3.0 |
| Triethanolamine | 0.5 | 0.5 | 0.5 | 0.5 | 0.5 | 0.5 | 0.5 | 0.5 |
| Potassium hydroxide | 0.1 | 0.1 | 0.1 | 0.1 | 0.1 | 0.1 | 0.1 | 0.1 |
| Ion-exchanged water | Balance | Balance | Balance | Balance | Balance | Balance | Balance | Balance |

TABLE C2

|  | Ink 9 | Ink 10 | Ink 11 | Ink 12 | Ink 13 | Ink 14 | Ink 15 | Ink 16 | Ink 17 |
|---|---|---|---|---|---|---|---|---|---|
| Dispersion of magenta pigment | 7.0 |  |  | 7.0 |  |  | 7.0 |  |  |
| Dispersion of cyan pigment |  | 7.0 |  |  | 7.0 |  |  | 7.0 |  |
| Dispersion of yellow pigment |  |  | 7.0 |  |  | 7.0 |  |  | 7.0 |
| Resin emulsion particles 5 | 10.0 | 10.0 | 10.0 |  |  |  |  |  |  |
| Resin emulsion particles 6 |  |  |  | 18.0 | 18.0 | 18.0 | 10.0 | 10.0 | 10.0 |
| Olfine E 1010 | 1.0 | 1.0 | 1.0 |  |  |  | 0.4 | 0.4 | 0.4 |
| Surfynol 465 |  |  |  |  |  |  | 0.3 | 0.3 | 0.3 |
| Diethylene glycol monobutyl ether | 2.0 |  | 2.0 |  |  |  |  |  |  |
| Triethylene glycol monobutyl ether |  | 2.0 |  |  |  |  |  |  |  |
| Maltitol | 3.0 | 3.0 | 3.0 |  |  |  | 3.0 | 3.0 | 3.0 |
| Xylol | 1.0 | 1.0 | 1.0 | 5.0 | 5.0 | 5.0 | 2.0 | 2.0 | 2.0 |
| Glycerin | 15.0 | 15.0 | 15.0 | 15.0 | 15.0 | 15.0 | 15.0 | 15.0 | 15.0 |
| 2-Pyrrolidone |  |  |  | 4.0 | 4.0 | 4.0 |  |  |  |
| Triethanolamine | 0.5 | 0.5 | 0.5 | 0.5 | 0.5 | 0.5 | 0.5 | 0.5 | 0.5 |
| Potassium hydroxide | 0.1 | 0.1 | 0.1 | 0.1 | 0.1 | 0.1 | 0.1 | 0.1 | 0.1 |
| Ion-exchange water | Balance | Balance | Balance | Balance | Balance | Balance | Balance | Balance | Balance |

TABLE C3

|  | Ink 18 | Ink 19 | Ink 20 | Ink 21 | Ink 22 | Ink 23 |
|---|---|---|---|---|---|---|
| C.I. Pigment Red 122 | 3.0 |  |  | 3.0 |  |  |
| C.I. Pigment Blue 15:3 |  | 3.0 |  |  | 3.0 |  |
| C.I. Pigment Yellow 185 |  |  | 3.0 |  |  | 3.0 |
| Ammonium salt of styrene-acrylic acid copolymer (molecular weight 8000, polymer component 38%) | 2.0 | 2.0 | 2.0 | 2.0 | 2.0 | 2.0 |
| Resin emulsion particles 3 |  |  |  | 3.0 | 3.0 | 3.0 |
| Maltitol | 2.0 | 2.0 | 2.0 | 2.0 | 2.0 | 2.0 |
| Xylol | 3.0 | 3.0 | 3.0 | 3.0 | 3.0 | 3.0 |
| Glycerin | 10.0 | 10.0 | 10.0 | 10.0 | 10.0 | 10.0 |
| Triethanolamine | 0.5 | 0.5 | 0.5 | 0.5 | 0.5 | 0.5 |
| Potassium hydroxide | 0.1 | 0.1 | 0.1 | 0.1 | 0.1 | 0.1 |
| Ion-exchanged water | Balance | Balance | Balance | Balance | Balance | Balance |

Preparation of Reaction Solution C

A reaction solution was prepared according to the following formulation.

| Reaction solution 1 | |
|---|---|
| Magnesium nitrate hexahydrate | 25 wt % |
| Triethylene glycol monobutyl ether | 10 wt % |
| Glycerin | 20 wt % |
| Ion-exchanged water | Balance |
| Reaction solution 2 | |
| Magnesium acetate tetrahydrate | 25 wt% |
| Triethylene glycol monobutyl ether | 10 wt% |
| Glycerin | 20 wt% |
| Ion-exchanged water | Balance |
| Reaction solution 3 | |
| Polyallylamine represented by formula (VII) | 5 wt % |
| Triethylene glycol monobutyl ether | 10 wt % |
| Glycerin | 20 wt % |
| Ion-exchanged water | Balance |

Print Evaluation Test C

The ink compositions and the reaction solutions prepared above were printed in combination as indicated in Tables C4 to C6 by the recording apparatus according to the present invention on a PET (polyethylene terephthalate) film, an aluminum plate, an iron plate, an SBR sheet, and a glass plate, followed by washing with water to prepare objects for the following evaluation.

Evaluation 1: Fixation 1

In the prints, the printed portion was rubbed with a water-base yellow fluorescent marker pen (ZEBRA PEN 2 (tradename)) manufactured by ZEBRA at a marking force of 4.9 N/mm$^2$, and the fixation of ink was evaluated according to the following criteria. The results were as shown in Table C4.

A: The separation of the printed portion did not occur at all.

B: The separation of the printed portion slightly occurred.

C: The printed portion was completely separated.

Evaluation 2: Fixation 2

Blotted images were printed by the recording apparatus according to the present invention on the recording media described above, followed by washing with water and standing for 24 hr to prepare prints. The blotted image portion was cross cut to form squares having a one side length of 1 cm (area: 1 cm$^2$) at intervals of 1 mm. A Scotch tape was applied onto the cross-cut blotted image portion, and a load of 9.8 N/mm$^2$ was applied to the tape. The tape was then peeled off from the print to determine the number of crosscuts (1 mm×1 mm) remained unpeeled from the recording medium, followed by evaluation according to the following criteria. The results were as shown in Table C4.

A: 90 or more crosscuts remained unpeeled.

B: 60 to less than 90 crosscuts remained unpeeled.

C: Less than 60 crosscuts remained unpeeled.

Evaluation 3: Color Bleeding

In the prints, the printed portion was visually inspected for uneven color mixing in boundaries of different colors. The results were evaluated according to the following criteria. The evaluation results were as shown in Table C5.

A: There was no color mixing, and the boundaries of different colors were clear.

B: There was slight color mixing.

C: There was significant color mixing on such a level that rendered the boundaries of different colors unclear.

Evaluation 4: Ejection Stability

The ink composition was loaded into a recording head in the recording apparatus according to the present invention, and 1000 ruled lines were continuously printed. The prints were then visually inspected for dropouts, scattering of ink, and ink droplet trajectory directionality problem (deviation from predetermined ink droplet impact points), followed by the evaluation of the number of lines, suffering from the ink droplet trajectory directionality problem, out of the printed 1000 lines according to the following criteria. The evaluation results were as shown in Table C6.

A: An incidence of less than 10%

B: An incidence of 10 to 50%

C: An incidence of more than 50%

TABLE C4

| | | | | Evaluation 1: fixation 1 | | | | Evaluation 2: fixation 2 | | |
|---|---|---|---|---|---|---|---|---|---|---|
| | Ink | | Reaction | PET | | Aluminum | Iron | NBR | Aluminum | Iron | NBR |
| | set | Ink | solution | Washed | Not washed | Washed | Washed | Washed | Washed | Washed | Washed |
| Ex. 1 | — | Ink 1 | Reaction solution 1 | A | C | A | A | A | A | A | A |
| Ex. 2 | — | Ink 2 | Reaction solution 1 | A | C | A | A | A | A | A | A |
| Ex. 3 | Ink set 1 | Ink 3 Ink 4 Ink 5 | Reaction solution 1 | A | C | A | A | A | A | A | A |
| Ex. 4 | Ink set 2 | Ink 6 Ink 7 Ink 8 | Reaction solution 1 | A | C | A | A | A | A | A | A |
| Ex. 5 | Ink set 3 | Ink 6 Ink 7 Ink 8 | Reaction solution 2 | A | C | A | A | A | A | A | A |
| Ex. 6 | Ink set 4 | Ink 6 Ink 7 Ink 8 | Reaction solution 3 | A | C | A | A | A | A | A | A |
| Ex. 7 | Ink set 5 | Ink 9 Ink 10 Ink 11 | Reaction solution 2 | A | C | A | A | A | A | A | A |
| Ex. 8 | Ink set 6 | Ink 12 Ink 13 Ink 14 | Reaction solution 1 | A | C | A | A | A | A | A | A |
| Ex. 9 | Ink set 7 | Ink 15 Ink 16 Ink 17 | Reaction solution 1 | A | C | A | A | A | A | A | A |
| Comp. Ex. 1 | Ink set 8 | Ink 18 Ink 19 Ink 20 | Reaction solution 1 | C | C | C | C | C | C | C | C |
| Comp. Ex. 2 | Ink set 9 | Ink 21 Ink 22 Ink 23 | Reaction solution 1 | B | B | B | B | B | B | B | B |

TABLE C5

|  |  |  |  | Evaluation 3: color bleeding | | | | |
|---|---|---|---|---|---|---|---|---|
|  |  |  | PET | | Aluminum | Iron | NBR |
| | Ink set | Ink | Reaction solution | Washed | Not washed | Washed | Washed | Washed |
| Ex. 1 | — | Ink 1 | Reaction solution 1 | A | A | A | A | A |
| Ex. 2 | — | Ink 2 | Reaction solution 1 | A | A | A | A | A |
| Ex. 3 | Ink set 1 | Ink 3 Ink 4 Ink 5 | Reaction solution 1 | A | A | A | A | A |
| Ex. 4 | Ink set 2 | Ink 6 Ink 7 Ink 8 | Reaction solution 1 | A | A | A | A | A |
| Ex. 5 | Ink set 3 | Ink 6 Ink 7 Ink 8 | Reaction solution 2 | A | A | A | A | A |
| Ex. 6 | Ink set 4 | Ink 6 Ink 7 Ink 8 | Reaction solution 3 | A | A | A | A | A |
| Ex. 7 | Ink set 5 | Ink 9 Ink 10 Ink 11 | Reaction solution 2 | A | A | A | A | A |
| Ex. 8 | Ink set 6 | Ink 12 Ink 13 Ink 14 | Reaction solution 1 | A | A | A | A | A |
| Ex. 9 | Ink set 7 | Ink 15 Ink 16 Ink 17 | Reaction solution 1 | A | A | A | A | A |
| Comp. Ex. 1 | Ink set 8 | Ink 18 Ink 19 Ink 20 | Reaction solution 1 | C | C | C | C | C |
| Comp. Ex. 2 | Ink set 9 | Ink 21 Ink 22 Ink 23 | Reaction solution 1 | B | B | B | B | B |

TABLE C6

| | Ink set | Ink | Evaluation 4: ejection stability |
|---|---|---|---|
| Ex. 1 | — | Ink 1 | A |
| Ex. 2 | — | Ink 2 | A |
| Ex. 3 | Ink set 1 | Ink 3 | A |
| | | Ink 4 | A |
| | | Ink 5 | A |
| Ex. 4 | Ink set 2 | Ink 6 | A |
| | | Ink 7 | A |
| | | Ink 8 | A |
| Ex. 5 | Ink set 3 | Ink 6 | A |
| | | Ink 7 | A |
| | | Ink 8 | A |
| Ex. 6 | Ink set 4 | Ink 6 | A |
| | | Ink 7 | A |
| | | Ink 8 | A |
| Ex. 7 | Ink set 5 | Ink 9 | A |
| | | Ink 10 | A |
| | | Ink 11 | A |
| Ex. 8 | Ink set 6 | Ink 12 | A |
| | | Ink 13 | A |
| | | Ink 14 | A |
| Ex. 9 | Ink set 7 | Ink 15 | A |
| | | Ink 16 | A |
| | | Ink 17 | A |
| Comp. Ex. 1 | Ink set 8 | Ink 18 | B |
| | | Ink 19 | B |
| | | Ink 20 | B |
| Comp. Ex. 2 | Ink set 9 | Ink 21 | B |
| | | Ink 22 | B |
| | | Ink 23 | B |

Example D

Preparation of Resin Emulsion D

Resin Emulsion 1

A reaction vessel equipped with a stirrer, a thermometer, a reflux condenser, and a dropping funnel was charged with 700 g of ion-exchanged water and 4 g of sodium laurylsulfate. The internal temperature of the reaction vessel was raised to 70° C. under stirring while replacing the air in the reaction vessel by nitrogen. While maintaining the internal temperature of the reaction vessel at 70° C., 2 g of potassium persulfate as a polymerization initiator was added to and dissolved in the system. Subsequently, an emulsion previously prepared by adding 300 g of ion-exchanged water, 3 g of sodium laurylsulfate, 200 g of styrene, 400 g of butyl acrylate, 40 g of methacrylic acid, and 80 g of trifluoroethyl methacrylate with stirring was then continuously and gradually added dropwise through a dropping funnel to the reaction vessel over a period of 3 hr. After the completion of the dropwise addition, the mixture was ripened for 3 hr.

The resin emulsion thus obtained was cooled to room temperature, adjusted to solid content 35% by weight and pH 8 by the addition of ion-exchanged water and aqueous ammonia, and then passed through a 0.2-μm filter. The average particle diameter was measured by a laser scattering method and found to be 120 nm. The resin emulsion particle had a glass transition point of −4° C. The resin emulsion had a minimum film-forming temperature of 11° C. When 3 volumes of a resin emulsion containing 0.1% by weight of the resin emulsion particles was brought into contact with one volume of a 1 mol/liter aqueous magnesium nitrate solution, the time required for the transmission of light having a wavelength of 700 nm to become 50% of the initial value (half-value period) was 50 sec. The contact angle of a resin emulsion, prepared so as to contain 10% by weight of the resin emulsion particles, on a teflon sheet was 100 degrees.

Resin Emulsion 2

A reaction vessel equipped with a stirrer, a thermometer, a reflux condenser, and a dropping funnel was charged with 900 g of ion-exchanged water and 4 g of sodium laurylsulfate. The internal temperature of the reaction vessel was raised to 70° C. under stirring while replacing the air in the reaction vessel by nitrogen. While maintaining the internal temperature of the reaction vessel at 70° C., 2 g of potassium persulfate as a polymerization initiator was added to and dissolved in the system. Subsequently, an emulsion previously prepared by adding 450 g of ion-exchanged water, 3 g of sodium laurylsulfate, 435 g of styrene, 20 g of acrylamide, 475 g of butyl acrylate, 30 g of methacrylic acid, 50 g of heptadecafluorodecyl methacrylate, and 4 g of ethylene glycol dimethacrylate with stirring was then continuously and gradually added dropwise through a dropping funnel to the reaction vessel over a period of 3 hr. After the completion of the dropwise addition, the mixture was ripened for 3 hr.

The resin emulsion thus obtained was cooled to room temperature, adjusted to solid content 35% by weight and pH 8 by the addition of ion-exchanged water and aqueous ammonia, and then passed through a 0.1-μm filter. The average particle diameter was measured by a laser scattering method and found to be 90 nm. The resin emulsion particle had a glass transition point of 9° C. The resin emulsion had a minimum film-forming temperature of 24° C. When 3 volumes of a resin emulsion containing 0.1% by weight of the resin emulsion particles was brought into contact with one volume of a 1 mol/liter aqueous magnesium nitrate solution, the time required for the transmission of light having a wavelength of 700 nm to become 50% of the initial value (half-value period) was 5 sec. The contact angle of a resin emulsion, prepared so as to contain 10% by weight of the resin emulsion particles, on a teflon sheet was 110 degrees.

Resin Emulsion 3

A reaction vessel equipped with a stirrer, a thermometer, a reflux condenser, and a dropping funnel was charged with 900 g of ion-exchanged water and 4 g of sodium laurylsulfate. The internal temperature of the reaction vessel was raised to 70° C. under stirring while replacing the air in the reaction vessel by nitrogen. While maintaining the internal temperature of the reaction vessel at 70° C., 2 g of potassium persulfate as a polymerization initiator was added to and dissolved in the system. Subsequently, an emulsion previously prepared by adding 450 g of ion-exchanged water, 3 g of sodium laurylsulfate, 435 g of styrene, 475 g of butyl acrylate, 30 g of 2-acryloylamino-2-methylpropanesulfonic acid, 50 g of 2,2,3,4,4,4-hexafluorobutyl methacrylate, and 4 g of diethylene glycol dimethacrylate with stirring was then continuously and gradually added dropwise through a dropping funnel to the reaction vessel over a period of 3 hr. After the completion of the dropwise addition, the mixture was ripened for 3 hr.

The resin emulsion thus obtained was cooled to room temperature, adjusted to solid content 35% by weight and pH 8 by the addition of ion-exchanged water and aqueous ammonia, and then passed through a 0.1-μm filter. The average particle diameter was measured by a laser scattering method and found to be 95 nm. The resin emulsion particle had a glass transition point of 7° C. The resin emulsion had a minimum film-forming temperature of 21° C. When 3 volumes of a resin emulsion containing 0.1% by weight of the resin emulsion particles was brought into contact with one volume of a 1 mol/liter aqueous magnesium nitrate solution, the time required for the transmission of light having a wavelength of 700 nm to become 50% of the initial value (half-value period) was 7 sec. The contact angle of a resin emulsion, prepared so as to contain 10% by weight of the resin emulsion particles, on a teflon sheet was 115 degrees.

Resin Emulsion 4

A reaction vessel equipped with a stirrer, a thermometer, a reflux condenser, and a dropping funnel was charged with 900 g of ion-exchanged water. The internal temperature of the reaction vessel was raised to 70° C. while replacing the air in the reaction vessel by nitrogen under stirring. While holding the internal temperature of the reaction vessel at 70° C., 2 g of potassium persulfate as a polymerization initiator was added to and dissolved in the system. Subsequently, an emulsion previously prepared by adding 70 g of ion-exchanged water, 1 g of sodium laurylsulfate, 53 g of styrene, 59 g of butyl acrylate, 20 g of 2,2,3,3-tetrafluoropropyl methacrylate, and 0.16 g of t-dodecylmercaptan as a molecular weight modifier under stirring was then continuously added dropwise to the reaction vessel over a period of one hr. After the completion of the dropwise addition, the mixture was ripened for one hr.

Subsequently, an emulsion previously prepared by adding 79 g of styrene, 80 g of butyl acrylate, and 0.16 g of t-dodecylmercaptan to a mixture of 70 g of ion-exchanged water, 1 g of sodium laurylsulfate, and 1 g of acrylamide under stirring was continuously added dropwise to the reaction vessel over a period of one hr. After the completion of the dropwise addition, the mixture was ripened for one hr.

An aqueous solution of 2 g of ammonium persulfate as a polymerization initiator dissolved in 20 g of ion-exchanged water was then added to the reaction vessel. Further, an emulsion previously prepared by adding 300 g of ion-exchanged water, 2 g of sodium laurylsulfate, 16 g of acrylamide, 298 g of styrene, 297 g of butyl acrylate, 29 g of methacrylic acid, and 0.65 g of t-dodecylmercaptan under stirring was continuously added dropwise to the reaction vessel over a period of 3 hr. The resin emulsion thus obtained was cooled to room temperature, adjusted to solid content 35% by weight and pH 8 by the addition of ion-exchanged water and aqueous ammonia, and then passed through a 0.1-μm filter. The average particle diameter was measured by a laser scattering method and found to be 90 nm. The resin emulsion particle had a glass transition point of 8° C. The resin emulsion had a minimum film-forming temperature of 23° C. When 3 volumes of a resin emulsion containing 0.1% by weight of the resin emulsion particles was brought into contact with one volume of a 1 mol/liter aqueous magnesium nitrate solution, the time required for the transmission of light having a wavelength of 700 nm to become 50% of the initial value (half-value period) was 3 sec. The contact angle of a resin emulsion, prepared so as to contain 10% by weight of the resin emulsion particles, on a teflon sheet was 114 degrees.

Resin Emulsion 5

A reaction vessel equipped with a stirrer, a thermometer, a reflux condenser, and a dropping funnel was charged with 900 g of ion-exchanged water. The internal temperature of the reaction vessel was raised to 70° C. while replacing the air in the reaction vessel by nitrogen under stirring. While holding the internal temperature of the reaction vessel at 70° C., 2 g of potassium persulfate as a polymerization initiator was added to and dissolved in the system. Subsequently, an emulsion previously prepared by adding 70 g of ion-exchanged water, 1 g of sodium laurylsulfate, 53 g of styrene, 59 g of butyl acrylate, 48 g of glycidyl methacrylate, and 0.16 g of t-dodecylmercaptan as a molecular weight modifier under stirring was then continuously added dropwise to the reaction vessel over a period of one hr. After the completion of the dropwise addition, the mixture was ripened for one hr.

Subsequently, an emulsion previously prepared by adding 79 g of styrene, 80 g of butyl acrylate, 20 g of perfluorooctylethyl methacrylate, and 0.16 g of t-dodecylmercaptan to 70 g of ion-exchanged water, 1 g of sodium laurylsulfate, and 1 g of acrylamide under stirring was continuously added dropwise to the reaction vessel over a period of one hr. After the completion of the dropwise addition, the mixture was ripened for one hr.

An aqueous solution of 2 g of ammonium persulfate as a polymerization initiator dissolved in 20 g of ion-exchanged water was then added to the reaction vessel. Further, an emulsion previously prepared by adding 300 g of ion-exchanged water, 2 g of sodium laurylsulfate, 16 g of acrylamide, 298 g of styrene, 297 g of butyl acrylate, 29 g of methacrylic acid, and 0.65 g of t-dodecylmercaptan under stirring was continuously added dropwise to the reaction vessel over a period of 3 hr. The resin emulsion thus obtained was cooled to room temperature, adjusted to solid content 35% by weight and pH 8 by the addition of ion-exchanged water and aqueous ammonia, and then passed through a 0.1-µm filter. The average particle diameter was measured by a laser scattering method and found to be 90 nm. The resin emulsion particle had a glass transition point of 7° C. The resin emulsion had a minimum film-forming temperature of 23° C. When 3 volumes of a resin emulsion containing 0.1% by weight of the resin emulsion particles was brought into contact with one volume of a 1 mol/liter aqueous magnesium nitrate solution, the time required for the transmission of light having a wavelength of 700 nm to become 50% of the initial value (half-value period) was 3 sec. The contact angle of a resin emulsion, prepared so as to contain 10% by weight of the resin emulsion particles, on a teflon sheet was 114 degrees.

Resin Emulsion 6 (Comparative Example)

A reaction vessel equipped with a stirrer, a thermometer, a reflux condenser, and a dropping funnel was charged with 900 g of ion-exchanged water and 4 g of sodium laurylsulfate. The internal temperature of the reaction vessel was raised to 70° C. under stirring while replacing the air in the reaction vessel by nitrogen. While maintaining the internal temperature of the reaction vessel at 70° C., 2 g of potassium persulfate as a polymerization initiator was added to and dissolved in the system. Subsequently, an emulsion previously prepared by adding 450 g of ion-exchanged water, 3 g of sodium laurylsulfate, 435 g of styrene, 20 g of acrylamide, 475 g of methyl methacrylate, 30 g of methacrylic acid, 50 g of trifluoroethyl methacrylate, and 4 g of ethylene glycol dimethacrylate with stirring was then continuously and gradually added dropwise through a dropping funnel to the reaction vessel over a period of 3 hr. After the completion of the dropwise addition, the mixture was ripened for 3 hr.

The resin emulsion thus obtained was cooled to room temperature, adjusted to solid content 35% by weight and pH 8 by the addition of ion-exchanged water and aqueous ammonia, and then passed through a 0.1-µm filter. The average particle diameter was measured by a laser scattering method and found to be 90 nm. The resin emulsion particle had a glass transition point of 105° C. The resin emulsion had a minimum film-forming temperature of 120° C. When 3 volumes of a resin emulsion containing 0.1% by weight of the resin emulsion particles was brought into contact with one volume of a 1 mol/liter aqueous magnesium nitrate solution, the time required for the transmission of light having a wavelength of 700 nm to become 50% of the initial value (half-value period) was 6 sec. The contact angle of a resin emulsion, prepared so as to contain 10% by weight of the resin emulsion particles, on a teflon sheet was 110 degrees.

Preparation of Ink Composition D

Ink compositions as indicated in Tables D1 to D3 below were produced.

More specifically, these ink compositions were prepared as follows. For example, for black ink 1, 5% by weight of carbon black MA 7 manufactured by Mitsubishi Chemical corporation, 1% by weight of an ammonium salt of a styrene/acrylic acid copolymer (molecular weight 7,000, polymer component 38%), and 25% by weight of ion-exchanged water were mixed together, followed by dispersion in a sand mill for 2 hr to prepare a carbon black dispersion. Separately, 15% by weight of glycerin, 5% by weight of maltitol, 5% by weight of 2-pyrrolidone, 1% by weight of triethanolamine, and 1% by weight of potassium hydroxide were added to 26.1% by weight of ion-exchanged water, and the mixture was stirred at room temperature for 20 min to prepare a solution. The resin emulsion 1 was added to this solution so that the content of the resin emulsion particles of the resin emulsion 1 was 5% by weight based on the ink composition, followed by mixing with stirring. Next, this mixture was gradually added dropwise to the above carbon black dispersion with stirring, and the mixture was thoroughly stirred at room temperature, and was then passed through a 5-µm membrane filter to prepare an ink composition.

Other black inks, cyan inks, magenta inks, and yellow inks having formulations as specified in Tables D1 to D3 were prepared in the same manner as described above.

TABLE D1

| | Ex. 1 | | | | Ex. 2 | | | Ex.3 | | |
|---|---|---|---|---|---|---|---|---|---|---|
| | Black ink 1 | Cyan ink 1 | Magenta ink 1 | Yellow ink1 | Cyan ink 2 | Magenta ink 2 | Yellow ink 2 | Cyan ink 3 | Magenta ink 3 | Yellow ink 3 |
| Carbon black (MA 7 manufactured by Mitsubishi Chemical Corporation) | 5 | | | | | | | | | |
| C.I. Pigment Blue 15:3 | | 5 | | | 5 | | | 5 | | |

TABLE D1-continued

|  | Ex. 1 | | | | Ex. 2 | | | Ex.3 | | |
| --- | --- | --- | --- | --- | --- | --- | --- | --- | --- | --- |
|  | Black ink 1 | Cyan ink 1 | Magenta ink 1 | Yellow ink1 | Cyan ink 2 | Magenta ink 2 | Yellow ink 2 | Cyan ink 3 | Magenta ink 3 | Yellow ink 3 |
| C.I. Pigment Red 122 |  |  | 5 |  |  | 5 |  |  | 5 |  |
| C.I. Pigment Yellow 93 |  |  |  | 5 |  |  | 5 |  |  | 5 |
| Ammionium salt of styrene-acrylic acid copolymer (molecular weight 7000, polymer component 38%): dispersant | 1 | 1 | 1 | 1 | 1 | 1 | 1 |  |  |  |
| Resin emulsion 1 (concentration of resin emulsion particles) | 5 | 10 | 10 | 10 |  |  |  |  |  |  |
| Resin emulsion 2 (concentration of resin emulsion particles) |  |  |  |  | 10 | 10 | 10 |  |  |  |
| Resin emulsion 3 (concentration of resin emulsion particles) |  |  |  |  |  |  |  | 15 | 15 | 15 |
| Resin emulsion 4 (concentration of resin emulsion particles) |  |  |  |  |  |  |  |  |  |  |
| Resin emulsion 5 (concentration of resin emulsion particles) |  |  |  |  |  |  |  |  |  |  |
| Glycerin | 15 | 15 | 15 | 15 | 15 | 15 | 15 | 15 | 15 | 15 |
| Diethylene glycol |  |  |  |  |  |  |  |  |  |  |
| Maltitol | 5 |  |  |  | 3 | 3 | 3 | 3 | 3 | 3 |
| Xylose |  | 5 | 5 | 5 | 2 | 2 | 2 | 2 | 2 | 2 |
| 2-Pyrrolidone | 5 | 5 | 5 | 5 |  |  |  |  |  |  |
| N-Methyl-2-pyrrolidone |  |  |  |  | 5 | 5 | 5 |  |  |  |
| 1,3-Dimethyl-2-imidazolidinone |  |  |  |  |  |  |  | 5 | 5 | 5 |
| Triethylene glycol monobutyl ether |  |  |  |  |  |  |  |  |  |  |
| Triethanolamine | 1 | 1 | 1 | 1 | 1 | 1 | 1 | 1 | 1 | 1 |
| Potassium hydroxide | 1 | 1 | 1 | 1 | 1 | 1 | 1 | 1 | 1 | 1 |
| Ion-exchange water | Balance | Balance | Balance | Balance | Balance | Balance | Balance | Balance | Balance | Balance |

TABLE D2

|  | Ex. 4 | | | Ex. 5 | | |
| --- | --- | --- | --- | --- | --- | --- |
|  | Cyan ink 4 | Magenta ink 4 | Yellow ink 4 | Cyan ink 5 | Magenta ink 5 | Yellow ink 5 |
| C.I. Pigment Blue 15:3 | 5 |  |  | 5 |  |  |
| C.I. Pigment Red 122 |  | 5 |  |  | 5 |  |
| C.I. Pigment Yellow 93 |  |  | 5 |  |  | 5 |
| Ammonium salt of styrene-acrylic acid copolymer (molecular weight 7000, polymer component 38%) | 1 | 1 | 1 | 1 | 1 | 1 |
| Resin emulsion 4 (concentration of resin emulsion particles) | 15 | 15 | 15 |  |  |  |
| Resin emulsion 5 (concentration of resin emulsion paritcles) |  |  |  | 10 | 10 | 10 |
| Glycerin | 15 | 15 | 15 | 15 | 15 | 15 |
| Diethylene glycol |  |  |  |  |  |  |
| Maltitol | 3 | 3 | 3 |  |  |  |
| Xylose | 2 | 2 | 2 | 5 | 5 | 5 |
| 2-Pyrrolidone |  |  |  | 5 | 5 | 5 |
| N-Methyl-2-pyrrolidone |  |  |  |  |  |  |
| 1,3-Dimethyl-2-imidazolidinone | 5 | 5 | 5 |  |  |  |
| Triethylene glycol monobutyl ether |  |  |  | 3 | 3 | 3 |
| Triethanolamine | 1 | 1 | 1 | 1 | 1 | 1 |
| Potassium hydroxide | 1 | 1 | 1 | 1 | 1 | 1 |
| Ion-exchanged water | Balance | Balance | Balance | Balance | Balance | Balance |

TABLE D3

|  | Comp. Ex. 1 | | | | Comp. Ex. 2 | | | Comp. Ex. 3 | | |
| --- | --- | --- | --- | --- | --- | --- | --- | --- | --- | --- |
|  | Black ink 2 | Cyan ink 6 | Magenta ink 6 | Yellow ink 6 | Cyan ink 7 | Magenta ink 7 | Yellow ink 7 | Cyan ink 8 | Magenta ink 8 | Yellow ink 8 |
| Carbon black (MA 7 manufactured by Mitsubishi Chemical Corporation) | 5 |  |  |  |  |  |  |  |  |  |
| C.I. Pigment Blue 15:3 |  | 5 |  |  | 5 |  |  | 5 |  |  |

TABLE D3-continued

| | Comp. Ex. 1 | | | | Comp Ex. 2 | | | Comp Ex. 3 | | |
|---|---|---|---|---|---|---|---|---|---|---|
| | Black ink 2 | Cyan ink 6 | Magenta ink 6 | Yellow ink 6 | Cyan ink 7 | Magenta ink 7 | Yellow ink 7 | Cyan ink 8 | Magenta ink 8 | Yellow ink 8 |
| C.I. Pigment Red 122 | | | 5 | | | 5 | | | 5 | |
| C.I. Pigment Yellow 93 | | | | 5 | | | 5 | | | 5 |
| Ammonium salt of styrene-acrylic acid copolymer (molecular weight 7000, polymer component 38%) | 1 | 1 | 1 | 1 | 1 | 1 | 1 | 1 | 1 | 1 |
| Resin emulsion 6 (concentration of resin emulsion particles) | | | | | | | | 10 | 10 | 10 |
| Glycerin | 15 | 15 | 15 | 15 | 15 | 15 | 15 | 15 | 15 | 15 |
| Diethylene glycol | | | | | | | | | | |
| Maltitol | 5 | | | | 5 | 5 | 5 | 5 | 5 | 5 |
| Xylose | | 5 | 5 | 5 | | | | | | |
| 2-Pyrrolidone | 4 | 5 | 5 | 5 | | | | | | |
| N-Methyl-2-pyrrolidone | | | | | 5 | 5 | 5 | 5 | 5 | 5 |
| 1,3-Dimethyl-2-imidazolidinone | | | | | | | | | | |
| Triethylene glycol monobutyl ether | | | | | | | | | | |
| Triethanolamine | 1 | 1 | 1 | 1 | 1 | 1 | 1 | 1 | 1 | 1 |
| Potassium hydroxide | 1 | 1 | 1 | 1 | 1 | 1 | 1 | 1 | 1 | 1 |
| Ion-exchanged water | Balance | Balance | Balance | Balance | Balance | Balance | Balance | Balance | Balance | Balance |

Preparation of Reaction Solution D

The following ingredients were mixed together to prepare reaction solutions.

| Reaction solution 1 | |
|---|---|
| Magnesium nitrate hexahydrate | 25 wt % |
| Triethylene glycol monobutyl ether | 10 wt % |
| Glycerin | 20 wt % |
| Ammonia | 0.5 wt % |
| Pure water | Balance |
| Reaction solution 2 | |
| Magnesium acetate hydrate | 25 wt % |
| Triethylene glycol monobutyl ether | 10 wt % |
| Glycerin | 20 wt % |
| Ammonia | 0.5 wt % |
| Pure water | Balance |

Print Evaluation Test D

The ink composition and the reaction solution prepared above were printed in combination by the recording apparatus according to the present invention on a PET (polyethylene terephthalate) film, an aluminum plate, an iron plate, an SBR sheet, and a glass plate, followed by washing with water to prepare prints.

Evaluation 1: Fixation

In the prints, the printed portion was rubbed with a water-base yellow fluorescent marker pen (ZEBRA PEN 2 (tradename)) manufactured by ZEBRA at a marking force of 4.9 N/mm², and the fixation of ink was evaluated according to the following criteria.

A: The separation of the printed portion did not occur at all.

B: The separation of the printed portion slightly occurred.

C: The printed portion was completely separated.

Evaluation 2: Color Bleeding

In the prints, the printed portion was visually inspected for uneven color mixing in boundaries of different colors, followed by evaluation according to the following criteria.

A: There was no color mixing.

B: There was slight color mixing.

C: There was significant color mixing on such a level that rendered the boundaries of different colors unclear.

Evaluation 3: Weathering Resistance 1

The ink composition and the reaction solution were printed in combination by the recording apparatus according to the present invention on a PET (polyethylene terephthalate) film, an aluminum plate, an iron plate, an SBR sheet, and a glass plate to form blotted images, followed by washing with water to prepare prints. The prints were then allowed to stand in an atmosphere of temperature 40° C. and humidity 60% for 3 months, followed by evaluation according to the following criteria.

A: None of elimination, blistering, and peeling occurred at all in the printed portion.

B: Elimination, blistering, and peeling slightly occurred in the printed portion.

C: The printed portion was completely eliminated or peeled off, and was rusted.

Evaluation 4: Weathering Resistance 2

The ink composition and the reaction solution were printed in combination by the recording apparatus according to the present invention on an aluminum plate or an iron plate to form blotted images, followed by washing with water to prepare prints. The prints were subjected to a salt spray test at 25° C. for 2 months, and were then evaluated according to the following criteria.

A: None of elimination, blistering, and peeling occurred at all in the printed portion.

B: Elimination, blistering, and peeling slightly occurred in the printed portion.

C: The printed portion was completely eliminated or peeled off, and was rusted.

Evaluation 5: Ejection Stability

The ink composition was loaded into a recording head in the recording apparatus according to the present invention, and 1000 ruled lines were continuously printed. The prints were then visually inspected for dropouts, scattering of ink, and ink droplet trajectory directionality problem (deviation from predetermined ink droplet impact points), followed by the evaluation of the number of lines, suffering from the above problems, out of the printed 1000 lines according to the following criteria.

A: An incidence of less than 10%
B: An incidence of 10 to 50%
C: An incidence of more than 50%

The results of the print evaluation test were as shown in Table D4 below.

nm. The resin emulsion particles had a glass transition point of 5° C. The resin emulsion had a minimum film-forming temperature of 20° C. When 3 volumes of a resin emulsion containing 0.1% by weight of the resin emulsion particles was brought into contact with one volume of a 1 mol/liter aqueous magnesium nitrate solution, the time required for the transmission of light having a wavelength of 700 nm to become 50% of the initial value (half-value period) was 500 sec. The contact angle of a resin emulsion, prepared so as to contain 10% by weight of the resin emulsion particles, on a teflon sheet was 80 degrees.

TABLE D4

|  | Ink | Reaction solution | Evaluation 1: fixation | | | | | Evaluation 2: color bleeding | Evaluation 3: weathering resistance 1 | Evaluation 4: weathering resistance 2 | Evaluation 5: ejection stability |
|  |  |  | PET Washed | PET Not washed | Aluminum Washed | Iron Washed | NBR Washed |  |  |  |  |
| --- | --- | --- | --- | --- | --- | --- | --- | --- | --- | --- | --- |
| Ex. 1 | Blank Ink 1<br>Cyan ink 1<br>Magenta ink 1<br>Yellow ink 1 | Reaction solution 1 | A | C | A | A | A | A | A | A | A |
| Ex. 2 | Cyan ink 2<br>Magenta ink 2<br>Yellow ink 2 | Reaction solution 1 | A | C | A | A | A | A | A | A | A |
| Ex. 2B | Cyan ink 2<br>Magenta ink 2<br>Yellow ink 2 | Reaction solution 2 | A | C | A | A | A | A | A | A | A |
| Ex. 3 | Cyan ink 3<br>Magenta ink 2<br>Yellow ink 2 | Reaction solution 1 | A | C | A | A | A | A | A | A | A |
| Ex. 4 | Cyan ink 4<br>Magenta ink 4<br>Yellow ink 4 | Reaction solution 1 | A | C | A | A | A | A | A | A | A |
| Ex. 5 | Cyan ink 5<br>Magenta ink 5<br>Yellow ink 5 | Reaction solution 1 | A | C | A | A | A | A | A | A | A |
| Comp. Ex. 1 | Black ink 2<br>Cyan ink 6<br>Magenta ink 6<br>Yellow ink 6 | Reaction solution 1 | C | C | C | C | C | C | C | C | B |
| Comp. Ex. 2 | Cyan ink 7<br>Magenta ink 7<br>Yellow ink 7 | Reaction solution 1 | C | C | C | C | C | A | C | C | A |
| Comp. Ex. 3 | Cyan ink 8<br>Magenta ink 8<br>Yellow ink 8 | Reaction solution 1 | C | C | C | C | C | A | C | C | A |

Example E

Preparation of Resin Emulsion E

Resin Emulsion 1

A reaction vessel equipped with a stirrer, a thermometer, a reflux condenser, and a dropping funnel was charged with 100 g of ion-exchanged water and 0.2 g of potassium persulfate. The internal temperature of the reaction vessel was raised to 70° C. under stirring while replacing the air in the reaction vessel by nitrogen. Separately, 100 g of ion-exchanged water, 2 g of sodium dodecylbenzenesulfonate, 60 g of styrene, 80 g of butyl acrylate, 10 g of methacrylic acid, and 20 g of methacryloyl diacetylmethane were stirred to mix them together. Thus, an emulsion was prepared. This emulsion was gradually added dropwise to the reaction vessel through the dropping funnel. The resin emulsion thus obtained was cooled to room temperature, adjusted to solid content 35% by weight and pH 8 by the addition of ion-exchanged water and aqueous ammonia, and then passed through a 0.2-μm filter. The average particle diameter was measured by a laser scattering method and found to be 180

Resin Emulsion 2

A reaction vessel equipped with a stirrer, a thermometer, a reflux condenser, and a dropping funnel was charged with 100 g of ion-exchanged water and 0.2 g of potassium persulfate. The internal temperature of the reaction vessel was raised to 70° C. under stirring while replacing the air in the reaction vessel by nitrogen. Separately, 100 g of ion-exchanged water, 2 g of sodium dodecylbenzenesulfonate, 60 g of styrene, 80 g of n-lauryl methacrylate, 10 g of methacrylic acid, 5 g of acrylamide, and 20 g of 2-acetacetoxyethyl methacrylate were stirred to mix them together. Thus, an emulsion was prepared. This emulsion was gradually added dropwise to the reaction vessel through the dropping funnel. The resin emulsion thus obtained was cooled to room temperature, adjusted to solid content 35% by weight and pH 8 by the addition of ion-exchanged water and aqueous ammonia, and then passed through a 0.1-μm filter. The average particle diameter was measured by a laser scattering method and found to be 90 nm. The resin emulsion particles had a glass transition point of 8° C. The resin emulsion had a minimum film-forming temperature of 23° C. When 3 volumes of a resin emulsion containing 0.1% by weight of the resin emulsion particles was brought into contact with one volume of a 1 mol/liter aqueous magnesium nitrate solution, the time required for the transmission of light having a wavelength of 700 nm to become 50% of the initial value (half-value period) was 10 sec. The contact angle of a resin emulsion, prepared so as to contain 10% by weight of the resin emulsion particles, on a teflon sheet was 83 degrees.

Resin Emulsion 3

A reaction vessel equipped with a stirrer, a thermometer, a reflux condenser, and a dropping funnel was charged with 900 g of ion-exchanged water and 4 g of sodium laurylsulfate. The internal temperature of the reaction vessel was raised to 70° C. under stirring while replacing the air in the reaction vessel by nitrogen. While maintaining the internal temperature of the reaction vessel at 70° C., 2 g of potassium persulfate as a polymerization initiator was added to and dissolved in the contents of the reaction vessel. Subsequently, an emulsion previously prepared by adding 450 g of ion-exchanged water, 3 g of sodium laurylsulfate, 435 g of styrene, 20 g of acrylamide, 475 g of butyl acrylate, 30 g of methacrylic acid, 50 g of 2-acetacetoxyethyl methacrylate, and 4 g of ethylene glycol dimethacrylate with stirring was then continuously and gradually added dropwise through a dropping funnel to the reaction vessel over a period of 3 hr. After the completion of the dropwise addition, the mixture was ripened for 3 hr.

The resin emulsion thus obtained was cooled to room temperature, adjusted to solid content 35% by weight and pH 8 by the addition of ion-exchanged water and aqueous ammonia, and then passed through a 0.1-μm filter. The average particle diameter was measured by a laser scattering method and found to be 90 nm. The resin emulsion particles had a glass transition point of 8° C. The resin emulsion had a minimum film-forming temperature of 23° C. When 3 volumes of a resin emulsion containing 0.1% by weight of the resin emulsion particles was brought into contact with one volume of a 1 mol/liter aqueous magnesium nitrate solution, the time required for the transmission of light having a wavelength of 700 nm to become 50% of the initial value (half-value period) was 6 sec. The contact angle of a resin emulsion, prepared so as to contain 10% by weight of the resin emulsion particles, on a teflon sheet was 110 degrees.

Resin Emulsion 4

A reaction vessel equipped with a stirrer, a thermometer, a reflux condenser, and a dropping funnel was charged with 900 g of ion-exchanged water and 4 g of sodium laurylsulfate. The internal temperature of the reaction vessel was raised to 70° C. under stirring while replacing the air in the reaction vessel by nitrogen. While maintaining the internal temperature of the reaction vessel at 70° C., 2 g of potassium persulfate as a polymerization initiator was added to and dissolved in the contents of the reaction vessel. Subsequently, an emulsion previously prepared by adding 450 g of ion-exchanged water, 3 g of sodium laurylsulfate, 435 g of styrene, 475 g of butyl acrylate, 30 g of 2-acryloylamino-2-methylpropanesulfonic acid, 50 g of methacryloyl diacetylmethane, and 4 g of diethylene glycol dimethacrylate with stirring was then continuously and gradually added dropwise through a dropping funnel to the reaction vessel over a period of 3 hr. After the completion of the dropwise addition, the mixture was ripened for 3 hr.

The resin emulsion thus obtained was cooled to room temperature, adjusted to solid content 35% by weight and pH 8 by the addition of ion-exchanged water and aqueous ammonia, and then passed through a 0.1-μm filter. The average particle diameter was measured by a laser scattering method and found to be 95 nm. The resin emulsion particles had a glass transition point of 8° C. The resin emulsion had a minimum film-forming temperature of 20° C. When 3 volumes of a resin emulsion containing 0.1% by weight of the resin emulsion particles was brought into contact with one volume of a 1 mol/liter aqueous magnesium nitrate solution, the time required for the transmission of light having a wavelength of 700 nm to become 50% of the initial value (half-value period) was 6 sec. The contact angle of a resin emulsion, prepared so as to contain 10% by weight of the resin emulsion particles, on a teflon sheet was 115 degrees.

Resin Emulsion 5

A reaction vessel equipped with a stirrer, a thermometer, a reflux condenser, and a dropping funnel was charged with 900 g of ion-exchanged water. The internal temperature of the reaction vessel was raised to 70° C. while replacing the air in the reaction vessel by nitrogen under stirring. While holding the internal temperature of the reaction vessel at 70° C., 2 g of potassium persulfate as a polymerization initiator was added to and dissolved in the contents of the reaction vessel. Subsequently, an emulsion previously prepared by adding 70 g of ion-exchanged water, 1 g of sodium laurylsulfate, 53 g of styrene, 59 g of butyl acrylate, and 0.16 g of t-dodecylmercaptan as a molecular weight modifier under stirring was then continuously added dropwise to the reaction vessel over a period of one hr. After the completion of the dropwise addition, the mixture was ripened for one hr.

Subsequently, an emulsion previously prepared by adding 79 g of styrene, 80 g of butyl acrylate, and 0.16 g of t-dodecylmercaptan to 70 g of ion-exchanged water, 1 g of sodium laurylsulfate, and 1 g of acrylamide under stirring was continuously added dropwise to the reaction vessel over a period of one hr. After the completion of the dropwise addition, the mixture was ripened for one hr.

An aqueous solution of 2 g of ammonium persulfate as a polymerization initiator dissolved in 20 g of ion-exchanged water was then added to the reaction vessel. Further, an emulsion previously prepared by adding 300 g of ion-exchanged water, 2 g of sodium laurylsulfate, 40 g of 2-acetacetoxyethyl methacrylate, 16 g of acrylamide, 298 g of styrene, 297 g of butyl acrylate, 29 g of methacrylic acid, and 0.65 g of t-dodecylmercaptan under stirring was continuously added dropwise to the reaction vessel over a period of 3 hr. The resin emulsion thus obtained was cooled to room temperature, adjusted to solid content 35% by weight and pH 8 by the addition of ion-exchanged water and aqueous ammonia, and then passed through a 0.1-μm filter. The average particle diameter was measured by a laser scattering method and found to be 90 nm. The resin emulsion particles had a glass transition point of 8° C. The resin emulsion had a minimum film-forming temperature of 23° C. When 3 volumes of a resin emulsion containing 0.1% by weight of the resin emulsion particles was brought into contact with one volume of a 1 mol/liter aqueous magnesium nitrate solution, the time required for the transmission of light having a wavelength of 700 nm to become 50% of the initial value (half-value period) was 3 sec. The contact angle of a resin emulsion, prepared so as to contain 10% by weight of the resin emulsion particles, on a teflon sheet was 114 degrees.

Resin Emulsion 6

A reaction vessel equipped with a stirrer, a thermometer, a reflux condenser, and a dropping funnel was charged with 900 g of ion-exchanged water. The internal temperature of the reaction vessel was raised to 70° C. while replacing the air in the reaction vessel by nitrogen under stirring. While holding the internal temperature of the reaction vessel at 70° C., 2 g of potassium persulfate as a polymerization initiator was added to and dissolved in the contents of the reaction vessel. Subsequently, an emulsion previously prepared by adding 70 g of ion-exchanged water, 1 g of sodium laurylsulfate, 53 g of styrene, 59 g of butyl acrylate, 48 g of glycidyl methacrylate, and 0.16 g of t-dodecylmercaptan as a molecular weight modifier under stirring was then continuously added dropwise to the reaction vessel over a period of one hr. After the completion of the dropwise addition, the mixture was ripened for one hr.

Subsequently, an emulsion previously prepared by adding 79 g of styrene, 80 g of butyl acrylate, and 0.16 g of t-dodecylmercaptan to 70 g of ion-exchanged water, 1 g of sodium laurylsulfate, and 1 g of acrylamide under stirring was continuously added dropwise to the reaction vessel over a period of one hr. After the completion of the dropwise addition, the mixture was ripened for one hr.

An aqueous solution of 2 g of ammonium persulfate as a polymerization initiator dissolved in 20 g of ion-exchanged water was then added to the reaction vessel. Further, an emulsion previously prepared by adding 300 g of ion-exchanged water, 2 g of sodium laurylsulfate, 40 g of diethyl methacryloylmalonate, 16 g of acrylamide, 298 g of styrene, 297 g of butyl acrylate, 29 g of methacrylic acid, and 0.65 g of t-dodecylmercaptan under stirring was continuously added dropwise to the reaction vessel over a period of 3 hr. The resin emulsion thus obtained was cooled to room temperature, adjusted to solid content 35% by weight and pH 8 by the addition of ion-exchanged water and aqueous ammonia, and then passed through a 0.1-μm filter. The average particle diameter was measured by a laser scattering method and found to be 90 nm. The resin emulsion particle had a glass transition point of 8° C. The resin emulsion had a minimum film-forming temperature of 23° C. When 3 volumes of a resin emulsion containing 0.1% by weight of the resin emulsion particles was brought into contact with one volume of a 1 mol/liter aqueous magnesium nitrate solution, the time required for the transmission of light having a wavelength of 700 nm to become 50% of the initial value (half-value period) was 3 sec. The contact angle of a resin emulsion, prepared so as to contain 10% by weight of the resin emulsion particles, on a teflon sheet was 114 degrees.

Resin Emulsion 7 (Comparative Example)

A reaction vessel equipped with a stirrer, a thermometer, a reflux condenser, and a dropping funnel was charged with 100 g of ion-exchanged water and 0.2 g of potassium persulfate. The internal temperature of the reaction vessel was raised to 70° C. under stirring while replacing the air in the reaction vessel by nitrogen. Separately, 100 g of ion-exchanged water, 2 g of sodium dodecylbenzenesulfonate, 60 g of styrene, 80 g of n-lauryl methacrylate, 0.2 g of methacrylic acid, and 20 g of methacryloylacetone (prepared according to Makromol. Chem., 29, 151 (1959)) were stirred to mix them together. Thus, an emulsion was prepared. This emulsion was gradually added dropwise to the reaction vessel through the dropping funnel. The resin emulsion thus obtained was cooled to room temperature, adjusted to solid content 35% by weight and pH 8 by the addition of ion-exchanged water and aqueous ammonia, and then passed through a 0.2-μm filter. The average particle diameter was measured by a laser scattering method and found to be 180 nm. The resin emulsion particles had a glass transition point of 0° C. The resin emulsion had a minimum film-forming temperature of 15° C. When 3 volumes of a resin emulsion containing 0.1% by weight of the resin emulsion particles was brought into contact with one volume of a 1 mol/liter aqueous magnesium nitrate solution, the time required for the transmission of light having a wavelength of 700 nm to become 50% of the initial value (half-value period) was 500 sec. The contact angle of a resin emulsion, prepared so as to contain 10% by weight of the resin emulsion particles, on a teflon sheet was 50 degrees.

Resin Emulsion 8 (Comparative Example)

A reaction vessel equipped with a stirrer, a thermometer, a reflux condenser, and a dropping funnel was charged with 900 g of ion-exchanged water and 4 g of sodium laurylsulfate. The internal temperature of the reaction vessel was raised to 70° C. under stirring while replacing the air in the reaction vessel by nitrogen. While maintaining the internal temperature of the reaction vessel at 70° C., 2 g of potassium persulfate as a polymerization initiator was added to and dissolved in the contents of the reaction vessel. Subsequently, an emulsion previously prepared by adding 450 g of ion-exchanged water, 3 g of sodium laurylsulfate, 435 g of styrene, 20 g of acrylamide, 475 g of methyl methacrylate, 30 g of methacrylic acid, 50 g of 2-acetacetoxyethyl methacrylate, and 4 g of ethylene glycol dimethacrylate with stirring was then continuously and gradually added dropwise through a dropping funnel to the reaction vessel over a period of 3 hr. After the completion of the dropwise addition, the mixture was ripened for 3 hr.

The resin emulsion thus obtained was cooled to room temperature, adjusted to solid content 35% by weight and pH 8 by the addition of ion-exchanged water and aqueous ammonia, and then passed through a 0.1-μm filter. The average particle diameter was measured by a laser scattering method and found to be 90 nm. The resin emulsion particles had a glass transition point of 110° C. The resin emulsion had a minimum film-forming temperature of 125° C. When 3 volumes of a resin emulsion containing 0.1% by weight of the resin emulsion particles was brought into contact with one volume of a 1 mol/liter aqueous magnesium nitrate solution, the time required for the transmission of light having a wavelength of 700 nm to become 50% of the initial value (half-value period) was 6 sec. The contact angle of a resin emulsion, prepared so as to contain 10% by weight of the resin emulsion particles, on a teflon sheet was 110 degrees.

Preparation of Ink Composition E

Ink compositions as indicated in Tables E1 to E3 below were prepared as follows.

Black Ink 1

Carbon black MA 7 manufactured by Mitsubishi Chemical Corporation (5% by weight), 1% by weight of an ammonium salt of a styrene/acrylic acid copolymer (molecular weight 7,000, polymer component 38%), and 25% by weight of ion-exchanged water were mixed together, followed by dispersion in a sand mill for 2 hr to prepare a carbon black dispersion. Separately, 15% by weight of glycerin, 5% by weight of maltitol, 5% by weight of 2-pyrrolidone, 1% by weight of triethanolamine, and 1% by weight of potassium hydroxide were added to 26.1% by weight of ion-exchanged water, and the mixture was stirred at room temperature for 20 min to prepare a solution. The resin emulsion 1 was added to this solution so that the content of the resin emulsion particles of the resin emulsion 1 was 5% by weight based on the ink composition, followed by mixing with stirring. Next, this mixture was gradually added dropwise to the above carbon black dispersion with stirring, and the mixture was thoroughly stirred at room temperature, and was then passed through a 5-μm membrane filter to prepare an ink composition.

Black ink 2 and black ink 3 were prepared in the same manner as described above.

Preparation of Cyan Ink 1

C.I. Pigment Blue 15:3 (5% by weight), 1% by weight of an ammonium salt of a styrene/acrylic acid copolymer (molecular weight 7,000, polymer component 38%), and 15% by weight of ion-exchanged water were mixed together, followed by dispersion in a sand mill for 2 hr to prepare a pigment dispersion of C.I. Pigment Blue 15:3. An aqueous ethylenediaminetetraacetic acid solution previously prepared by dissolving 0.1% by weight of ethylenediaminetetraacetic acid in 5% by weight of ion-exchanged water was added to this pigment dispersion, followed by mixing with stirring. Separately, 15% by weight of glycerin, 5% by weight of xylose, 5% by weight of 2-pyrrolidone, 1% by weight of triethanolamine, and 1% by weight of potassium hydroxide were added to 16.7% by weight of ion-exchanged water, and the mixture was stirred at room temperature for 20 min to prepare a solution. The resin emulsion 3 was added to this solution so that the content of the resin emulsion particles of the resin emulsion 3 was 10% by weight based on the ink composition, followed by mixing with stirring. Next, this mixture was gradually added dropwise to the above pigment dispersion with stirring, and the mixture was thoroughly stirred at room temperature, and was then passed through a 5-μm membrane filter to prepare an ink composition.

Cyan inks 2 to 6, magenta inks 1 to 6, yellow inks 1 to 6, and black ink 4 were prepared in the same manner as described above.

TABLE E1

|  | Ex. 1 | Ex. 2 | Ex. 3 | Ex. 4 | | | Ex. 5 | | |
| --- | --- | --- | --- | --- | --- | --- | --- | --- | --- |
|  | Black ink 1 | Black ink 2 | Black ink 3 | Cyan ink 1 | Magenta ink 1 | Yellow ink 1 | Cyan ink 2 | Magenta ink 2 | Yellow ink 2 |
| Carbon black (MA 7 manufactured by Mitsubishi Chemical Corporation) | 5 | 5 | 5 | | | | | | |
| C.I. Pigment Blue 15:3 | | | | 5 | | | 5 | | |
| C.I. Pigment Red 122 | | | | | 5 | | | 5 | |
| C.I. Pigment Yellow 93 | | | | | | 5 | | | 5 |
| Ammonium salt of styrene-acrylic acid copolymer (molecular weight 7000, polymer component 38%): dispersant | 1 | 1 | 1 | 1 | 1 | 1 | 1 | 1 | 1 |
| Resin emulsion 1 (concentration of resin emulsion particles) | 5 | | | | | | | | |
| Resin emulsion 2 (concentration of resin emulsion particles) | | 5 | | | | | | | |
| Resin emulsion 3 (concentration of resin emulsion particles) | | | 10 | 10 | 10 | 10 | | | |
| Resin emulsion 4 (concentration of resin emulsion particles) | | | | | | | 10 | 10 | 10 |
| Resin emulsion 5 (concentration of resin emulsion particles) | | | | | | | | | |
| Resin emulsion 6 (concentration of resin emulsion particles) | | | | | | | | | |
| Glycerin | 15 | 10 | 15 | 15 | 15 | 15 | 15 | 15 | 15 |
| Diethylene glycol | | 5 | | | | | | | |
| Maltitol | 5 | | | | | | 3 | 3 | 3 |
| Xylose | | 5 | 5 | 5 | 5 | 5 | 2 | 2 | 2 |
| 2-Pyrrolidone | 5 | 4 | 5 | 5 | 5 | 5 | | | |
| N-Methyl-2-pyrrolidone | | | | | | | 5 | 5 | 5 |
| 1,3-Dimethyl-2-imidazolidinone | | | | | | | | | |
| Triethylene glycol monobutyl ether | | | | | | | | | |
| Triethanolamine | 1 | 1 | 1 | 1 | 1 | 1 | 1 | 1 | 1 |
| Potassium hydroxide | 1 | 1 | 1 | 1 | 1 | 1 | 1 | 1 | 1 |
| Ethylenediaminetetraacetic acid | | | | 0.1 | 0.1 | 0.1 | 0.1 | 0.1 | 0.1 |
| Ion-exchanged water | Balance | Balance | Balance | Balance | Balance | Balance | Balance | Balance | Balance |

TABLE E2

|  | Ex. 6 | | | Ex. 7 | | |
| --- | --- | --- | --- | --- | --- | --- |
|  | Cyan ink 3 | Magenta ink 3 | Yellow ink 3 | Cyan ink 4 | Magenta ink 4 | Yellow ink 4 |
| C.I. Pigment Blue 15:3 | 5 | | | 5 | | |
| C.I. Pigment Red 122 | | 5 | | | 5 | |
| C.I. Pigment Yellow 93 | | | 5 | | | 5 |
| Ammonium salt of styrene-acrylic acid copolymer (molecular weight 7000, polymer component 38%) | 1 | 1 | 1 | 1 | 1 | 1 |
| Resin emulsion 1 (concentration of resin emulsion particles) | | | | | | |
| Resin emulsion 2 (concentration of resin emulsion particles) | | | | | | |
| Resin emulsion 3 (concentration of resin emulsion particles) | | | | | | |
| Resin emulsion 4 (concentration of resin emulsion particles) | | | | | | |
| Resin emulsion 5 (concentration of resin emulsion particles) | 15 | 15 | 15 | | | |
| Resin emulsion 6 (concentration of resin emulsion particles) | | | | 10 | 10 | 10 |
| Glycerin | 15 | 15 | 15 | 15 | 15 | 15 |
| Diethylene glycol | | | | | | |
| Maltitol | 3 | 3 | 3 | | | |
| Xylose | 2 | 2 | 2 | 5 | 5 | 5 |
| 2-Pyrrolidone | | | | 5 | 5 | 5 |
| N-Methyl-2-pyrrolidone | | | | | | |
| 1,3-Dimethyl-2-imidazolidinone | 5 | 5 | 5 | | | |
| Triethylene glycol monobutyl ether | | | | 3 | 3 | 3 |
| Triethanolamine | 1 | 1 | 1 | 1 | 1 | 1 |
| Potassium hydroxide | 1 | 1 | 1 | 1 | 1 | 1 |
| Ethylenediaminetetraacetic acid | 0.1 | 0.1 | 0.1 | 0.1 | 0.1 | 0.1 |
| Ion-exchanged water | Balance | Balance | Balance | Balance | Balance | Balance |

TABLE E3

|  | Comp. Ex. 1 | Comp. Ex. 2 | | | Comp. Ex. 3 | | |
| --- | --- | --- | --- | --- | --- | --- | --- |
|  | Black ink 4 | Cyan ink 5 | Magenta ink 5 | Yellow ink 5 | Cyan ink 6 | Magenta ink 6 | Yellow ink 6 |
| Carbon black (MA 7 manufactured by Mitsubishi Chemical Corporation) | 5 | | | | | | |
| C.I. Pigment Blue 15:3 | | 5 | | | 5 | | |
| C.I. Pigment Red 122 | | | 5 | | | 5 | |
| C.I. Pigment Yellow 93 | | | | 5 | | | 5 |
| Ammonium salt of styrene-acrylic acid copolymer (molecular weight 7000, polymer component 38%) | 1 | 1 | 1 | 1 | 1 | 1 | 1 |
| Resin emulsion 7 (concentration of resin emulsion particles) | 10 | | | | | | |
| Resin emulsion 8 (concentration of resin emulsion particles) | | | | | 10 | 10 | 10 |
| Glycerin | 15 | 15 | 15 | 15 | 15 | 15 | 15 |
| Diethylene glycol | | | | | | | |
| Maltitol | 5 | | | | 5 | 5 | 5 |
| Xylose | | 5 | 5 | 5 | | | |
| 2-Pyrrolidone | 4 | 5 | 5 | 5 | | | |
| N-Methyl-2-pyrrolidone | | | | | 5 | 5 | 5 |
| 1,3-Dimethyl-2-imidazolidinone | | | | | | | |
| Triethylene glycol monobutyl ether | | | | | | | |
| Triethanolamine | 1 | 1 | 1 | 1 | 1 | 1 | 1 |
| Potassium hydroxide | 1 | 1 | 1 | 1 | 1 | 1 | 1 |
| Ethylenediaminetetraacetic acid | 0.1 | 0.1 | 0.1 | 0.1 | 0.1 | 0.1 | 0.1 |
| Ion-exchanged water | Balance | Balance | Balance | Balance | Balance | Balance | Balance |

Preparation of Reaction Solution E

The following ingredients were mixed together to prepare a reaction solution.

| Reaction solution 1 | |
| --- | --- |
| Magnesium nitrate hexahydrate | 25 wt % |
| Triethylene glycol monobutyl ether | 10 wt % |
| Glycerin | 20 wt % |
| Ammonia | 0.5 wt % |
| Pure water | Balance |

Print Evaluation Test E

The ink composition and the reaction solution prepared above were printed in combination by the recording apparatus according to the present invention on a PET (polyethylene terephthalate) film, an aluminum plate, an iron plate, an SBR sheet, and a glass plate, followed by washing with water to prepare prints.

Evaluation 1: Fixation

In the prints, the printed portion was rubbed with a water-base yellow fluorescent marker pen (ZEBRA PEN 2 (tradename)) manufactured by ZEBRA at a marking force of 4.9 N/mm², and the fixation of ink was evaluated according to the following criteria.

A: The separation of the printed portion did not occur at all.

B: The separation of the printed portion slightly occurred.

C: The printed portion was completely separated.

Evaluation 2: Color Bleeding

In the prints, the printed portion was visually inspected for uneven color mixing in boundaries of different colors, followed by evaluation according to the following criteria.

A: There was no color mixing.

B: There was slight color mixing.

C: There was significant color mixing on such a level that rendered the boundaries of different colors unclear.

Evaluation 3: Ejection Stability

The ink composition was loaded into a recording head in the recording apparatus according to the present invention, and 1000 ruled lines were continuously printed. The prints were then visually inspected for dropouts, scattering of ink, and ink droplet trajectory directionality problem (deviation from predetermined ink droplet impact points), followed by the evaluation of the number of lines, suffering from the above problems, out of the printed 1000 lines according to the following criteria.

A: An incidence of less than 10%

B: An incidence of 10 to 50%

C: An incidence of more than 50%

The results of evaluations 1 to 3 were as shown in Table E4 below.

TABLE E4

| | | | Evaluation 1: fixation | | | | | Evaluation 2: color bleeding | Evaluation 3: ejection stability |
| --- | --- | --- | --- | --- | --- | --- | --- | --- | --- |
| | | | PET | | Aluminum | Iron | NBR | | |
| | Ink | Reaction solution | Washed | Not washed | Washed | Washed | Washed | | |
| Ex. 1 | Blank Ink 1 | Reaction solution 1 | A | C | A | A | A | — | A |
| Ex. 2 | Black ink 2 | Reaction solution 1 | A | C | A | A | A | — | A |
| Ex. 3 | Black ink 3 | Reaction solution 1 | A | C | A | A | A | — | A |
| Ex. 4 | Cyan ink 1 Magenta ink 1 Yellow ink 1 | Reaction solution 1 | A | C | A | A | A | A | A |
| Ex. 5 | Cyan ink 2 Magenta ink 2 Yellow ink 2 | Reaction solution 1 | A | C | A | A | A | A | A |
| Ex. 6 | Cyan ink 3 Magenta ink 3 Yellow ink 3 | Reaction solution 1 | A | C | A | A | A | A | A |
| Ex. 7 | Cyan ink 4 Magenta ink 4 Yellow ink 4 | Reaction solution 1 | A | C | A | A | A | A | A |
| Comp. Ex. 1 | Black ink 5 | Reaction solution 1 | A | C | A | A | A | C | B |
| Comp. Ex. 2 | Cyan ink 5 Magenta ink 5 Yellow ink 5 | Reaction solution 1 | C | C | C | C | C | A | A |
| Comp. Ex. 3 | Cyan ink 6 Magenta ink 6 Yellow ink 6 | Reaction solution 1 | C | C | C | C | C | A | A |

Example F

Preparation of Reaction Solution F

Reaction solutions were prepared according to formulations indicated in Table F1 below. "Fine particles of cationic polymer" in Table F1 were prepared by the following method.

Preparation of Fine Particles of Cationic Polymer

To a reaction vessel equipped with a stirrer, a reflux condenser, a dropping device, a thermometer, and a nitrogen inlet tube were placed 600 ml of ion-exchanged water, 50 g of styrene, 100 g of butyl acrylate, and 15 g of a 70% aqueous solution of dimethyl methacrylate aminoethylbenzyl chloride. The internal temperature of the reaction vessel was raised to 80° C., and the air in the reaction system was then replaced by nitrogen gas.

Next, 50 g of styrene, 100 g of butyl acrylate, and 15 g of a 70% aqueous solution of dimethyl methacrylate aminoethylbenzyl chloride were fed to the reaction system at a constant rate over a period of 4 hr to allow a reaction to proceed. At the same time, 40 g of a 5% aqueous solution of 2,2'-azobis(2-amidinopropane) dihydrochloride was fed to the reaction system at a constant rate over a period of 5 hr to allow a reaction to proceed. The reaction product was cooled and was then filtered through a 0.1-μm filter to prepare an aqueous emulsion of fine particles of a cationic polymer. The fine particles of a cationic polymer had a glass transition point of −15° C., and the aqueous emulsion of fine particles of a cationic polymer had a solid content of 35% and a minimum film-forming temperature of 5° C. The average particle diameter of the fine particles of a cationic polymer was measured with a particle diameter measuring device by a light scattering method (Microtrack UPA, manufactured by Leeds & Northrop) and was found to be 80 nm.

The glass transition point was measured by thinly spreading several grams of the aqueous emulsion of the fine particles of a cationic polymer to form a film, drying the film at 70° C. for 1 hr or more, extracting a sample from the dried film, and measuring the glass transition point with a differential scanning calorimeter (DSC) at a temperature rise rate of 10° C./min.

The minimum film-forming temperature was measured as follows. A minimum film-forming temperature measuring device was provided, and the aqueous emulsion of the fine particles of a cationic polymer was thinly spread onto a sample plate made of aluminum in the measuring device. The temperature of the coating was raised to measure the minimum temperature at which a transparent continuous film was formed. This minimum temperature was regarded as the minimum film-forming temperature.

The measurement of the glass transition point of resin emulsion particles and the measurement of the minimum film-forming temperature of resin emulsions described below were carried out according to these methods.

Preparation of Resin Emulsion F

Resin Emulsion 1

A reaction vessel equipped with a stirrer, a reflux condenser, a dropping device, a thermometer, and a nitrogen inlet tube was charged with 100 ml of ion-exchanged water and 0.1 g of potassium persulfate. The air in the system was replaced by nitrogen gas, and the internal temperature of the system was raised to 70° C.

Separately, 100 ml of ion-exchanged water, 1.0 g of sodium dodecylbenzenesulfonate, 30 g of styrene, 55 g of butyl acrylate, 5 g of methacrylic acid, and 1 g of acrylamide were stirred to prepare an emulsion. This emulsion was added dropwise to the contents of the reaction vessel through a dropping funnel, and a reaction was allowed to proceed at 70° C. for 6 hr. The reaction mixture was cooled to room temperature and was then subjected to pH adjustment with aqueous ammonia as a neutralizing agent, followed by filtration through a 0.4-μm filter to prepare a resin emulsion. This resin emulsion particles had a glass transition point of −15° C. The resin emulsion had a minimum film-forming temperature of 5° C. The average particle diameter of the resin emulsion particles was measured with Microtrack UPA and was found to be 100 nm.

Resin Emulsion 2

A reaction vessel equipped with a stirrer, a thermometer, a reflux condenser, and a dropping funnel was charged with 900 g of ion-exchanged water. The internal temperature of the reaction vessel was raised to 70° C. with stirring while replacing the air in the reaction vessel by nitrogen. While maintaining the internal temperature at 70° C., 4 g of potassium persulfate as a polymerization initiator was added to and dissolved in the ion-exchanged water. Separately, 70 g of ion-exchanged water, 1 g of sodium laurylsulfate, 53 g of styrene, 59 g of butyl acrylate, 48 g of glycidyl methacrylate, and 0.16 g of t-dodecylmercaptan as a molecular weight modifier were stirred to prepare an emulsion. This emulsion was then continuously added dropwise to the contents of the reaction vessel over a period of 1 hr.

TABLE F1

| | Reaction solution 1 | Reaction solution 2 | Reaction solution 3 | Reaction solution 4 | Reaction solution 5 | Reaction solution 6 |
|---|---|---|---|---|---|---|
| Snowtex-AK (Nissan Chemical Industries Ltd.) | 5 | | 5 | | | 5 |
| Aluminasol 520 (Nissan Chemical Industries Ltd.) | | 5 | | 5 | | |
| Magnesium nitrate hexahydrate | 25 | 25 | 25 | 25 | 25 | 25 |
| Fine particles of cationic polymer | | | | | 5 | 5 |
| Triethylene glycol monobutyl ether | 10 | 10 | | | | |
| 1,2-Hexanediol | | | 10 | 10 | 10 | 10 |
| Glycerin | 20 | 20 | 20 | 20 | 20 | 20 |
| Ion-exchanged water | Balance | Balance | Balance | Balance | Balance | Balance |

Preparation of Ink Composition F

Ink compositions were prepared according to formulations shown in Tables F2 and F3 below. "Resin emulsions 1 to 5" in Table F2 and "dispersions of pigments" in Table F3 were prepared by the following methods.

After the completion of the dropwise addition, the mixture was ripened for one hr.

Subsequently, an emulsion prepared by adding 79 g of styrene, 80 g of butyl acrylate, and 0.16 g of t-dodecylmercaptan to 70 g of ion-exchanged water, 1 g of sodium laurylsulfate, and 1 g of acrylamide with stirring was then continuously added dropwise to the contents of the reaction vessel over a period of 1 hr. After the completion of the dropwise addition, the mixture was ripened for one hr.

A solution of 4 g of ammonium persulfate as a polymerization initiator in 20 g of ion-exchanged water was then added to the contents of the reaction vessel. Further, an emulsion, prepared by adding 298 g of styrene, 297 g of butyl acrylate, 29 g of methacrylic acid, and 0.65 g of t-dodecylmercaptan to 300 g of ion-exchanged water, 2 g of sodium laurylsulfate, and 16 g of acrylamide with stirring, was continuously added dropwise to the contents of the reaction vessel over a period of 3 hr. The resultant resin emulsion was cooled to room temperature and was then adjusted to a solid content of 35% by weight and pH 8 by the addition of ion-exchanged water and aqueous ammonia, followed by filtration through a 0.1-μm filter. The average particle diameter of the resin emulsion particles was measured with Microtrack UPA and was found to be 90 nm.

The resin emulsion particles thus obtained had a glass transition point of 17° C. The resin emulsion had a minimum film-forming temperature of 24° C. When 3 volumes of an aqueous emulsion containing 0.1% by weight of the resin emulsion particles was brought into contact with one volume of a 1 mol/liter aqueous magnesium nitrate solution, the time required for the transmission of light having a wavelength of 700 nm to become 50% of the initial value (half-value period) was 10 sec. The contact angle of an aqueous emulsion, prepared so as to contain 10% by weight of the resin emulsion particles, on a teflon sheet was 108 degrees.

Resin Emulsion 3

A reaction vessel equipped with a stirrer, a reflux condenser, a dropping device, a thermometer, and a nitrogen inlet tube was charged with 200 ml of distilled water and 0.6 g of sodium dodecylbenzenesulfonate. The reaction vessel was heated to raise the internal temperature of the reaction vessel to 70° C. with stirring in a nitrogen atmosphere, and 2 g of potassium persulfate was then added.

Separately, 50 g of butyl acrylate, 40 g of styrene, 5 g of acrylamide, 5 g of acrylic acid, 0.1 g of t-dodecylmercaptan, 5 g of a monomer having a skeleton with ultraviolet absorbing activity, 2-(2'-hydroxy-5'-methacryloxyethylphenyl)-2H-benzotriazole (RUVA-93, manufactured by Otsuka Chemical Co., Ltd.), 1 g of a monomer having a skeleton with photostabilizing activity, 1,2,2,6,6-pentamethyl-4-piperidyl methacrylate (ADEKA STAB LA-82, manufactured by Asahi Denka Kogyo Ltd.), and 2 g of ethylene glycol dimethacrylate were mixed together to prepare a solution. This solution was then added dropwise to the contents of the reaction vessel.

A reaction was further allowed to proceed at 70° C. for 6 hr. The reaction vessel was then cooled to room temperature, and the pH value of the reaction mixture was adjusted by the addition of aqueous ammonia as a neutralizing agent, followed by filtration through a 0.4-μm filter to prepare a resin emulsion containing, as dispersed particles, fine particles of a polymer having in its structure sites possessing ultraviolet absorbing activity and photostabilizing activity.

The resin emulsion particles thus obtained had a glass transition point of 8° C. The resin emulsion had a glass transition point of 20° C., a minimum film-forming temperature of 25° C., a surface tension of $58 \times 10^{-3}$ N/m, a contact angle of 90 degrees, an average particle diameter of 0.1 μm (as measured with Microtrack UPA), and a half-value period in a reaction with $Mg^{2+}$ ion of 70 sec.

Resin Emulsion 4

A reaction vessel equipped with a stirrer, a thermometer, a reflux condenser, and a dropping funnel was charged with 900 g of ion-exchanged water and 4 g of sodium laurylsulfate. The internal temperature of the reaction vessel was raised to 70° C. with stirring while replacing the air in the reaction vessel by nitrogen. While maintaining the internal temperature at 70° C., 2 g of potassium persulfate as a polymerization initiator was added to and dissolved in the ion-exchanged water.

Separately, 450 g of ion-exchanged water, 3 g of sodium laurylsulfate, 435 g of styrene, 20 g of acrylamide, 475 g of butyl acrylate, 30 g of methacrylic acid, 50 g of heptadecafluorodecyl methacrylate, and 4 g of ethylene glycol dimethacrylate were stirred to prepare an emulsion. This emulsion was continuously added dropwise to the contents of the reaction vessel over a period of 3 hr. After the completion of the dropwise addition, the mixture was ripened for one hr. The resultant resin emulsion was cooled to room temperature and was then adjusted to a solid content of 35% by weight and pH 8 by the addition of ion-exchanged water and aqueous ammonia, followed by filtration through a 0.1-μm filter. The average particle diameter was measured with Microtrack UPA and was found to be 90 nm. The resin emulsion particles thus obtained had a glass transition point of 9° C. The resin emulsion had a minimum film-forming temperature of 24° C. When 3 volumes of a resin emulsion containing 0.1% by weight of the resin emulsion particles was brought into contact with one volume of a 1 mol/liter aqueous magnesium nitrate solution, the time required for the transmission of light having a wavelength of 700 nm to become 50% of the initial value (half-value period) was 5 sec. The contact angle of a resin emulsion, prepared so as to contain 10% by weight of the resin emulsion particles, on a teflon sheet was 110 degrees.

Resin Emulsion C

A reaction vessel equipped with a stirrer, a thermometer, a reflux condenser, and a dropping funnel was charged with 900 g of ion-exchanged water and 4 g of sodium laurylsulfate. The internal temperature of the reaction vessel was raised to 70° C. with stirring while replacing the air in the reaction vessel by nitrogen. While maintaining the internal temperature at 70° C., 2 g of potassium persulfate as a polymerization initiator was added to and dissolved in the ion-exchanged water.

Separately, 450 g of ion-exchanged water, 3 g of sodium laurylsulfate, 435 g of styrene, 475 g of butyl acrylate, 30 g of 2-acryloylamino-2-methylpropanesulfonic acid, 50 g of methacryloyldiacetylmethane, and 4 g of diethylene glycol dimethacrylate were stirred to prepare an emulsion. This emulsion was continuously added dropwise to the contents of the reaction vessel over a period of 3 hr. After the completion of the dropwise addition, the mixture was ripened for 3 hr. The resultant resin emulsion was cooled to room temperature and was then adjusted to a solid content of 35% by weight and pH 8 by the addition of ion-exchanged water and aqueous ammonia, followed by filtration through a 0.1-μm filter. The average particle diameter was measured with Microtrack UPA and was found to be 95 nm. The resin emulsion particles thus obtained had a glass transition point of 8° C. The resin emulsion had a minimum film-forming temperature of 20° C. When 3 volumes of a resin emulsion containing 0.1% by weight of the resin emulsion particles was brought into contact with one volume of a 1 mol/liter aqueous magnesium nitrate solution, the time required for the transmission of light having a wavelength of 700 nm to become 50% of the initial value (half-value period) was 6 sec. The contact angle of a resin emulsion, prepared so as to contain 10% by weight of the resin emulsion particles, on a teflon sheet was 115 degrees.

Preparation of Microencapsulated Colorants

The following aqueous dispersions of pigments were prepared as microencapsulated colorants.

Aqueous Dispersion of Magenta Pigment

C.I. Pigment Red 122 (100 g) and 60 g of a polymerizable surfactant SE-10N manufactured by Asahi Denka Kogyo Ltd. were added to 1,000 g of ion-exchanged water. Ultrasonic waves generated by an ultrasonic generator were applied to the mixture for 2 hr to perform dispersion, followed by dispersion in a sand mill for about 2 hr. The dispersion was introduced into a reaction vessel equipped with an ultrasonic generator, a stirrer, a temperature controller, a reflux condenser, and a dropping funnel. Subsequently, a mixed monomer solution, previously prepared by mixing 5 g of benzyl methacrylate, 15 g of butyl methacrylate, 10 g of dicyclopentanyl dimethacrylate, and 10 g of methacrylic acid together, and 1 g of potassium persulfate were further added to the reaction vessel, and a polymerization reaction was allowed to proceed at 60° C. for 48 hr. The desired product thus obtained was adjusted to pH 8 by the addition of potassium hydroxide, and then passed through a 0.4-μm filter to remove coarse particles. Thus, the contemplated aqueous dispersion of magenta pigment was prepared. The average particle diameter was measured with Microtrack UPA and was found to be 80 nm.

Aqueous Dispersion of Cyan Pigment

C.I. Pigment Blue 15:3 (100 g) and 60 g of a polymerizable surfactant SE-10N manufactured by Asahi Denka Kogyo Ltd. were added to 1,000 g of ion-exchanged water. Ultrasonic waves generated by an ultrasonic generator were applied to the mixture for 2 hr to perform dispersion, followed by dispersion in a sand mill for about 2 hr. The dispersion was introduced into a reaction vessel equipped with an ultrasonic generator, a stirrer, a temperature controller, a reflux condenser, and a dropping funnel. Subsequently, a mixed monomer solution previously prepared by mixing 10 g of 2-acrylamido-2-methylpropanesulfonic acid, 10 g of acrylonitrile, 10 g of benzyl methacrylate, and 10 g of butyl methacrylate together and 1 g of potassium persulfate were further added to the reaction vessel, and a polymerization reaction was allowed to proceed at 60° C. for 48 hr. The desired product thus obtained was adjusted to pH 8 by the addition of potassium hydroxide, and then passed through a 0.4-μm filter to remove coarse particles. Thus, the contemplated aqueous dispersion of cyan pigment was prepared. The average particle diameter was measured with Microtrack UPA and was found to be 90 nm.

Aqueous Dispersion of Yellow Pigment

C.I. Pigment Yellow 185 (100 g) and 60 g of a polymerizable surfactant SE-10N manufactured by Asahi Denka Kogyo Ltd. were added to 1,000 g of ion-exchanged water. Ultrasonic waves generated by an ultrasonic generator were applied to the mixture for 2 hr to perform dispersion, followed by dispersion in a sand mill for about 2 hr. The dispersion was introduced into a reaction vessel equipped with an ultrasonic generator, a stirrer, a temperature controller, a reflux condenser, and a dropping funnel. Subsequently, a mixed monomer solution, previously prepared by mixing 20 g of acrylonitrile and 20 g of dibutyl fumarate together, and 1 g of potassium persulfate were further added to the reaction vessel, and a polymerization reaction was allowed to proceed at 60° C. for 48 hr. The desired product thus obtained was adjusted to pH 8 by the addition of potassium hydroxide, and then passed through a 0.4-μm filter to remove coarse particles. Thus, the contemplated aqueous dispersion of yellow pigment was prepared. The average particle diameter was measured with Microtrack UPA and was found to be 70 nm.

TABLE F2

| | Ink 1 | | | Ink 2 | | | Ink 3 | | | Ink 4 | | | Ink 5 | | |
| --- | --- | --- | --- | --- | --- | --- | --- | --- | --- | --- | --- | --- | --- | --- | --- |
| | Cyan | Magenta | Yellow | Cyan | Magenta | Yellow | Cyan | Magenta | Yellow | Cyan | Magenta | Yellow | Cyan | Magenta | Yellow |
| C.I. Pigment Blue 15:3 | 5 | | | 5 | | | 5 | | | 5 | | | 5 | | |
| C.I. Pigment Red 122 | | 5 | | | 5 | | | 5 | | | 5 | | | 5 | |
| C.I. Pigment Yellow 151 | | | 5 | | | 5 | | | 5 | | | 5 | | | 5 |
| Ammonium salt of styrene-acrylic acid copolymer (molecular weight 7000, polymer component 38%) | 1 | 1 | 1 | 1 | 1 | 1 | 1 | 1 | 1 | 1 | 1 | 1 | 1 | 1 | 1 |
| Resin emulsion 1 | 10 | 10 | 10 | | | | | | | | | | | | |
| Resin emulsion 2 | | | | 10 | 10 | 10 | | | | | | | | | |
| Resin emulsion 3 | | | | | | | 10 | 10 | 10 | | | | | | |
| Resin emulsion 4 | | | | | | | | | | 10 | 10 | 10 | | | |
| Resin emulsion 5 | | | | | | | | | | | | | 10 | 10 | 10 |
| Glycerin | 15 | 15 | 15 | 15 | 15 | 15 | 15 | 15 | 15 | 15 | 15 | 15 | 15 | 15 | 15 |
| Diethylene glycol | | | | | | | | | | 5 | 5 | 5 | | | |
| Maltitol | | | | 3 | 3 | 3 | 3 | 3 | 3 | | | | | | |
| Xylose | | | | 2 | 2 | 2 | 2 | 2 | 2 | | | | | | |
| 2-Pyrrolidone | 5 | 5 | 5 | | | | | | | 5 | 5 | 5 | 5 | 5 | 5 |
| N-Methyl-2-pyrrolidone | | | | | | | 5 | 5 | 5 | | | | | | |
| 1,3-Dimethyl-2-imidazolidinone | | | | 5 | 5 | 5 | | | | | | | | | |
| Triethanolamine | 1 | 1 | 1 | 1 | 1 | 1 | 1 | 1 | 1 | 1 | 1 | 1 | 1 | 1 | 1 |
| Potassium hydroxide | 1 | 1 | 1 | 1 | 1 | 1 | 1 | 1 | 1 | 1 | 1 | 1 | 1 | 1 | 1 |
| Ion-exchanged water | Balance | Balance | Balance | Balance | Balance | Balance | Balance | Balance | Balance | Balance | Balance | Balance | Balance | Balance | Balance |

TABLE F3

|  | Ink 6 | | | Ink 7 | | |
| --- | --- | --- | --- | --- | --- | --- |
|  | Cyan | Magenta | Yellow | Cyan | Magenta | Yellow |
| Aqueous dispersion of cyan pigment | 8 | | | 8 | | |
| Aqueous dispersion of magenta pigment | | 8 | | | 8 | |
| Aqueous dispersion of yellow pigment | | | 8 | | | 8 |
| Resin emulsion 2 | | | | 5 | 5 | 5 |
| Glycerin | 15 | 15 | 15 | 15 | 15 | 15 |
| Diethylene glycol | 3 | 3 | 3 | | | |
| Maltitol | | | | 3 | 3 | 3 |
| Xylose | | | | 2 | 2 | 2 |
| 2-Pyrrolidone | 5 | 5 | 5 | 3 | 3 | 3 |
| Triethanolamine | 1 | 1 | 1 | 1 | 1 | 1 |
| Potassium hydroxide | 1 | 1 | 1 | 1 | 1 | 1 |
| Ion-exchanged water | Balance | Balance | Balance | Balance | Balance | Balance |

Print Evaluation Test F

The ink compositions and the reaction solutions prepared above were printed in combination as indicated in Table F4 below by the recording apparatus according to the present invention on a PET (polyethylene terephthalate) film, an aluminum plate, an iron plate, an SBR sheet, and a glass plate, followed by washing with water to prepare objects for the following evaluation. The results of the evaluation tests were as summarized in Table F5 below.

Evaluation 1: Suitability for Printing

The recording apparatus according to the present invention was provided. Using the recording apparatus, the reaction solution of the present invention was first coated onto the recording media described above, and the ink according to the present invention was coated onto the portion, where the reaction solution had been coated, to form an image, followed by washing with water to provide a print. The printed portion on the recording media was visually inspected and was evaluated according to the following criteria (three grades).

A: Ink was evenly coated, the image was clear, and the edge was sharp.

B: Due to cissing of ink, the image lacked in clearness, and the edge was not sharp.

C: Upon washing, ink was washed away, and, consequently, the image was unclear.

Evaluation 2: Fixation (Adhesion)

The recording apparatus according to the present invention was provided. Using the recording apparatus, the reaction solution of the present invention was first coated onto the recording media described above, and the ink of the present invention was coated onto the portion, where the reaction solution had been coated, to form a blotted image, followed by washing with water to provide a print. The print was allowed to stand in an atmosphere of temperature 25° C. and humidity 40% for one hr and was then tested for evaluation.

The evaluation test was carried out as follows. The blotted image portion was cross cut at intervals of 1 mm with a sharp-edged tool to form squares having a one side length of 1 cm. A Scotch clear tape (trade name; manufactured by 3M) was applied onto the cross-cut blotted image portion, and a load of 9.8 N/mm$^2$ was applied to the tape. The tape was then peeled off from the print to determine the number of crosscuts (1 mm×1 mm) remained unpeeled from the recording medium. The results were evaluated according to the following criteria.

A: 95 or more crosscuts remained unpeeled.

B: 90 or more crosscuts remained unpeeled.

C: 60 to less than 90 crosscuts remained unpeeled.

D: Less than 60 crosscuts remained unpeeled.

Evaluation 3: Color Bleeding

The recording apparatus according to the present invention was provided. Using the recording apparatus, the reaction solution of the present invention was first coated onto the recording media described above, and the ink according to the present invention was coated onto the portion, where the reaction solution had been coated, to form an image, followed by washing with water to provide a print. The print was visually inspected for uneven color mixing in boundaries of colors. The results were evaluated according to the following criteria.

A: There was no color mixing, and the boundaries of colors were clear.

B: There was slight color mixing.

C: There was significant color mixing on such a level that rendered the boundaries of colors unclear.

Evaluation 4: Rubbing/Scratch Resistance

The recording apparatus according to the present invention was provided. Using the recording apparatus, the reaction solution of the present invention was first coated onto the recording media described above, and the ink of the present invention was coated onto the portion, where the reaction solution had been coated, to form an image, followed by washing with water to provide a print. The print was allowed to stand in an atmosphere of temperature 25° C. and humidity 40% for one hr, and the printed portion was rubbed with a water-base yellow fluorescent marker pen (ZEBRA PEN 2 (tradename)) manufactured by ZEBRA at a marking force of 9.8 N/mm$^2$, and the image was then visually inspected. The results were evaluated according to the following criteria.

A: The printed portion remained unchanged after rubbing.

B: Upon rubbing, the printed portion was stained, and the image was unclear.

TABLE F4

|  | Reaction solution 1 | Reaction solution 2 | Reaction solution 3 | Reaction solution 4 | Reaction solution 5 | Reaction solution 6 |
| --- | --- | --- | --- | --- | --- | --- |
| Ink 1 | Ex. 1 | Ex. 2 | Ex. 3 | Ex. 4 | Ex. 5 | Ex. 6 |
| Ink 2 | Ex. 7 | Ex. 8 | Ex. 9 | Ex. 10 | Ex. 11 | Ex. 12 |
| Ink 3 | Ex. 13 | Ex. 14 | Ex. 15 | Ex. 16 | Ex. 17 | Ex. 18 |
| Ink 4 | Ex. 19 | Ex. 20 | Ex. 21 | Ex. 22 | Ex. 23 | Ex. 24 |
| Ink 5 | Ex. 25 | Ex. 26 | Ex. 27 | Ex. 28 | Ex. 29 | Ex. 30 |
| Ink 6 | Ex. 31 | Ex. 32 | Ex. 33 | Ex. 34 | Ex. 35 | Ex. 36 |
| Ink 7 | Ex. 37 | Ex. 38 | Ex. 39 | Ex. 40 | Ex. 41 | Ex. 42 |

TABLE F5

(part 1)

| | Evaluation 1 Suitability for printing | | | | | Evaluation 2 Fixation (adhesion) | | | | |
|---|---|---|---|---|---|---|---|---|---|---|
| Ex. | PET film | Aluminum plate | Iron plate | SBR sheet | Glass plate | PET film | Aluminum plate | Iron plate | SBR sheet | Glass plate |
| 1 | A | A | A | A | A | B | A | A | A | A |
| 2 | A | A | A | A | A | B | A | A | A | A |
| 3 | A | A | A | A | A | B | A | A | A | A |
| 4 | A | A | A | A | A | B | A | A | A | A |
| 5 | A | A | A | A | A | A | A | A | A | A |
| 6 | A | A | A | A | A | A | A | A | A | A |
| 7 | A | A | A | A | A | B | A | A | A | A |
| 8 | A | A | A | A | A | B | A | A | A | A |
| 9 | A | A | A | A | A | B | A | A | A | A |
| 10 | A | A | A | A | A | B | A | A | A | A |
| 11 | A | A | A | A | A | A | A | A | A | A |
| 12 | A | A | A | A | A | A | A | A | A | A |
| 13 | A | A | A | A | A | B | A | A | A | A |
| 14 | A | A | A | A | A | B | A | A | A | A |
| 15 | A | A | A | A | A | B | A | A | A | A |
| 16 | A | A | A | A | A | B | A | A | A | A |
| 17 | A | A | A | A | A | A | A | A | A | A |
| 18 | A | A | A | A | A | A | A | A | A | A |
| 19 | A | A | A | A | A | B | A | A | A | A |
| 20 | A | A | A | A | A | B | A | A | A | A |
| 21 | A | A | A | A | A | B | A | A | A | A |
| 22 | A | A | A | A | A | B | A | A | A | A |
| 23 | A | A | A | A | A | B | A | A | A | A |
| 24 | A | A | A | A | A | B | A | A | A | A |
| 25 | A | A | A | A | A | B | A | A | A | A |
| 26 | A | A | A | A | A | B | A | A | A | A |
| 27 | A | A | A | A | A | B | A | A | A | A |
| 28 | A | A | A | A | A | B | A | A | A | A |
| 29 | A | A | A | A | A | A | A | A | A | A |
| 30 | A | A | A | A | A | A | A | A | A | A |
| 31 | A | A | A | A | A | B | B | B | B | B |
| 32 | A | A | A | A | A | B | B | B | B | B |
| 33 | A | A | A | A | A | B | B | B | B | B |
| 34 | A | A | A | A | A | B | B | B | B | B |
| 35 | A | A | A | A | A | B | B | B | B | B |
| 36 | A | A | A | A | A | B | B | B | B | B |
| 37 | A | B | B | B | B | B | A | A | A | A |
| 38 | A | B | B | B | B | B | A | A | A | A |
| 39 | A | B | B | B | B | B | A | A | A | A |
| 40 | A | B | B | B | B | B | A | A | A | A |
| 41 | A | A | A | A | A | A | A | A | A | A |
| 42 | A | A | A | A | A | A | A | A | A | A |

(part 2)

| | Evaluation 3 Color bleeding | | | | | Evaluation 4 Rubbing/scratch resistance | | | | |
|---|---|---|---|---|---|---|---|---|---|---|
| Ex. | PET film | Aluminum plate | Iron plate | SBR sheet | Glass plate | PET film | Aluminum plate | Iron plate | SBR sheet | Glass plate |
| 1 | A | A | A | A | A | B | A | A | A | A |
| 2 | A | A | A | A | A | B | A | A | A | A |
| 3 | A | A | A | A | A | B | A | A | A | A |
| 4 | A | A | A | A | A | B | A | A | A | A |
| 5 | A | A | A | A | A | A | A | A | A | A |
| 6 | A | A | A | A | A | A | A | A | A | A |
| 7 | A | A | A | A | A | B | A | A | A | A |
| 8 | A | A | A | A | A | B | A | A | A | A |
| 9 | A | A | A | A | A | B | A | A | A | A |
| 10 | A | A | A | A | A | B | A | A | A | A |
| 11 | A | A | A | A | A | A | A | A | A | A |
| 12 | A | A | A | A | A | A | A | A | A | A |
| 13 | A | A | A | A | A | B | A | A | A | A |
| 14 | A | A | A | A | A | B | A | A | A | A |
| 15 | A | A | A | A | A | B | A | A | A | A |

TABLE F5-continued (part 2)

| | Evaluation 3 Color bleeding | | | | | Evaluation 4 Rubbing/scratch resistance | | | | |
|---|---|---|---|---|---|---|---|---|---|---|
| Ex. | PET film | Aluminum plate | Iron plate | SBR sheet | Glass plate | PET film | Aluminum plate | Iron plate | SBR sheet | Glass plate |
| 16 | A | A | A | A | A | B | A | A | A | A |
| 17 | A | A | A | A | A | A | A | A | A | A |
| 18 | A | A | A | A | A | A | A | A | A | A |
| 19 | A | A | A | A | A | B | A | A | A | A |
| 20 | A | A | A | A | A | B | A | A | A | A |
| 21 | A | A | A | A | A | B | A | A | A | A |
| 22 | A | A | A | A | A | B | A | A | A | A |
| 23 | A | A | A | A | A | B | A | A | A | A |
| 24 | A | A | A | A | A | B | A | A | A | A |
| 25 | A | A | A | A | A | B | A | A | A | A |
| 26 | A | A | A | A | A | B | A | A | A | A |
| 27 | A | A | A | A | A | B | A | A | A | A |
| 28 | A | A | A | A | A | B | A | A | A | A |
| 29 | A | A | A | A | A | A | A | A | A | A |
| 30 | A | A | A | A | A | A | A | A | A | A |
| 31 | A | A | A | A | A | B | B | B | B | B |
| 32 | A | A | A | A | A | B | B | B | B | B |
| 33 | A | A | A | A | A | B | B | B | B | B |
| 34 | A | A | A | A | A | B | B | B | B | B |
| 35 | A | A | A | A | A | B | B | B | B | B |
| 36 | A | A | A | A | A | B | B | B | B | B |
| 37 | A | A | A | A | A | B | A | A | A | A |
| 38 | A | A | A | A | A | B | A | A | A | A |
| 39 | A | A | A | A | A | B | A | A | A | A |
| 40 | A | A | A | A | A | B | A | A | A | A |
| 41 | A | A | A | A | A | A | A | A | A | A |
| 42 | A | A | A | A | A | A | A | A | A | A |

What is claimed is:

1. A recording method wherein an ink composition comprising at least a colorant, resin emulsion particles, a water-soluble organic solvent, and water and a reaction solution comprising a reactant capable of forming coagulate upon contact with the ink composition, are deposited onto a recording medium to perform printing, said recording medium being substantially non-absorptive to the ink composition, said recording method comprising the steps of:
depositing the reaction solution onto the recording medium;
depositing the ink composition onto the recording medium to record an image; and
washing the recording medium, on which the reaction solution and the ink composition have been deposited to perform printing, with a polar solvent.

2. The recording method according to claim 1, wherein the recording medium has a plastic, rubber, metallic, or ceramic surface.

3. The recording method according to claim 1, wherein the colorant is a pigment or a dye.

4. The recording method according to claim 3, wherein the colorant has a particle diameter of 5 to 500 nm.

5. The recording method according to claim 3, wherein the content of the dye or the pigment is 0.1 to 99% by weight based on the colorant.

6. The recording method according to claim 1, wherein the colorant comprises: a dye or a pigment; and a polymer which has in its molecular chain sites possessing ultraviolet absorbing activity and/or photostabilizing activity and in which the dye or the pigment has been included, the colorant being in a fine particle form.

7. The recording method according to claim 6, wherein the site possessing ultraviolet absorbing activity and/or photostabilizing activity is selected from the group consisting of aromatic monocyclic hydrocarbon, fused polycyclic aromatic hydrocarbon, heteromonocyclic, and fused heterocyclic groups and has absorption in the wavelength range of 200 to 400 nm.

8. The recording method according to claim 6, wherein the site possessing ultraviolet absorbing activity or photostabilizing activity has a benzotriazole, benzophenone, salicylate, cyanoacrylate, hindered phenol, or hindered amine skeleton.

9. The recording method according to claim 6, wherein the polymer is a homo- or co-polymer of a benzotriazole ultraviolet absorber having an ethylenically unsaturated bond, a benzophenone ultraviolet absorber having an ethylenically unsaturated bond, a salicylate ultraviolet absorber having an ethylenically unsaturated bond, a cyanoacrylate ultraviolet absorber having an ethylenically unsaturated bond, a hindered phenol ultraviolet absorber having an ethylenically unsaturated bond, or a hindered amine photostabilizer having an ethylenically unsaturated bond as a monomer.

10. The recording method according to claim 6, wherein the polymer is composed mainly of a thermoplastic polymer.

11. The recording method according to claim 6, wherein the thermoplastic polymer is selected from the group consisting of ethylene-vinyl acetate copolymers, ethylene-ethyl acrylate copolymers, polyethylene, polypropylene, polystyrene, poly(meth)acrylic esters, styrene-(meth)acrylic ester copolymers, styrene-malelic acid copolymers, styrene-itaconic ester copolymers, polyvinyl acetates, polyesters, polyurethanes, and polyamides.

12. The recording method according to claim 6, wherein the polymer has a carboxyl group or a sulfonic acid group as a functional group.

13. The recording method according to claim 1, wherein the colorant is a water-based pigment dispersion which comprises a pigment included in a polymer produced from a polymerizable surfactant having both nonionic hydrophilicity and anionic hydrophilicity and a monomer.

14. The recording method according to claim 13, wherein the polymerizable surfactant is a compound represented by formula (I):

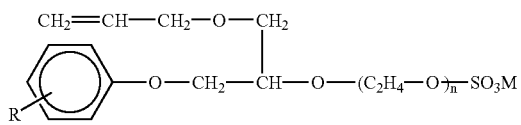
(I)

wherein
R represents a hydrogen atom or a hydrocarbon residue having 1 to 12 carbon atoms;
n is a number of 2 to 20; and
M represents an alkali metal atom, an ammonium salt, or an alkanolamine.

15. The recording method according to claim 13, wherein the water-based pigment dispersion has been produced by dispersing a pigment in water andlor a water-soluble organic solvent with the aid of a polymerizable surfactant, adding a monomer and a polymerization initiator to the dispersion, and then polymerizing the mixture.

16. The recording method according to claim 15, wherein the water-based pigment dispersion has been produced by further performing wet grinding after the polymerization.

17. The recording method according to claim 13, wherein the monomer is an electron-accepting monomer.

18. The recording method according to claim 13, wherein the monomer is selected from the group consisting of diesters of fumaric acid, diesters of maleic acid, maleimides, and vinylidene cyanide.

19. The recording method according to claim 13, wherein the monomer is selected from the group consisting of acrylic acid, acrylic esters, methacrylic acid, and methacrylic esters.

20. The recording method according to claim 13, wherein the content of the water-based pigment dispersion is 1 to 20% by weight based on the ink composition.

21. The recording method according to claim 1, wherein the resin emulsion particles are formed of a polymer comprising a fluoroaklyl-containing monomer.

22. The recording method according to claim 21, wherein the fluoroalkyl group is such that 3 to 41 fluorine atoms are present in a straight-chain or branched alkyl group having 1 to 13 carbon atoms.

23. The recording method according to claim 21, wherein the fluoroalkyl-containing monomer is selected from the group consisting of compounds represented by formulae (VI) to (VIII):

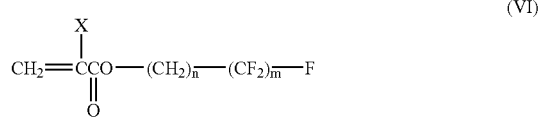
(VI)

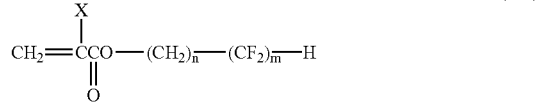
(VII)

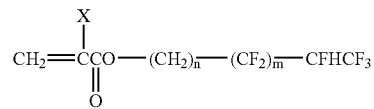
(VIII)

wherein
n is 1 or more; and
m is 1 to 20.

24. The recording method according to claim 1, wherein the resin emulsion particles are formed of a polymer having a ligand structure, which can combine with a metal ion to form a chelate, and, upon combining with the metal ion to form a chelate, form coagulate.

25. The recording method according to claim 24, wherein the ligand structure, which can combine with the metal ion to form a chelate, is selected from the group consisting of β-diketone, polyamine, iminodiacetic acid, sarcosine, ethanolamino acid, glycine, xanthogenic acid, amidoxime, amine, pyridine, imidazole, phosphonic acid, phosphinic acid, phosphoric acid, Schiff base, oxime, hydroxame, aminopolycarboxylic acid, thiol, polythioalcohol, 2-pyrrolidone, and 2-oxazolidone structures.

26. The recording method according to claim 24, wherein the ligand structure, which can combine with the metal ion to form a chelate, is represented by the following formula:

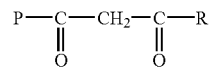

wherein
P represents a polymer structure portion; and
R represents an alkyl or aryl group.

27. The recording method according to claim 1, wherein the resin emulsion particles are comprised of a polymer having film-forming property.

28. The recording method according to claim 1, wherein the content of the resin emulsion particles is 0.1 to 30% by weight based on the ink composition.

29. The recording method according to claim 1, wherein the resin emulsion particles have a diameter of not more than 400 nm.

30. The recording method according to claim 1, wherein the resin emulsion particles have a glass transition point of 20° C. or below.

31. The recording method according to claim 1, wherein the resin emulsion containing the resin emulsion particles have a minimum film-forming temperature of 30° C. or below.

32. The recording method according to claim 1, wherein the resin emulsion particles have a film-forming property and have a reactivity with a divalent metal salt such that, when 3 volumes of a resin emulsion containing 0.1% by weight of the resin emulsion particles is brought into contact with one volume of a 1 mol/liter aqueous divalent metal salt solution, the time required for the transmission of light having a wavelength of 700 nm to become 50% of the initial value is not more than $1\times10^4$ sec.

33. The recording method according to claim 32, the resin emulsion particles have carboxyl groups on the surface thereof.

34. The recording method according to claim 1, wherein a resin emulsion, which has been prepared so as to contain 10% by weight of the resin emulsion particles, has a contact angle on a teflon sheet of not less than 70 degrees.

35. The recording method according to claim 1, wherein the resin emulsion particles have at least one functional group selected from the group consisting of carboxyl, sulfone, amide, amino, and hydroxyl groups.

36. The recording method according to claim 1, wherein a resin emulsion, which has been prepared so as to contain 35% by weight of the resin emulsion particles, has a surface tension of not less than $40 \times 10^{-3}$ N/m (20° C.).

37. The recording method according to claim 1, wherein the resin emulsion particles contain 1 to 10% by weight of a structure derived from an unsaturated vinyl monomer having a carboxyl group and have a structure crosslinked by a crosslinkable monomer having two or more polymerizable double bonds with the content of the structure derived froth crosslinkable monomer being 0.2 to 4% by weight.

38. The recording method according to claim 1, wherein the resin emulsion particles have a core-shell structure.

39. The recording method according to claim 38, wherein the core is formed of an epoxy-containing resin and the shell is formed of a carboxyl-containing resin.

40. The recording method according to claim 39, the shell has at least one functional group selected from the group consisting of carboxyl, sulfone, amide, amino, and hydroxyl groups.

41. The recording method according to claim 1, wherein the resin emulsion particles are self-crosslinkable.

42. The recording method according to claim 1, wherein the ink composition further comprises a sequestering agent.

43. The recording method according to claim 42, wherein the sequestering agent is an aminocarboxylic acid derivative or a condensed phosphoric acid.

44. The recording method according to claim 42, wherein the sequestering agent is selected from the group consisting of ethylenediaminetetraacetic acid, iminodiacetic acid, nitriloacetic acid, diethylenetriaminepentaacetic acid, triethylenetetralninehexaacetic acid, cyclohexane-1,2-diaminetetraacetic acid, N-hydroxyethylethylenediaminetriacetic acid, ethylene glycol diethyl ether amine tetraacetic acid, ethylenediaminetetrapropionic acid, pyrophosphoric acid, and triphosphoric acid.

45. The recording method according to claim 42, wherein the sequestering agent is contained in an amount of 0.0001 to 5% by weight based on the ink composition.

46. The recording method according to claim 1, wherein the water-soluble organic solvent has a boiling point of 180° C. or above.

47. The recording method according to claim 1, wherein the reactant is a polyvalent metal salt, a polyallylamine, or a polyallylamine derivative.

48. The recording method according to claim 47, wherein the polyvalent metal salt is a nitrate or a carboxylate.

49. The recording method according to claim 48, wherein carboxylic acid ions constituting the carboxylate have been derived from a saturated aliphatic monocarboxylic acid having 1 to 6 carbon atoms, wherein hydrogen atoms on the saturated aliphatic hydrocarbon group in the monocarboxylic acid are optionally substituted by a hydroxyl group, or a carbocyclic monocarboxylic acid having 6 to 10 carbon atoms.

50. The recording method according to claim 1, wherein the reactant comprises cationic inorganic fine particles and/or fine particles of a cationic polymer.

51. The recording method according to claim 50, wherein the catiomc inorganic fine particles have been cationized by hydrating inorganic fine particles, or by treating inorganic fine particles with a cationic material.

52. The recording method according to claim 50, wherein the inorganic fine particles are inorganic colloid particles.

53. The recording method according to claim 51, wherein the cationic material is an alumina sol, an alumina chloride, a cationic surfactant, or a polycation compound.

54. The recording method according to claim 50, wherein the cationic inorganic fine particles are a cationic alumina sol or a cationic colloidal silica.

55. The recording method according to claim 50, wherein the fine particles of a cationic polymer have been produced by treating fine particles of a polymer with a cationic material to cationize the fine particles, or by polymerizing a cationic monomer.

56. The recording method according to claim 50, wherein the fine particles of a cationic polymer are formed of a polymer selected from the group consisting of acrylic resins, polyester resins, epoxy resins, styrene-butadiene copolymers, polybutadienes, polyolefins, polystyrenes, polyamides, ethylene-vinyl acetate copolymers, polysiloxanes, and polyurethanes.

57. The recording method according to claim 50, wherein the fine particles of a cationic polymer are fine particles formed of a polymer produced by copolymerizing a cationic monomer represented by formula (A) and a vinyl monomer:

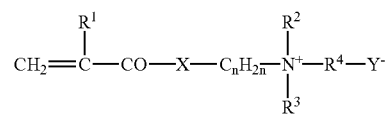

(A)

wherein $R^1$ represents a hydrogen atom or a methyl group;

X represents an oxygen atom or an NH group;

$R^2$ and $R^3$ each independently represent a straight-chain or branched alkyl group having 1 to 4 carbon atoms;

$R^4$ represents a hydrogen atom or an optionally substituted straight-chain or branched alkyl group having 1 to 4 carbon atoms;

n is an integer of 2 to 5; and

Y represents a salt forming anion.

58. The recording method according to claim 1, wherein the reaction solution further comprises triethylene glycol monobutyl ether and glycerin.

59. The recording method according to claim 1, wherein the step of depositing droplets of the ink composition on the recording medium is carried out after the step of depositing the reaction solution on the recording medium.

60. The recording method according to claim 1, wherein the step of depositing droplets of the ink composition on the recording medium is carried out before the step of depositing the reaction solution on the recording medium.

61. The recording method according to claim 1, wherein the step of depositing droplets of the ink composition on the recording medium or the step of depositing the reaction solution on the recording medium is an ink jet recording method wherein droplets are ejected and deposited on the recording medium to perform printing.

62. The recording method according to claim 1, wherein the printing is real image printing and/or mirror image printing.

63. The recording method according to claim 1, wherein the recording medium is an industrial product, an industrial article, a domestic electric appliance, an article for buildings, furniture, tableware, an aircraft, a vehicle, a ship, a card, a packaging container, a medical supply or device, clothing, boots or shoes, a bag, an office supply, stationery, a toy, a sign, or a fiber.

64. A record produced by printing according to the recording method as defined in claim 1.

65. A method for providing text information, image information, or design on a recording medium by the recording method according to claim 1.

66. A recording apparatus for depositing an ink composition and a reaction solution containing a reactant, which forms coagulate upon contact with the ink composition, onto a recording medium to perform printing, the ink composition and the reaction solution being the ink composition and the reaction solution for use in the recording method according to claim 1, said recording apparatus comprising:

means for depositing the reaction solution onto the recording medium;

means for depositing the ink composition onto the recording medium to record an image;

means for controlling the means for depositing the reaction solution onto the recording medium and the means for depositing the ink composition onto the recording medium to record an image; and means for washing the recording medium, on which the reaction solution and the ink composition have been deposited to perform printing, with a polar solvent.

67. The recording apparatus according to claim 66, wherein the means for controlling the means for depositing the reaction solution onto the recording medium and the means for depositing the ink composition onto the recording medium to record an image are ink jet recording means.

68. The recording apparatus according to claim 66, wherein the printing is real image printing and/or mirror image printing.

69. A record produced by printing using the recording apparatus according to claim 66.

70. The recording method according to claim 1, wherein the ink composition deposited on the recording medium forms a film on the recording medium, the method comprising a sequence of steps wherein the washing of the recording medium with the polar solvent is performed in the sequence so as to facilitate formation of the film on the recording medium.

71. The recording method according to claim 70, wherein the sequence of steps comprises a step of drying the recording medium, said drying step being performed only after the washing step.

72. The recording method according to claim 70, wherein the washing step is the next step in the sequence after the steps of depositing the reaction solution and the ink composition onto the recording medium.

73. The recording method according to claim 1, wherein the method is performed at room temperature and atmospheric pressure.

* * * * *